INVENTOR
KLAUS JUERGEN BOEHNKE

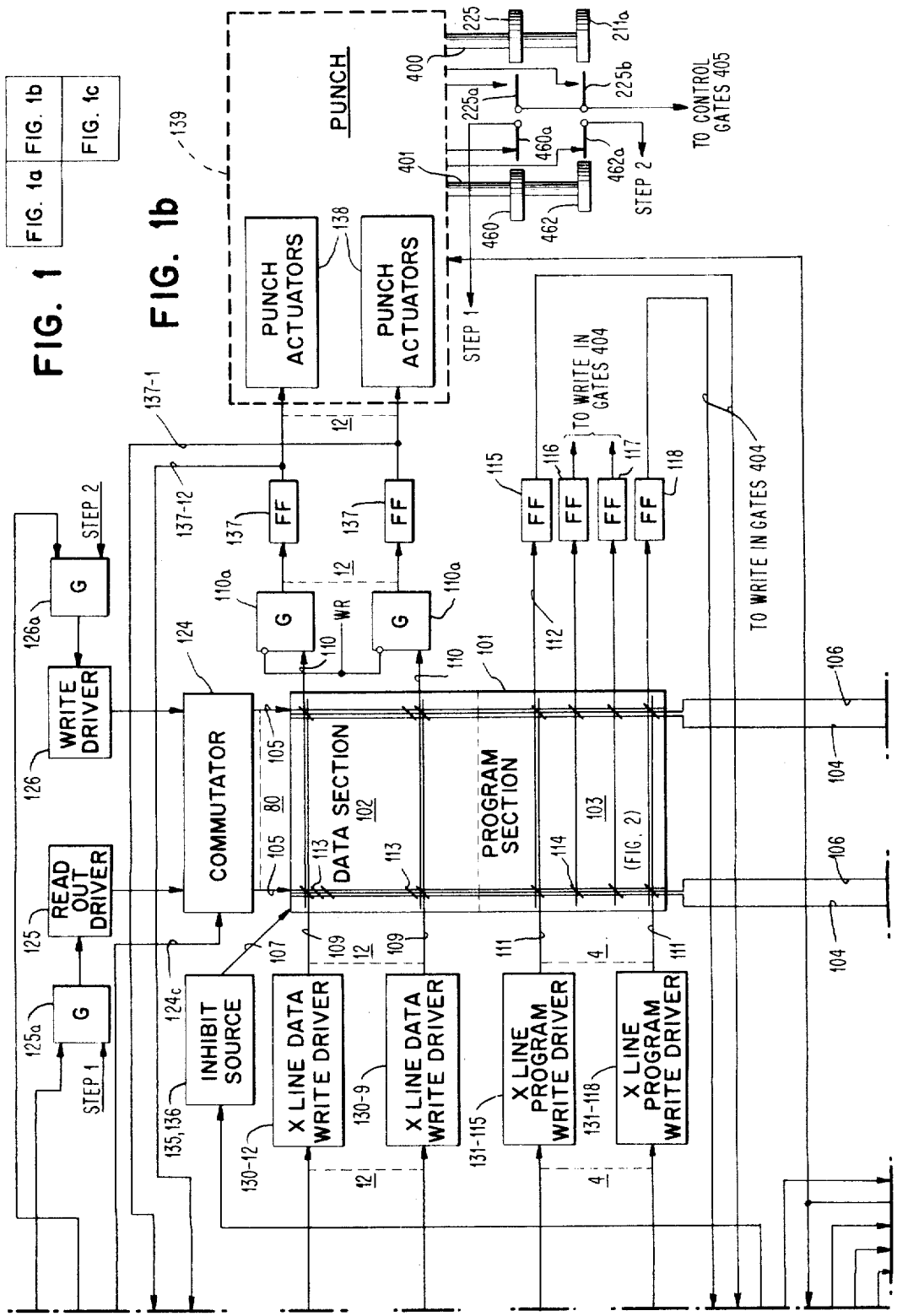

BY David Sischen

ATTORNEY

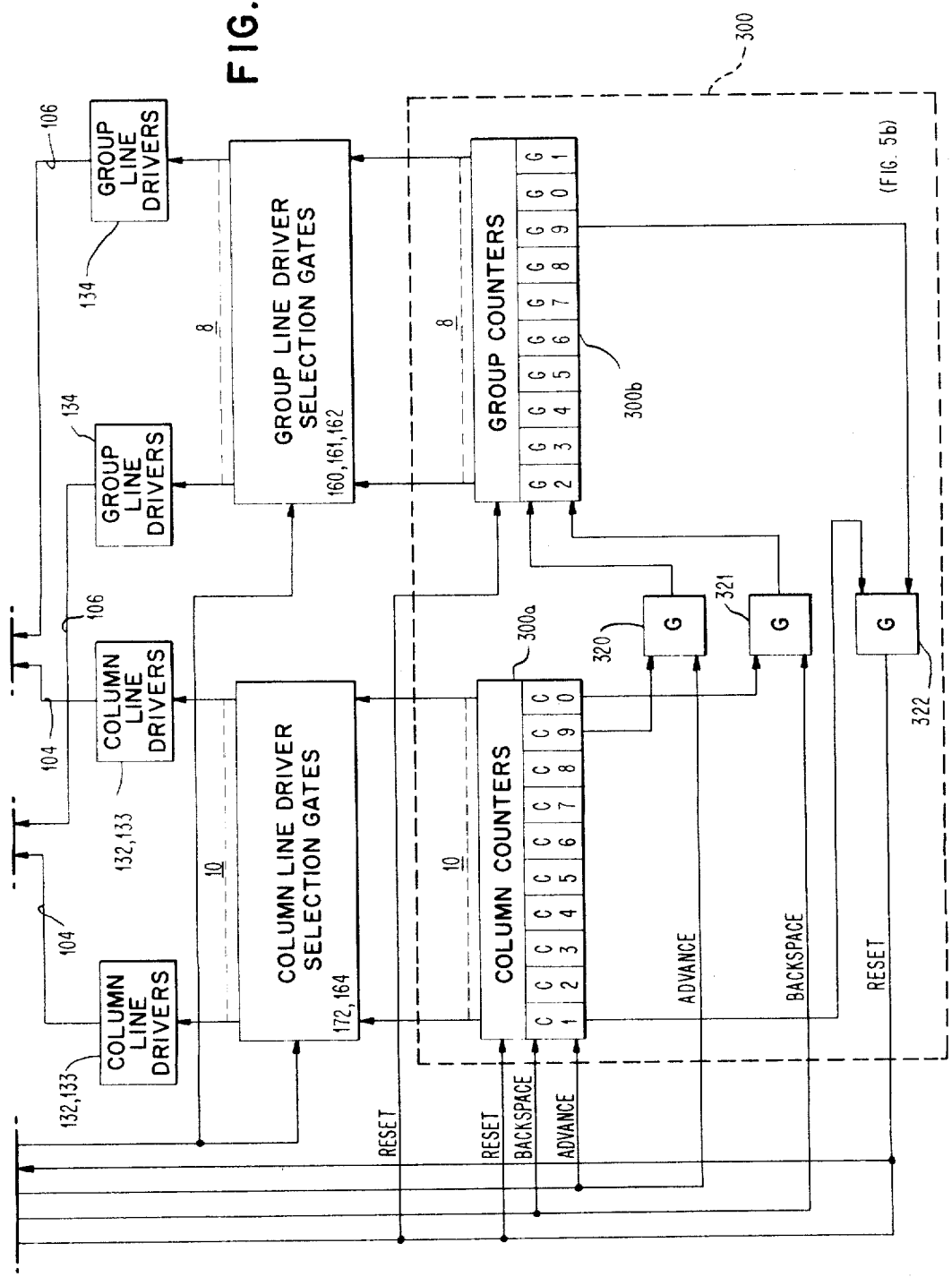

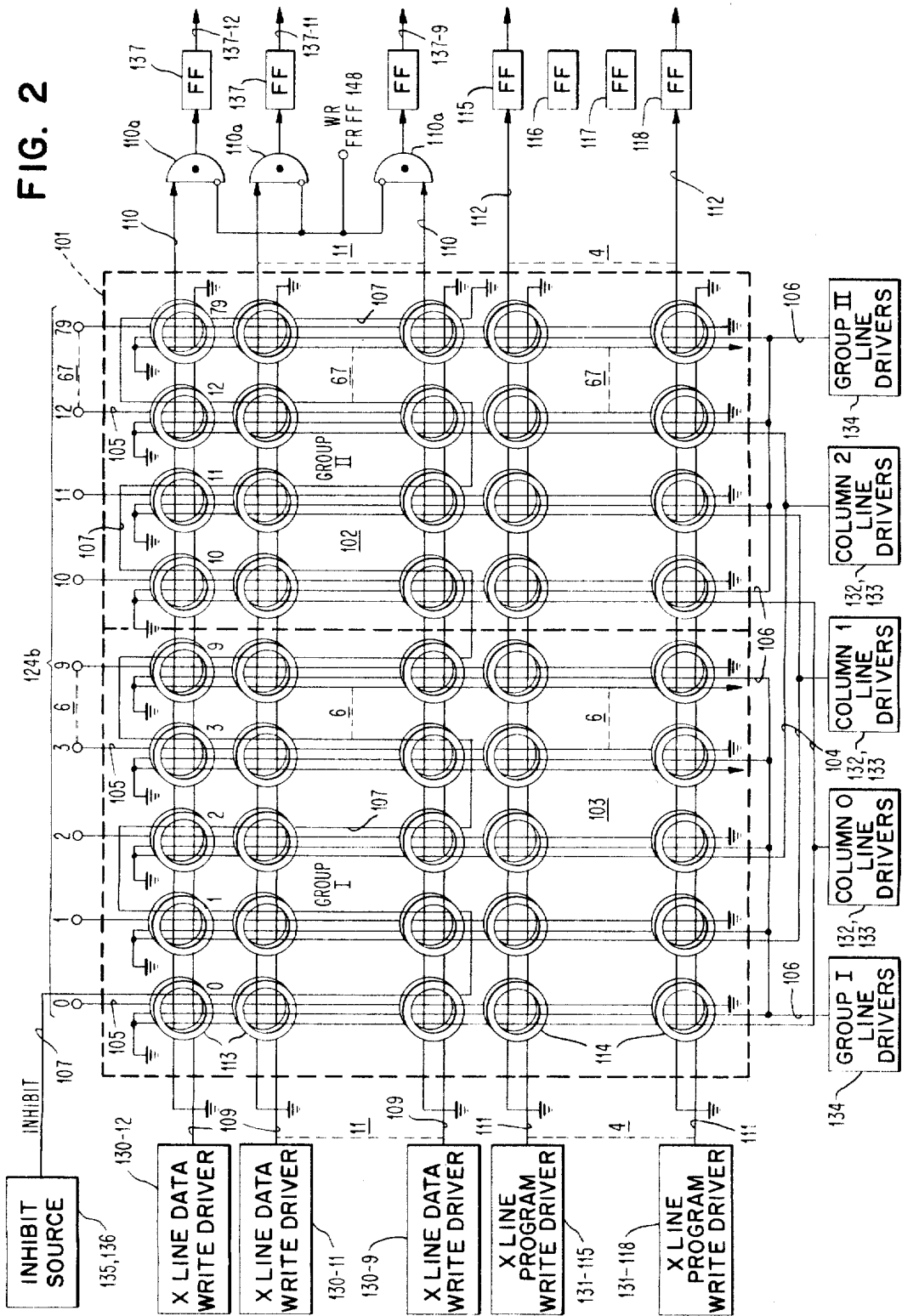

Dec. 26, 1967  K. J. BOEHNKE  3,360,781
CONTROL CIRCUIT FOR A KEY PUNCH OR VERIFIER
Filed Oct. 26, 1964                      14 Sheets-Sheet 7

FIG. 5a

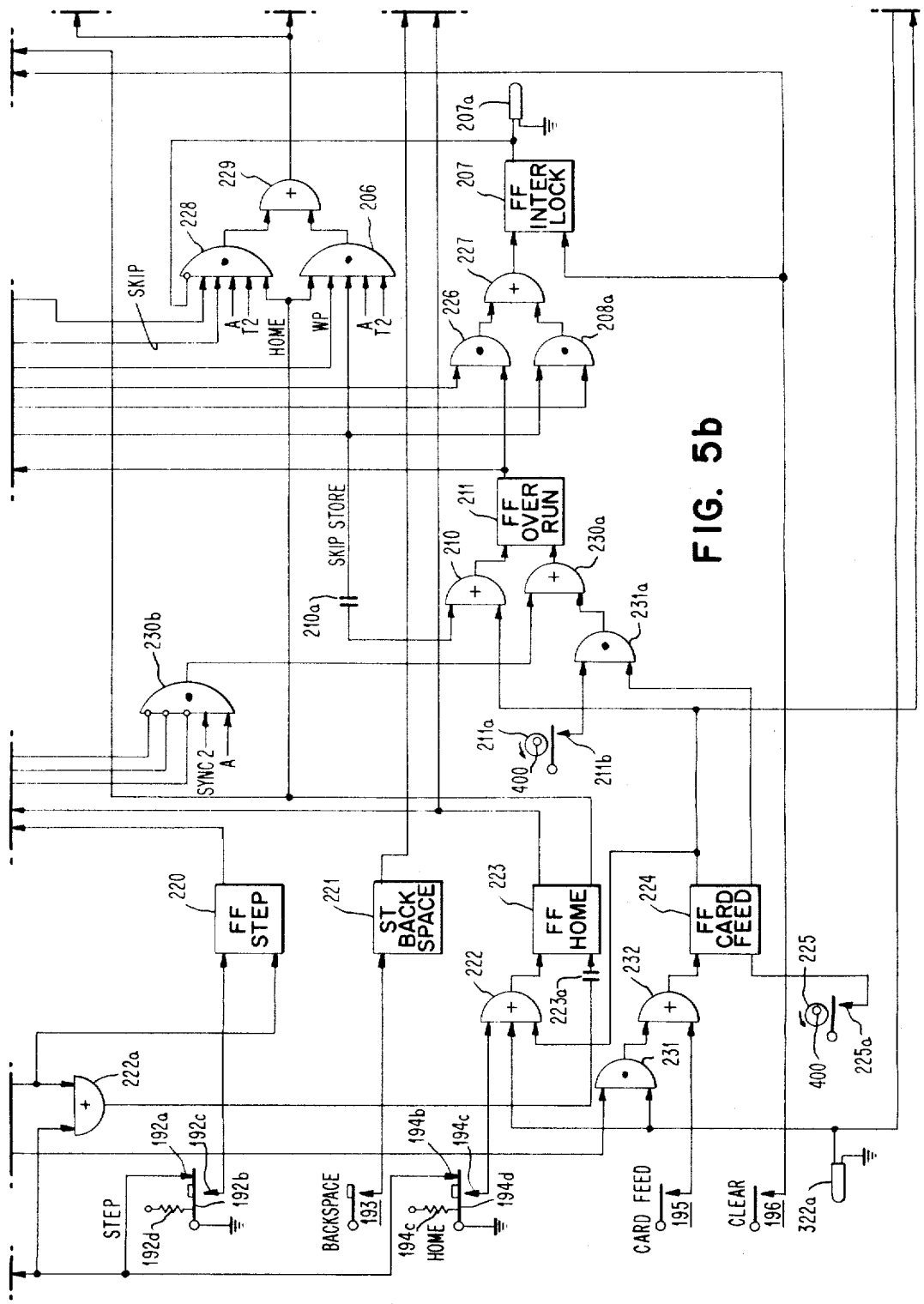

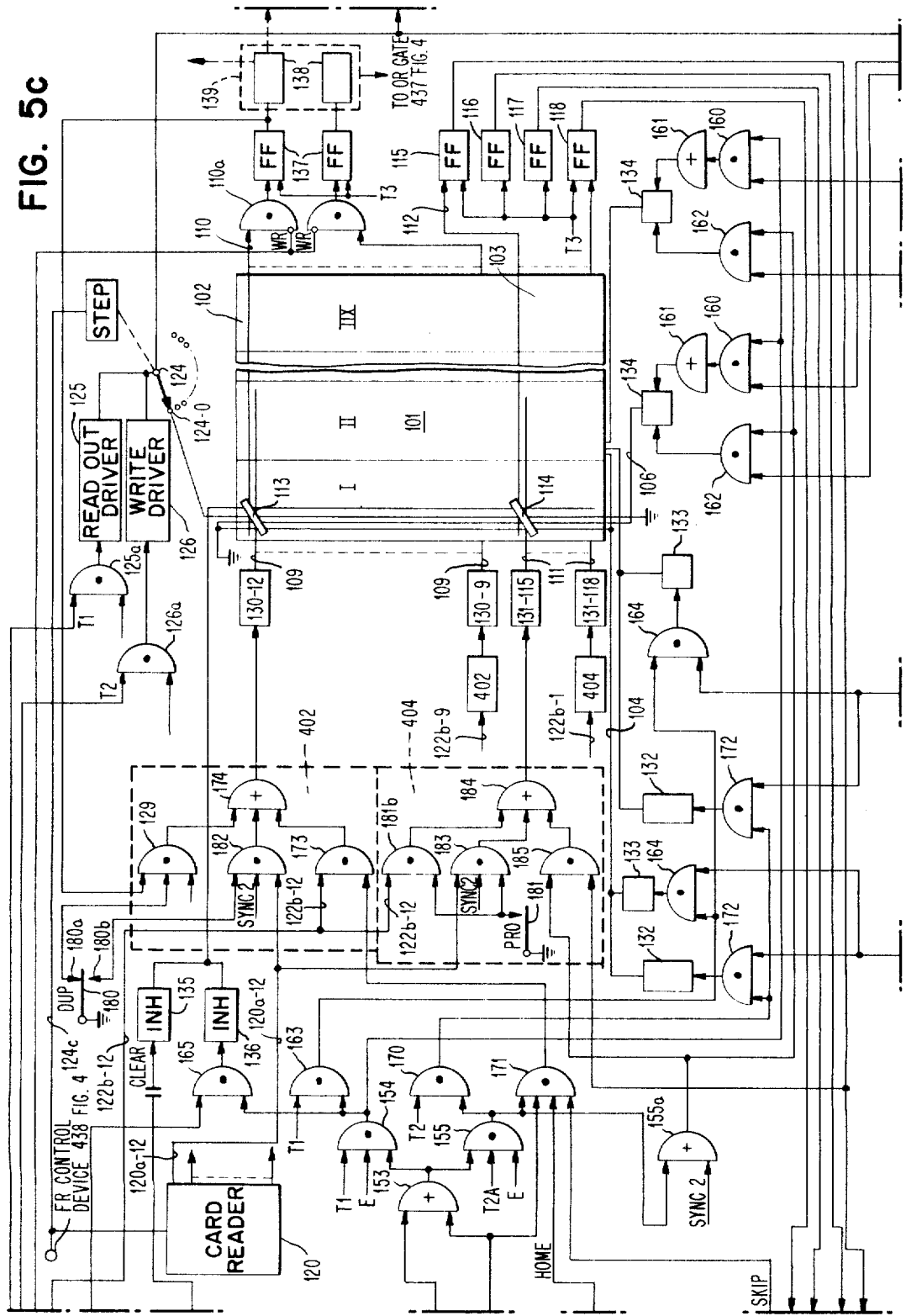

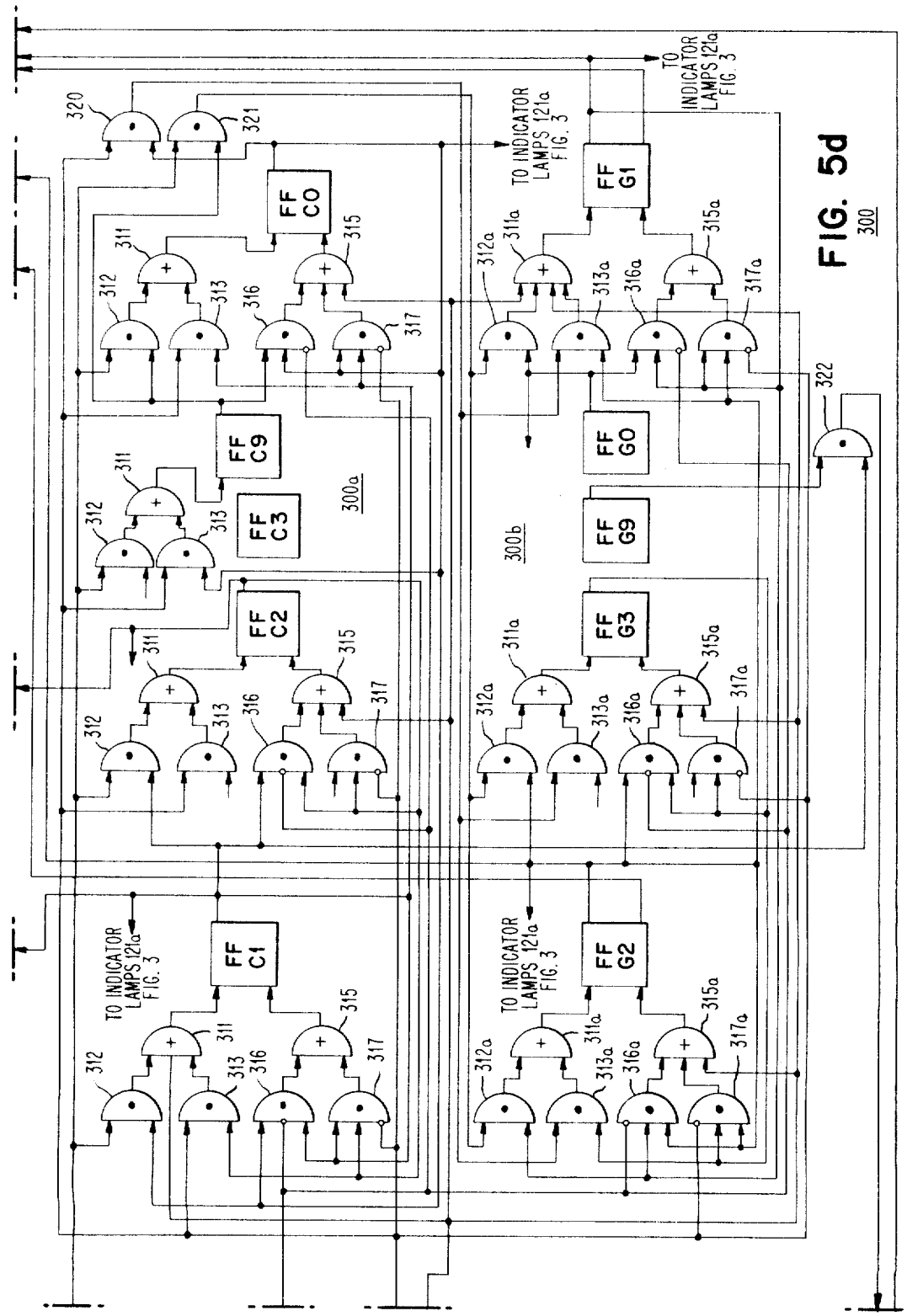

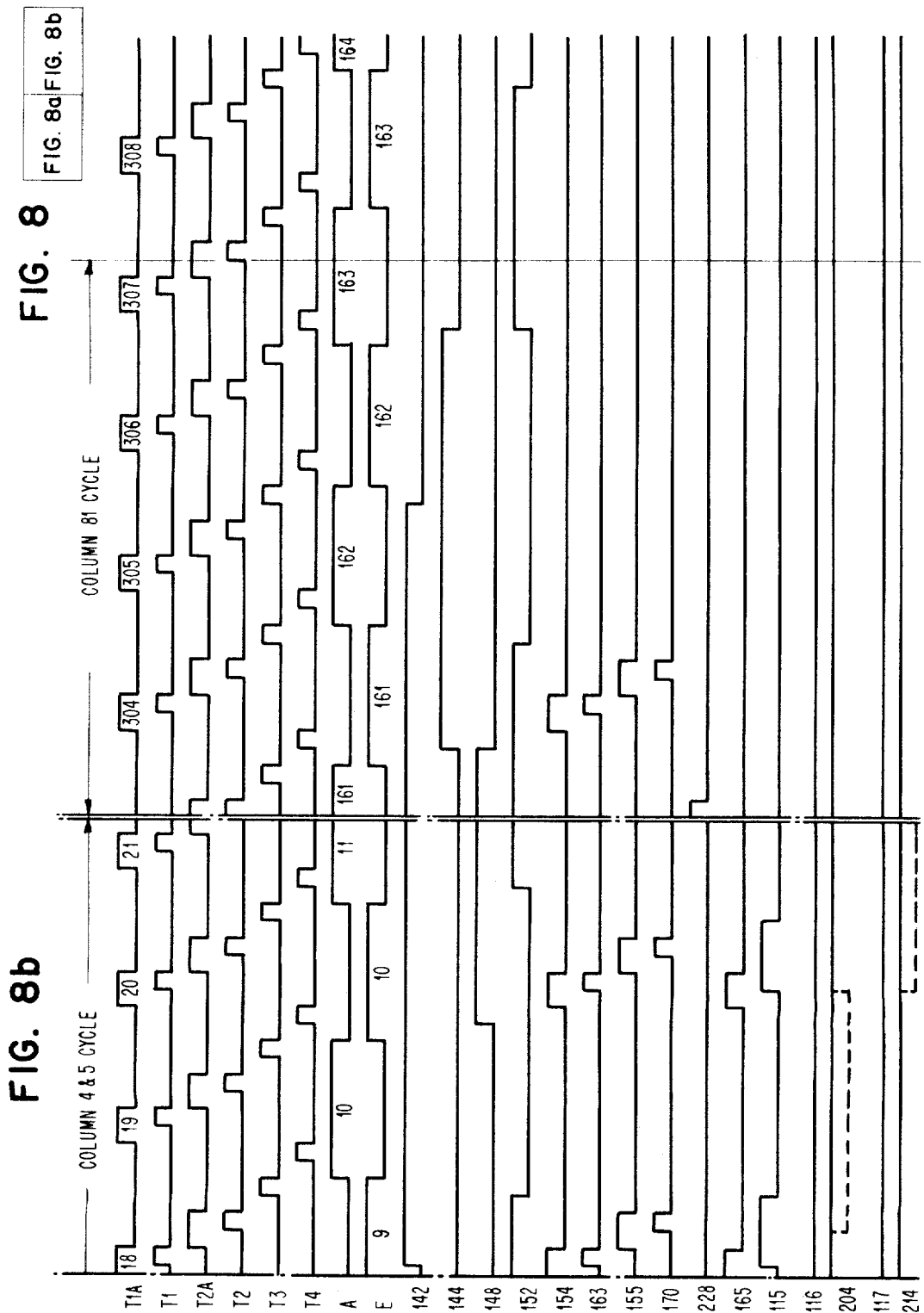

United States Patent Office 3,360,781
Patented Dec. 26, 1967

3,360,781
CONTROL CIRCUIT FOR A KEY PUNCH OR
VERIFIER
Klaus Juergen Boehnke, Kelkheim, Taunus, Germany, assignor to Sperry Rand Corporation, New York, N.Y., a corporation of Delaware
Filed Oct. 26, 1964, Ser. No. 406,308
Claims priority, application Germany, Oct. 28, 1963,
R 36,432
22 Claims. (Cl. 340—172.5)

ABSTRACT OF THE DISCLOSURE

A key punch and verifier which employs a memory for the storage of data and an associated memory to store instructions. The data memory is loaded before the punch cycle is initiated and while punching proceeds the next information to be punched may be loaded into the data memory as the old data is punched out. Interlocks are provided to prevent data entry into locations being or to be punched out. The instruction memory for any data column is consulted first to determine the data to be entered into its associated data column or the operation to be performed. If the instruction calls for automatic or semi-automatic skip or duplicate, these operations will be carried out and new data may not be entered. When the instruction permits data may be entered. Two separate addressing sources are provided, one for punch out and another for read in or execution of instruction operations.

---

The present invention relates to key punch and record card verifier devices and more particularly to control circuits for high speed key punches or verifiers for punched record cards or similar record media.

In prior art key operated record card punches, information is usually punched column by column directly into a record card. The information to be punched is read directly from another punched record card, being simultaneously read, or from a keyboard. Such prior art devices often provide a program control means which is stepped column by column as the record card carriage is advanced. Thus if some record card columns have to be skipped (no information to be entered in certain columns) no operation may take place until the record card carriage and program control means have advanced sufficiently to place the desired record card column in alignment with the punch station. Therefore, the operator must wait until the record card has come to rest before new information can be entered into the record card by means of the keyboard. The same is also true, if the key punch is programmed to punch recurrent information into certain fields of the record card. Normally, such recurrent information is read at a read station column by column from a master or duplicating record card. This operation is often referred to as duplicating. For example, if thirty columns of a master or duplicating record card have to be duplicated on the detail record card, and if the duplicating speed of the machine is ten columns per second, the operator has to wait three seconds for the duplicating operation to be completed, before additional information can be entered by means of the keyboard. Such waiting periods, before information may be entered, are wasteful of machine and operator time. Further time is lost in prior art devices during the time a new record card is fed into the machine, after the previous record card has been punched.

The disadvantages of prior art key punches, noted above also holds true for prior art verifiers. Such verifiers are essentially similar in design to key punches, but employ a reading station instead of a card punch station; additional circuits are provided to compare the information read from the record card with the information entered into the machine from the keyboard. Verification proceeds also on a column by column basis as the verifying card is advanced through the read station.

In the co-pending application of Felder et al. Ser. No. 233,023, filed Oct. 25, 1962, and now abandoned, for a Record Card Punching Machine, and assigned to the assignee of the instant invention, a key punch has been disclosed, in which data from a keyboard is fed, under the control of a commutator into a core memory, from which this data may later be read out, again under control of a commutator, and punched into a record card. The key punch disclosed in the above cited application permits the correction of incorrectly entered information before such information is punched due to the intermediate storage of the keyed information rather than the direct punching as is found in prior art devices generally described above. After the data is stored in the memory, the operator may erase the wrong information from the data memory by pressing a backspace key, and then enter the correct information. However, in the machine of the cited prior application, the operator has to wait during skipping and duplicating operations until the commutator has reached the desired column. Therefore, this machine also shows some of the cited time wasting disadvantages of the prior art key punches noted above.

The present invention obviates undesired waiting time for skipping, duplicating and other operations. According to the invention, the key punch or verifier is characterized by a data memory for storing information to be punched, a program memory for storing programs for operations (e.g. skipping, duplicating) and a counter actuable by either the keyboard or the program memory to control the data and program memories. The data memory is a magnetic core memory capable of storing the data contained in a standard 80 column record card. It is arranged in the same format as a record card having 960 magnetic cores arranged in 80 columns and 12 rows, each magnetic core having appropriate input, output and inhibit windings provided. The program memory is also a magnetic core memory and comprises 320 magnetic cores. The 320 magnetic cores of the program memory are arranged in 80 columns and 4 rows, each magnetic cores having appropriate input and output windings. The size of the program memory is chosen in accordance with the program instruction format to be employed.

If skip or duplicating operations are desired, these will be programmed by reading the contents of a program card into the program memory. If duplicating operation is to be performed, the data to be duplicated is read from a duplicating card into the memory. Data to be entered by means of the keyboard is inserted directly into the memory under control of the stored program and the memory is fully loaded prior to an actual punch operation. Then the punch operation is initiated. The punch operation is completed without reference to the duplicating card from which the duplicating data was obtained, and without reference to the program record card. In general, when a number of record cards are to be punched, there is common data which must be punched into a plurality of cards and special data which is to be punched only into selected record cards. The common data is usually supplied by a master card whereas the special data will be supplied by a detail or duplicate card or from an associated keyboard. The master card will contain the data which is to appear on every record card being punched whereas the data contained in the detail or duplicate cards is only to appear on certain predetermined record cards. Many detail cards may be used with a single master card to complete the punch operation. A program card is employed to determine which source of data is to be employed. In the prior art devices, the master and detail or duplicate cards are reread for each new record card to be punched and any keyboard data is entered under the control of the program card as the proper column of the new record card is reached. The operation of reading the master card and detail or duplicating cards is repeated as many times as is required to punch the desired number of new record cards in the run.

As was briefly described above, the present invention employs a data memory wherein the master card data and the detail or duplicate card data may be stored. In distinction to prior art devices wherein a new detail or duplicate card is inserted when the data to be punched into a record card is changed, the present invention must provide for erasure of the stored detail or duplicate data when new detail or duplicate data is required or the old data is no longer needed as well as erase the master card data when new master card data is to be stored or the old master card data is no longer needed. The control of such erasing and new data entry from a keyboard is controlled by the program information stored in the program memory of the invention. Under the program memory control the stored data required for each succeeding record card is evaluated and retained, destroyed and as needed new data entered into the data memory. The program instruction is inspected on a column by column basis and the appropriate operation carried out. Thus for a single record card, a plurality of instructions may be carried out.

In this specification, the term program controlled skip operation is used to describe the operation where a column of the data memory is erased so that during the ensuing punching cycle, no punching will take place in the record card column corresponding to the erased column. In this manner detail or duplicate card data or keyboard entered data employed in a previous punch cycle which is not required for a subsequent punch cycle may be deleted.

Further the use of the term program controlled duplicating operation refers to a situation whereby a column of the data memory containing detail or duplicating information is retained for use in the punching of further record cards. The skip operation prevents the erasing of stored data and prevents the insertion of data from the keyboard.

With a key punch or verifier constructed according to this invention, the skip or duplicating operation can be effected at electronic speeds no matter how many columns have to be skipped or duplicated. On such operations, since no data is entered from the keyboard the scanning of a large number of columns of the program memory may be done at speed faster than is possible in prior art devices which require the column by column mechanical scanning of the master and detail card as well as the program card regardless of the required operation. A further increase in operating speed of the instant invention over prior art devices is achieved by the ability of the invention disclosed herein to receive and store data for the next punch operation while the present punch operation is being completed. As will be recalled from the discussion of prior art devices, the master and detail or duplicate card as well as the program card are read column by column as the record card to be punched is advanced in synchronism therewith through the punch mechanism. Data obtained from the master and detail or duplicate card are directly punched into the record card as is data entered from the keyboard. Thus when a master card column is scanned, it will not be available for rescanning until the master card has been completely scanned and a new cycle started. The speed of operation of such prior art devices are thus limited by the scanning time of an entire master or detail card. The scanning time for a card in turn is determined by the time required to sense the master or detail card; translate the data read; check the program card to determine what is to be done in the column then available in the punch station; set up the punches and cause punching; and then advance the master and detail card, program card and record card to be punched to the next column.

In the instant invention an overlap mode of operation is possible wherein the punching of previously stored data and the loading of new data into a column already punched may occur simultaneously. This is made possible by the data memory and the program memory and two separate and distinct addressing means which each operate with both memories. When the data memory is completely loaded, the data stored therein will be read out column by column under the control of a first addressing means causing the punching of this data. After the data is punched out of a particular column of the data memory, the program memory for that column will be addressed and read out by a second addressing means. If the program is such that new data is to be entered, the second addressing means will enable the storage of new data from the keyboard in the corresponding column of the data memory. Interlocks are provided to prevent the attempted entry of data or the carrying out of skip or duplication operations that would interfere with those data memory columns yet to be punched out. Thus with the ability to enter new data while the old data is being punched out and realizing that most of the data for a card run will remain unchanged for the entire run, greater speed is achieved than in prior art devices which require the column by column sensing of master or detail cards and the program card regardless of the changes to be made or new data entered.

It is therefore an object of this invention to provide an improved form of high speed record perforating or record verifying device.

It is another object of this invention to provide an improved form of programable high speed record perforating or record verifying device.

It is another object of this invention to provide an improved form of programable high speed record perforating or record verifying device employing both data and program memories, said program memory controlling the operation of the devices during certain operations.

It is yet another object of this invention to provide a high speed record perforating device having a program memory, the contents of which controls the entry of data from a keyboard into a further data memory.

It is still another object of this invention to provide an improved form of control circuit for a high speed programable record perforating or record verifying device.

It is still another object of this invention to provide a keyboard controlled high speed record perforating or record verifying device having a high speed storage unit for retaining data entered from said keyboard and controlling the punching mechanism in accordance therewith.

It is still another object of this invention to provide a keyboard controlled high speed record perforating or record verifying device which permits the simultaneous punching out of stored data and the storage of new data into non-interfering storage locations.

It is yet another obect of this invention to provide a keyboard controlled programable high speed record perforating or record verifying device having a first high speed storage unit for retaining data entered from said keyboard or a record card reader and a further high speed storage unit for retaining program data, the first of said storage units controlling the punching mechanism subsequent to the entry of data into said storage units, while said further storage unit controls the entry of data from said keyboard into said first storage unit.

In the drawings:

FIGURE 1 composed of FIGURES 1a, 1b and 1c arranged as shown in FIGURE 1 is a simplified block diagram of the component portions of the present invention;

FIGURE 2 is a partial schematic representation of the memory employed with the instant invention;

FIGURE 5 shows the manner of assembly of FIGURES 5a, 5b, 5c and 5d in which:

Figure 5:
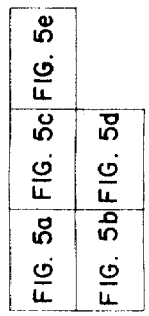
Figure 5E:
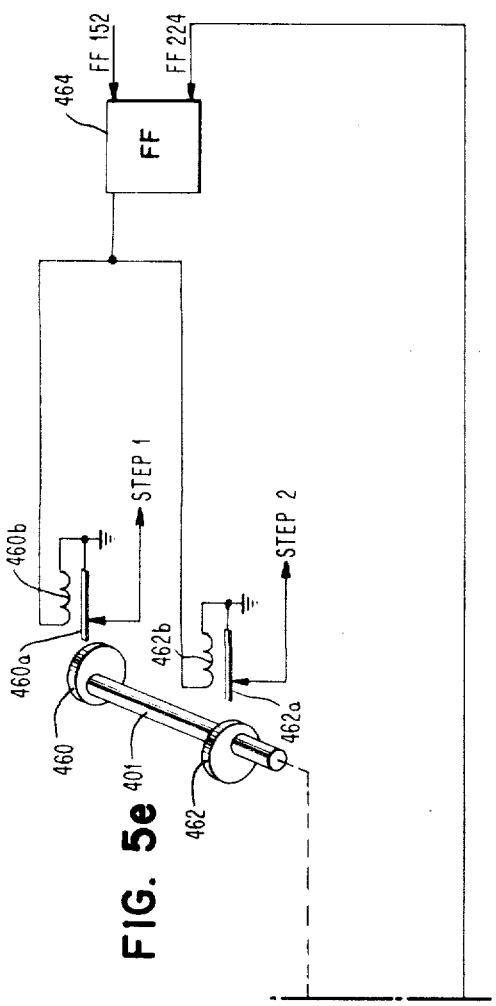
Figure 6:
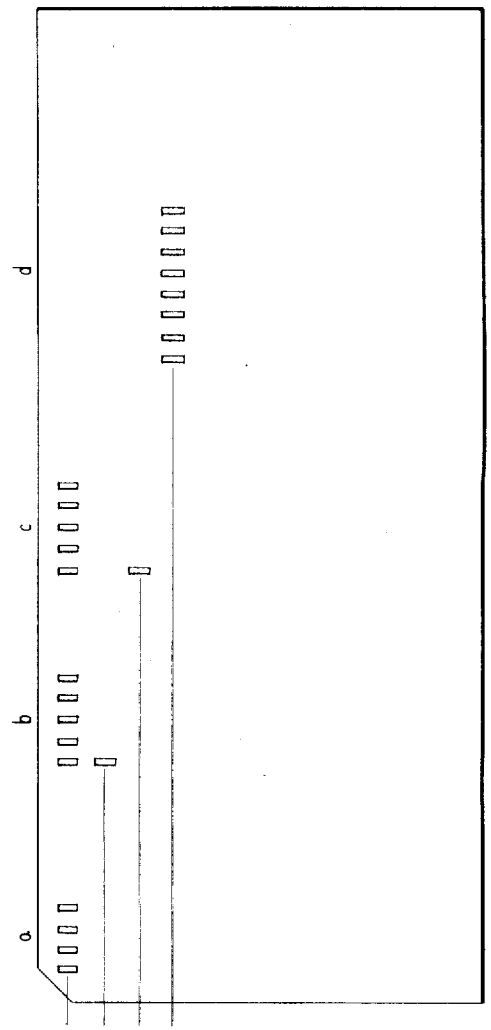
Figure 5A:
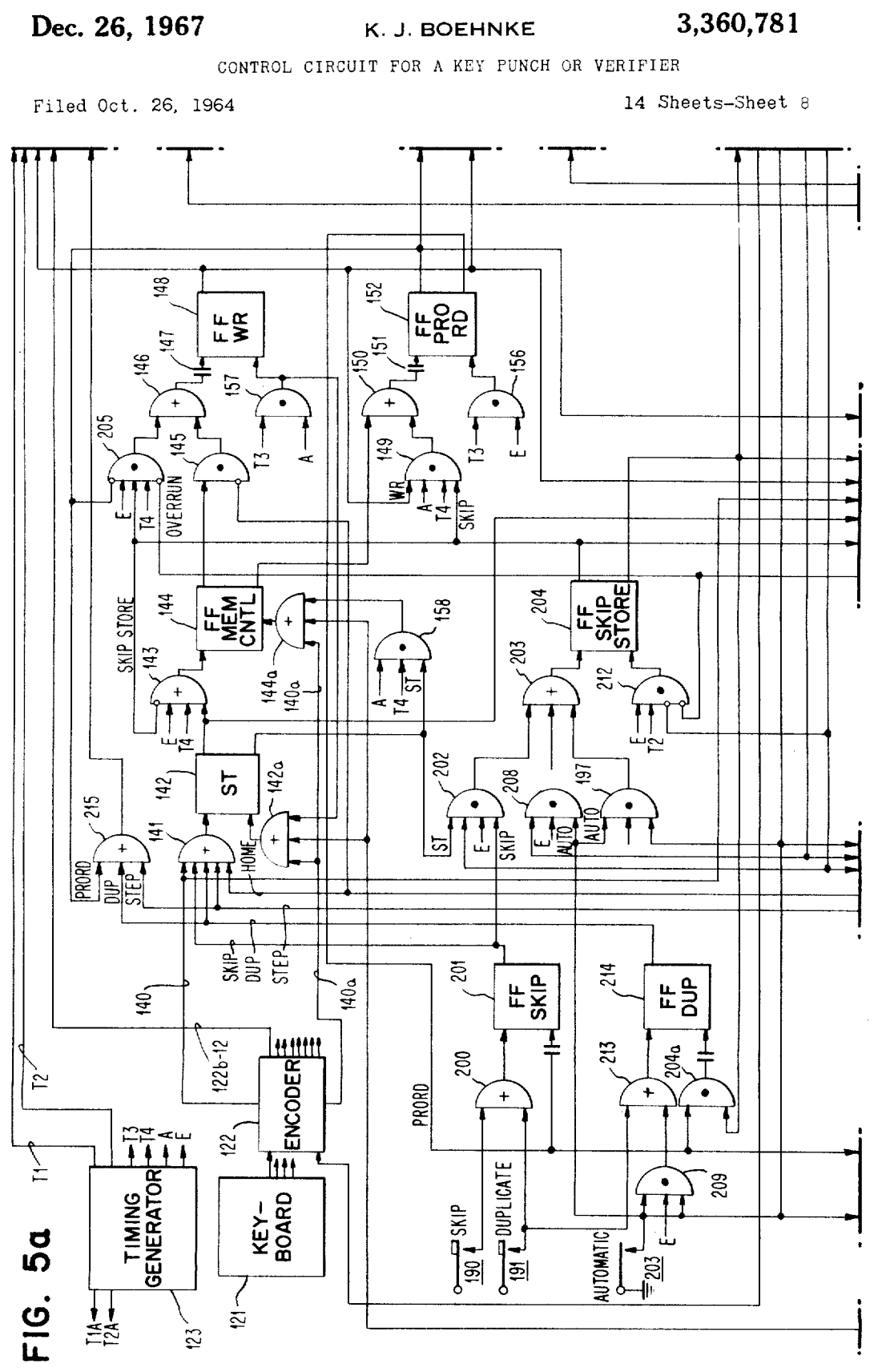
Figure 7:
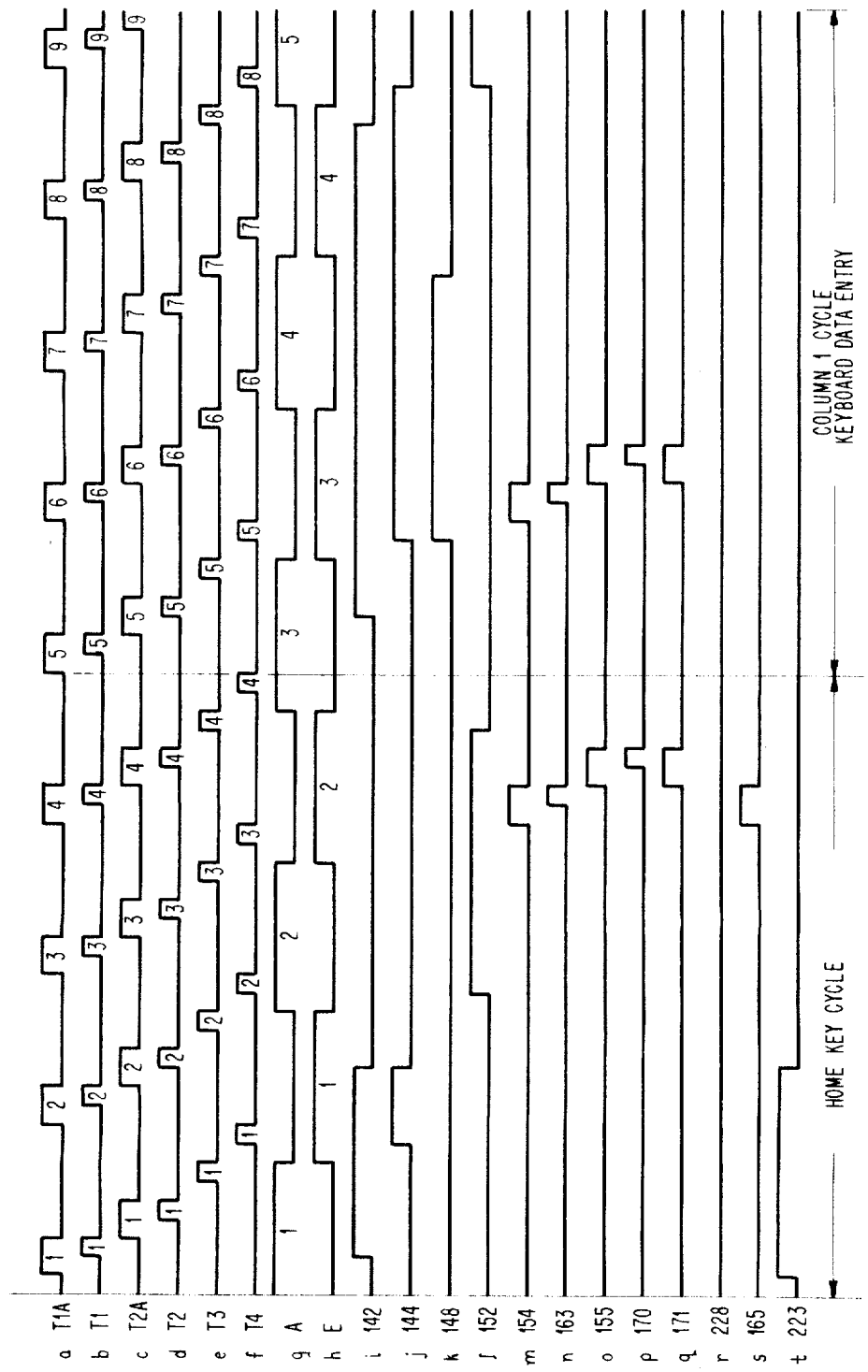
Figure 8A:
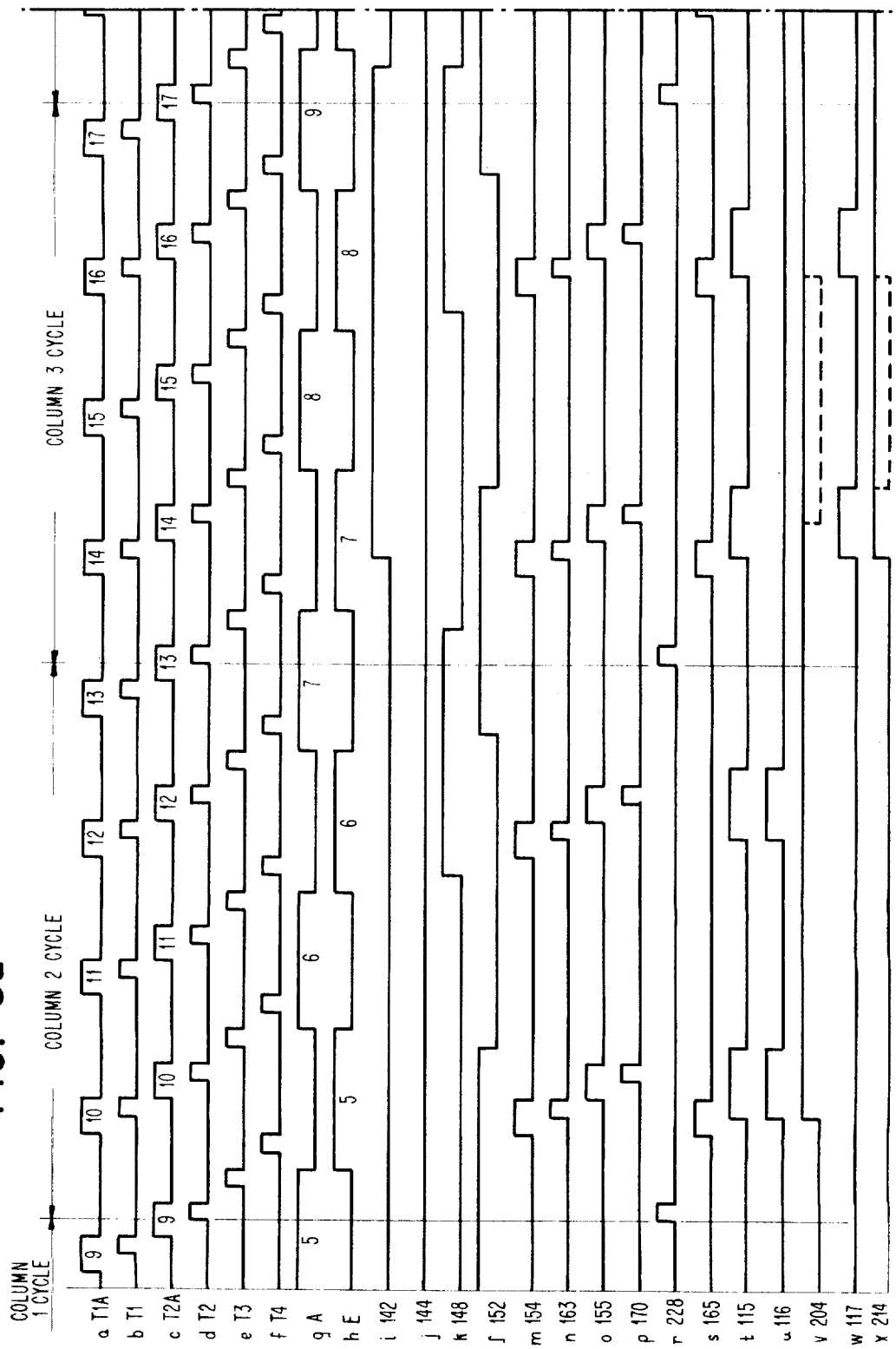

FIGS. 5a and b illustrate the pulse generator and the principal control circuits of an embodiment constructed in accordance with the basic concepts of the invention;

FIG. 5c illustrates the magnetic core memory and some of the associated control circuits of the instant invention;

FIG. 5d illustrates the electronic counter used for selecting desired columns of the magnetic core memory;

FIG. 5e illustrates apparatus for generating certain cam controlled timing signals used during a record card read operation;

FIG. 6 illustrates a program card punched to illustrate the program configuration for a manual skipping or duplication operation indicating the columns to be skipped or duplicated; the program configuration for automatic skip and duplication operations indicating the columns to be skipped or duplicated and the program for columns into which alphabetical data have to be written;

FIG. 7 comprises a timing diagram illustrating the reset or home key cycle and the keyboard data entry cycle for columns 1 and 2;

FIG. 8 (comprising FIGS. 8a and 8b) is a timing diagram illustrating the column skip and a column duplication operation. The portions shown in dashed lines indicate additional functions taking place while a duplicating operation is taking place, which do not take place during a skip operation.

GENERAL DESCRIPTION OF THE COMPONENTS PORTIONS OF THE KEYPUNCH

Figure 1A:
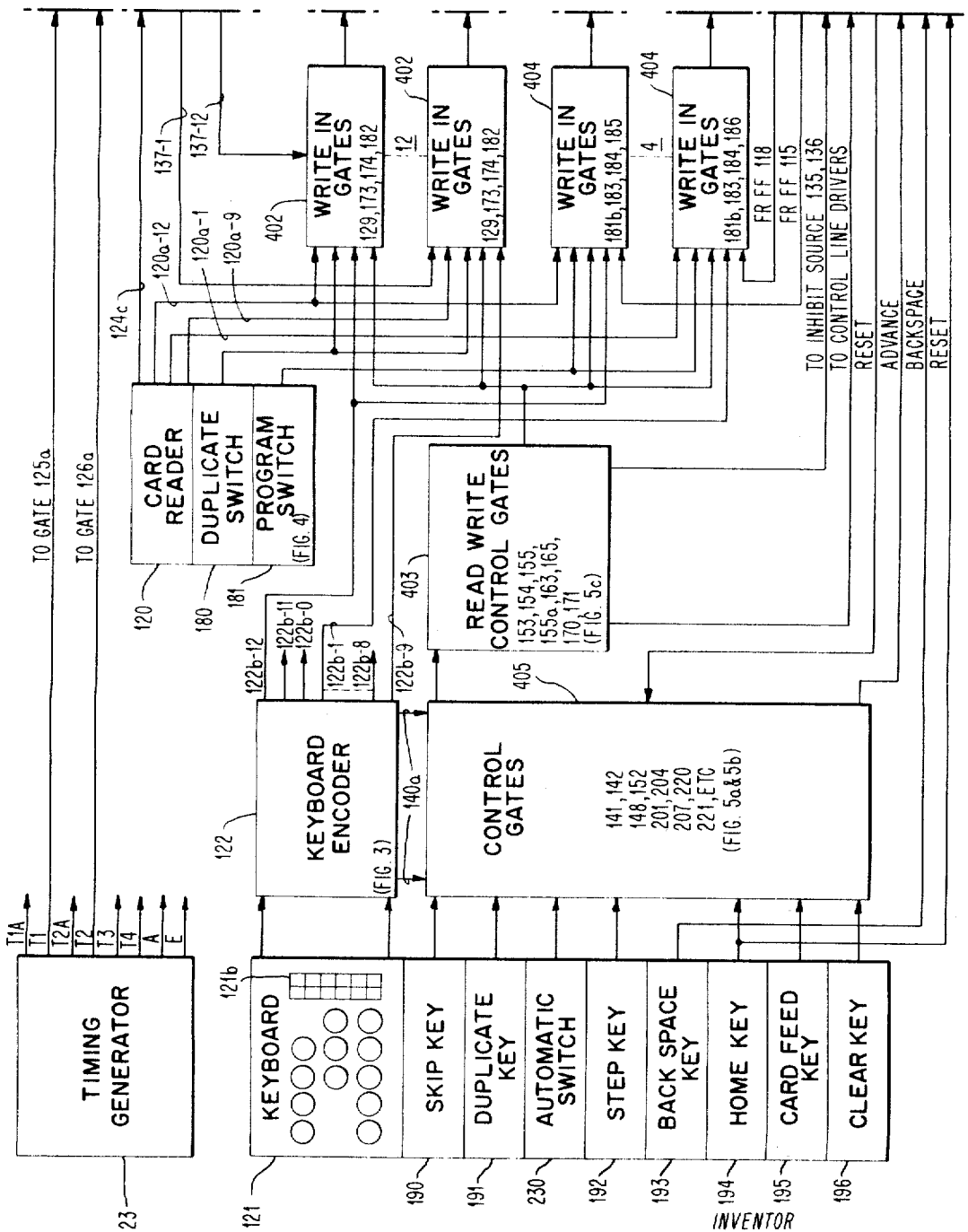

Turning now to FIGURE 1, the general operation of the device will be set forth with reference to the elements illustrated. Although, in the remaining description of the device, the logic of the keypunch will be treated in detail, it should be recalled that the record card verifier is very similar in construction and arrangement to that described with reference to the keypunch and thus is not further described at this time in order to simplify the explanation of the circuits involved.

There is provided a keyboard 121 (shown in block form in FIG. 1a and in greater detail in FIGURE 3) which is used to manually enter information into the memory 101 (see FIG. 1b) of the system. The keyboard 121 consists of a plurality of data and special function keys, only certain of which are illustrated for simplicity's sake. The keyboard 121 also includes a plurality of indicator lamps 121a. The keys constitute all the numeric characters 0 through 9, the alphabetical characters a through z, and certain additional symbols such as the +, —, ?, etc. In addition, there are a plurality of function keys 190 to 196 and 230 which control the machine operation as will be described below. The output of the keyboard 121 is fed into a keyboard encoder 122 (shown in block form in FIG. 1a and in greater detail in FIGURE 3) which takes the signals produced by the keyboard 121 and translates them into coded input signals to be employed in the internal portions of the control circuit, which in the embodiment to be described is the Hollerith code. The signals produced by the encoder 122 are placed on twelve output lines 122b which are designated 122b-12 to 122b-9. The output lines 122b-12 to 122b-9 represent the row positions of a record card and include lines for the row positions 12, 11, 0, 1, 2, 3, 4, 5, 6, 7, 8 and 9. When operating in the numeric mode, a 1 key depressed on the keyboard 121 will be translated by the keyboard encoder 122 to a signal on the 1 output line 122b-1. However, when operating in the alphabetic or special symbol mode the depression of a key, such as an a on the keyboard 121 will be translated to signals on the output lines 122b-0 and 122b-1 by the keyboard encoder 122. That is to say for each alphabetic character or special symbol a signal will be placed on one numeric line 122b-1 through 122b-9 as well as a signal on one of the so-called zone output lines 122b-12, 122b-11 or 122b-0. Thus, each input from the keyboard will be translated by the keyboard encoder 122 into signals on one or more of the output lines 122b-12 through 122b-9.

In addition to the numeric alphabetic and special symbol keys the keyboard 121 also includes a number of special function keys; (1) the skip key 190 for manually initiating a skip operation; (2) the duplicate key 191 for manually initiating the duplication operation; (3) the automatic switch 230 to control the mode of operation of the device as automatic or manual; (4) a step key 192 to manually control the advancement of the electronic counter 300 to be described below; (5) a back space key 192 to manually control the descending counting of the electronic counter 300; (6) a home key 194 to manually reset the electronic counter 300 and set up certain predetermined conditions to be described below; (7) a card feed key 195 to manually initiate the punch operation; and (8) a clear key 196 to manually reset the interlock device which prevents the entry of data from the keyboard during a punch operation.

In addition to the keyboard 121, a record card reader 120 (see FIG. 1a) is provided as an input device. The record card reader 120 to be described below, provides input signals in accordance with the information punched in the record card read by it. The record card reader 120 also includes a duplicate switch 180 and a program switch 181 which are set in accordance with the type of information punched into the card being read. For example, if the information is program information, then the program switch 181 will be closed to cause the writing in of program information into the program section 103 of the memory to be described below. Alternatively, the closing of the duplicate switch 180 will cause a write in of information into the data section 102 of the memory.

The output device employed is a serial punch 139 (see FIG. 1b) that is, a punch capable of punching all twelve row positions of a single column simultaneously. The punch mechanism 139 receives data from the magnetic core data section 102 via the punch actuators 138 to operate the punch bars. Coupled to the motor of the punch mechanism 139 (not shown) and driven at different speeds thereby are shafts 400 and 401. On shaft 400 is located the resetting cams 225 and 211a. On shaft 401 is located the STEP 1 cam 460 and STEP 2 cam 462. Placed adjacent the cams 225 and 211a are normally open contacts 225a and 211b which are arranged to be closed by their respective cams at times to be described. Placed adjacent the cams 460 and 462 are normally closed cam contacts 460a and 462a arranged to be opened by their respective cams at times to be described to generate the STEP 1 and STEP 2 signals.

Information is stored in the magnetic core memory 101 (see FIG. 1b) which is broken down into two distinct memory sections provided with common read-out and write-in means as well as separate write-in and inhibit means. The first section of memory 101 and by far the larger, is the data section 102, which is capable of storing at one time, all of the data available from the 960 positions of a record card, that is 960 bits of data. This data section 102 is arranged to have magnetic core, storage elements 113 arranged in 80 columns and 12 rows corresponding in arrangement to the column and row positions of a record card. That is the information contained in column 1 of a record card would be stored in column 1 of the data section 102 on a row by row basis corresponding to said punched record card. Data section 102 is provided with write and selection circuits as well as sense lines, an inhibit line and output flip-flops to store temporarily the values read from the data section 102.

The second section of the memory 101 and a much smaller section, is the program section 103. The program section 103 is arranged to store program information in a configuration of magnetic cores 114 which provides 80 column and four row positions for each column. These positions are employed to store the program information of a program record card contained in the row positions 12, 11, 0 and 1 of any or all of the 80 columns available. The program section 103 will store on a column by column basis the program which will be employed to control the storage of data from the keyboard into the corresponding column in the data section 102. Thus the individual columns of the program section 103 may store the program for automatic skip or duplicate, semi-automatic skip or duplicate or numeric-alphabetic input shifting or any other program employed, and each will effect its related data column. The program section 103 is also provided with selection and write-in circuits, sense lines and temporary storage facilities.

As was stated above, the present invention makes use of a common memory to store both program information and data information to provide increases in the speed of operation over devices known in the prior art. The prior art devices operated on a column by column mode such that information set up in a kepboard would be entered into the record card only when the proper column was in position. Thus, if it were desired that keyboard information be entered into some later column of a record card, the record card would have to nonetheless be advanced cycle by cycle through each column in order that the proper column be placed in such a position that the keyboard information may properly be entered. This is not so with the instant device. The memory section 103 of the device may be loaded with program information from a program card or from the keyboard and then have information added to the data portion 102 of the memory 101 by means of the keyboard or detail cards placed in the record card reader 120. Once all the information for a record card has been entered into the memory, the record card punch operation cycle may be initiated. The loading of data into the memory prior to a punching operation will not require a step by step examination of master or detail cards but will proceed at electronic speeds to the first position into which data may be entered while carrying out required memory operations under program control. If, for example, information is first to be entered into the 15th column and a skip has been called for for columns 1 through 14, the memory 101 is cycled at electronic speeds through columns 1 through 14 during which time no keyboard information may be entered. When column 15 is addressed, the keyboard is permitted to enter data in this column. The actual operation of punching will take place after all needed program information and data has been stored and such punching will be solely under the control of the data and program sections without regard to the record card reader 120 or the keyboard 121. As will be described below in detail the entry of new data into the data section 102 may take place at the same time as data stored in the data section 102 is being punched out providing no attempt is made to enter data or effect program operations upon data not as yet punched out. Thus, the speed of operation of the device is greatly increased in that the normal dependence and reliance upon the step by step advancement of a record card and a program moved in synchronism therewith is completely eliminated.

Returning again to FIGURE 1, the flow of information within the key punch can be traced. Information from the keyboard 121 (see FIG. 1a) is fed to the keyboard encoder 122, as has been described above, and the keyboard encoder 122 in turn will provide signals on the lines 122b–12 through 122b–9. These lines are connected to a set of twelve write-in gates 402 (see FIG. 1a) which in turn are connected via twelve x-line data write drivers 130–12 to 130–9 (see FIG. 1b) to a set of twelve data write x-lines 109 to the data section 102. The write-in gates 402 (which include gates 129, 173, 174 and 182 and are shown in greater detail in FIGURE 5) are controlled by the duplicate switch 180 and the read-write control gates 403 (which include gates 153, 154, 155, 155a, 170 and 171 and which are shown in block form in FIGURE 1a and shown in greater detail in FIGURE 5c). It should be noted that only two of the x-line data write drivers 130 and two of the writer-in gates 402 are illustrated for the lines 122b–12 and 122b–9 and the remaining ten lines 122b–11 to 122b–8 are not illustrated. This is done in an effort to simplify the drawings. A number 12 placed in the center of a dashed line between the x-line data write driver 130–12 for the line 12 and the x-line data write driver 130–9 for the line 9 will serve to indicate that there are in fact 12 such x-line data write drivers 130. A similar notation will be used throughout the application in order to simplify the drawings. The output of the keyboard encoder 122 is also fed to a second set of four write-in gates 404 (see FIG. 1a) which are employed with the x-line program write drivers 131–115 to 131–118. The four wirte-in gates 404 (including gates 181b, 183, 184 and 185 are shown in greater detail in FIGURE 5) are controlled by the program switch 181 and the read-write control gates 403. Drivers 131 are in turn connected to the program section 103 of memory 101 via the program x-write lines 111. Thus the information transmitted from the keyboard may be entered into the data section 102 or the program section 103 of memory 101. If the information transmitted by the keyboard is data and is to be stored in the data section 102 then the duplicate switch 180 on the record card reader 120 is depressed to operate write-in gates 402; if on the other hand it is program information to be stored in the program section 103, then the program switch 181 is used to control the write-in gates 404.

The control of the columnar position of data entered into the data section 102 or the program section 103, when the record card reader 120 is used, is controlled by a commutator 124 (see FIG. 1b) which cyclically addresses each of the 80 column drive line 105 and applies one half of the write current required to switch a magnetic core (e.g. 113 or 114) of the memory 101. The particular magnetic cores set depends upon which of the x-line write drivers 130 and 131 have been operated. The x-line write drivers 130 and 131 also supply one half the write current required to switch a magnetic core. The stepping of the commutator 124 is controlled via a line 124c which links the control device 438 of the record card reader 120 (see FIG. 4) to the commutator 124. The wiper (not shown) of the commutator 124 may have impressed upon it the output of a readout source 125 (see FIG. 1b) capable of supplying all the current required to switch a magnetic core by operating a gate 125a (see FIG. 1b) or the output of a write source 126 (see FIG. 1b) capable of supplying one half the required switching current by operating a gate 126a (see FIG.1b). Also coupled to the data section 102 via line 107 are two inhibit sources 135 and 136 (see FIG. 1b) selectively operable to prevent the readout of information from the data section 102. The output from the data memory 102 is provided along twelve data sense lines 110 to twelve data temporary storage flip-flops 137–12 to 137–9 via twelve gates 110a. Flip-flop 137–12 to 137–9 (see FIG. 1b) serve to temporarily store the information read from the data section 102, and permit its re-entry into the data section 102. The twelve data temporary storage flip-flops 137 are also coupled to the punch actuators 138 of the punch 139 to permit a punching of the data readout. The write back of the information read from the data section 102 is accomplished by applying the output of the data temporary storage flip-flops 137 to the write-in gate 402 to operate the x-line data write drivers 130 to apply the switching current to the magnetic cores of the data section 102 via the data x-write lines 109. In the event, however, that it is not desired to write back data stored in the data section 102, the output of the data section 102 is not permitted to set the data temporary storage flip-flop 137, and the data is lost. This is accomplished by preventing the operation of gates 110a (see FIG. 1b) in response to the erase signal. The output of the program section 103 may also be temporarily stored by means of a set of program temporary storage flip-flops 115, 116, 117 and 118 (see FIG. 1b) which receive the outputs of the program section 103 via the program sense lines 112. The program temporary storage flip-flop 115 receives the information from the first or 12 row of the program section 103, the flip-flop 116 receives the information from the second or 11 row, the flip-flop 117 receives the information from the third or 0 row, and the flip-flop 118 receives the information from the fourth or 1 row. The outputs of the program temporary storage flip-flops 115 through 118 may be written back into the program section 103 via a set of lines to the program write-in gates 404, and returned to the program section 103 at the locations from which they were read. By control of the program write-in gates 404, this information may be either written back or destroyed as is desired.

During keyboard entry of information, the commutator 124 is not used for column selection purposes. Instead a second alternative method of column selection is employed. This method consists of the selection of a single column employing the column select-group select technique which will be described below. The column select-group select method employs an electronic counter 300 (see FIG. 1c) which consists of two complete 10 stage counting chains, a column counter 300a containing ten flip-flop stages C1, C2, C3, C4, C5, C6, C7, C8, C9 and C0 and a group counter 300b containing ten flip-flop stages G2, G3, G4, G5, G6, G7, G8, G9, G0 and G1. The outputs of the column counter 300a are applied to column line driver selection AND gates 164 and 172 (see FIG. 1c), the outputs of which are applied to ten column line drivers 132 or 133 (see FIG. 1c) and thence to a column drive line 104. The outputs of the group counter 300b are fed via group line driver selection gates 160, 161 and 162 to eight group line drivers 134 (see FIG. 1c) whose outputs are applied via the group drive lines 106. The specific manner in which the column and group line selection technique is accomplished will be explained with reference to FIGURE 2 below.

The electronic counter 300 is advanced by the advance signals applied to the advance input terminal 301 by the control gates etc. 405. The control gates 405 provide necessary control signals for the device during many of the operations and is described in detail with respect to FIGURES 5a and 5b. The column counter 300a will advance on successive advance signals until column counter flip-flop C9 is set. The set output of column counter flip-flop C9 will be applied to one input of gate 320. The next advance signal will pass through gate 320 causing the group counter 300b to be advanced and will set the column counter flip-flop C0 while resetting the column counter flip-flop C9. This operation will be repeated every tenth advance signal. Thus the column counter will represent the units digit of the count while the group counter will represent the tens digit of count of counter 300.

In addition to advancing the counter 300, it is also possible to reduce the count of counter 300 by one count. Such a reduction of count will be referred to as decrementing and is accomplished by the application of back space signals BS to the back space input terminal 302 due to the closing of the back space key 193. The column counter 300a receives the back space signal from back space input terminal 302 and is decremented for each back space signal it receives. When it is decremented such that the count goes to 0 the column counter flip-flop C0 is set and applies a signal to gate 321. If a further back space signal is applied this signal will pass through gate 321 causing the back spacing of the group counter 300b, the setting of column counter flip-flop C9 and the resetting of the column counter flip-flop C0.

Both the column counter 300a and a group counter 300b are reset signals applied as a result of the closing of the home key 194 or the output of gate 322 applied to reset input terminal 303. When the counter 300 is reset, the column counter flip flop C1 and the group counter flip-flop G1 are set and all others are reset as will be described below. Gate 322 is operated by the set outputs of column counter flip-flop C1 and group counter flip-flop G9 indicating a count of 81. Each of the special keys 190 through 196 and 230 apply their output signals to control gates 405, the functions of which will be described in detail below with reference to FIGURES 5a and 5b. The control gates 405 also receive an output on the line 140 from the keyboard encoder 122 to indicate that a key has been depressed on the keyboard 121. The signal will be provided on the line 140 regardless of which key has been depressed, so long as some key has been depressed.

GENERAL DESCRIPTION OF FUNCTIONS

Having described in a general fashion the main components of the key punch, the operations of the key punch will now also be set forth in a general fashion.

In the following description program information will be entered into the memory 101 (see FIG. 1b) by means of the record card reader 120 (see FIG. 1a) and data will be entered by means of the keyboard 121. (See FIG. 1a.) It should be understood however that both program information and data may be entered into the memory by means of either the card reader 120 or the keyboard 121.

In the skip operation, it is desired in those columns which contain the skip operation instruction to erase all of the information in the data section 102, and the program section 103 and write back and restore in the program section 103, the program information read therefrom while preventing the storage of data in the data section 102. In those columns which are not to be skipped, as indicated by the absence of the skip operation instruction or which contain some other instruction data from the keyboard 121 may be stored in the data section 102 after the program information is restored in the program section 103. This is to say, if the stored program information for the columns 1 through 10 indicate a skip operation, no data will be entered in the data memory positions corresponding to the columns 1 to 10 and any previously stored data in these columns will be erased. If in column 11, the program indicates that data is to be entered at this point, information from the keyboard 121 may be entered into column 11 of the data section 102 of memory 101. Thus when the loading of the two memory sections is completed the data section will only have data stored in those columns which must be punched in the record cards. Those columns for which a skipping operation is to take place will be empty. The program memory will retain the program information which controlled the keyboard entry until the next entry of program information from the record card reader 120. On the subsequent punching operation, the memory 101 will control the entire operation without further reference to the keyboard 121, the record card reader 120 or the stored program in program section 103.

In the duplication operation, it is desired to erase both the data section 102 and the program section 103 and cause the write back and restoring of the read out data in the data section 102 and the read out program information in the program section 103. By means of the duplication operation, data stored as a result of the reading of a master or duplicating card may be retained and punched into one or more record cards during ensuing punch operating cycles. Automatic switch 230 together with the stored program information will determine whether the skip or duplicate operation is to be carried out automatically or will require operator initiation.

In the step operation, the step key 192 is employed to advance the counter 300 to overcome any excess back spacing thereof. It will serve to preserve the stored data, prevent the entry of new data, and will advance the counter 300 to address the next memory column.

The backspace operation employing back space 193 permits the decrementing of the counter 300 to permit the readdressing of the column into which data was previously entered so that information erroneously entered into the data section 102 by means of the keyboard 120 may be erased and the proper data then recorded. The contents of the particular column of the data section 102 is erased and write back not permitted while the program section 103 is erased and its stored contents returned to its former positions. The reset or home key function, employing the home key 194 serves as a general reset for the circuits of the keypunch. It causes the counter 300 to be set to its initial states and causes the readout of the first program step. The punching initiation or card feed operation employs the card feed key 195 to manually initiate a punch cycle. It causes the readout of the data and program sections of the memory 101 and the restorage of the contents thereof as well as the operation of the punch. In the clear operation the clear key 196 is employed to reset the interlock flip flop 207 (contained within the control gate 405 and set forth in greater detail in FIGURE 5b). The interlock flip flop 207 is set if a keyboard key is depressed during a punch operation and the program step for the column into which the keyboard data is to be entered is a manual or automatic skip or duplication operation, as will be described in detail below.

After the data section 102 of the memory 101 has been loaded with all the data that is to be punched in a record card in the punch 139 the punch operation may be initiated. The punch operation may be initiated manually by depressing the card feed key 195 or automatically in response to the output of the gate 322 (see FIG. 1c) indicating that the counter 300 (see FIG. 1c) has arrived at the 81st count and that the data section 102 is completely loaded. Both the card feed key 195 and the gate 322 will start the punch mechanism 139 (see FIG. 1b). The punch operation will proceed under the control of the commutator 124 in a column by column manner. During the punch operation, as the contents of certain columns of the data section 102 are punched out these columns are then made available for loading of further data for the next punch operation. The counter 300 and the various drivers 130, 131, 132, 133 and 134 control the entry of new data into data section 103 as described above. Interlocks are provided to prevent the cycling of the memory 101 in such a manner as to destroy data not as yet punched.

Reference will now be made to some of the specific circuits employed in this device in order that a better understanding of their operation and function may be had.

Turning to FIGURE 2, the general arrangement of the memory 101 is illustrated. In addition, the arrangement of the group and column drives are further illustrated.

There is shown in FIGURE 2, a portion of the magnetic core memory 101 which is capable of storing all the information which can be stored in an 80 column record card as well as all the information which can be stored in rows 12, 11, 10 and 1 of a program card. The memory 101 comprises a data section 102 for storing data, to be punched in the record card. Data section 102 contains nine hundred and sixty magnetic cores 113, which are arranged into eighty columns of twelve rows. These columns and rows correspond to the columns and rows of a standard eighty-column card. Further the memory unit 101 contains a program section 103 in which instructions are stored. These instructions are not to be punched into the record card and constitute the control for certain operations such as skip, duplicating, shift from numerical input to alphabetical input, etc. The program section 103 contains three hundred and twenty magnetic cores 114, which are arranged into 80 columns of four rows. These columns and rows will be employed to store the first four rows of a standard 80 column program card, that is rows 12, 11, 0 and 1, as will be described below with reference to FIGURE 6.

The entire memory unit 101 is divided into 8 groups, I to VIII, of ten columns and 16 rows each. Group I is arranged to store the contents of record card columns 0 to 9; Group II is arranged to store the contents of columns 10 to 19, etc. In order to avoid an additional group for the column 80, the otherwise unused column 0 of the group I can be employed to store the contents of column 80. Every column of magnetic cores of the memory unit 101 is coupled to individual column select lines 104, column drive lines 105 and group select lines 106. Each of the lines 104, 105 and 106 pass through the data section 102, as well as through the program section 103.

In an effort to minimize the number of drivers which are required to operate the memory 101, certain of the selection lines are connected in common to a single drive source. Thus all of the group select lines 106 for the columns of Group I are connected together and in turn to a single group line driver 134. In the same manner each of the group select lines 106 for each of the columns of the Groups II and VIII are commoned and brought out to group line drivers II, III etc. The group line drivers 134 are each arranged to supply the magnetic cores in their groups with one-half of the current required to switch the magnetic cores 113 and 114. Thus without a further driver source, no core may be switched.

The column select lines 104 are combined in the following manner: the column select lines of the first columns of magnetic cores in each of the Groups I to VIII are connected in common to column line drivers 132 and 133. The column line drivers 132 and 133 for the first storage column of each group is designated column I line driver 132, 133. The column line driver 133 will be employed during a readout operation whereas the column line driver 132 will be employed during a write in operation. In a similar manner, the column select lines of the second columns of magnetic cores in each of the groups I to VIII are connected in common and to column II line drivers 132 and 133. The remaining columns are connected in a similar manner. The column line drivers 132 and 133 each supply their associated magnetic cores 113 and 114 with one-half current required to switch them.

If it is desired to read out a magnetic core in column 11, then the Group II line driver 134 is operated as well as the column II line driver 133. Only the magnetic cores in Group II and column II have sufficient current applied to their windings to switch them and this is done without respect to a second selection plane. In order to write into a magnetic core in column 11, then the Group II line driver 134, the column II line driver 132 and the x-write drivers 130 and 131 are employed for a two plane selection. Although during the write-in operation one and one-half times the normal switching current is available, provision is made to cause the application of one-half of the selection current in an opposite polarity to cause cancellation of the unwanted current in certain columns, as will be explained in detail below.

The eighty column driver lines 105 are connected respectively to eighty separate segments of the commutator 124 designated 124b-0 to 124b-79 respectively (see FIG. 5). These commutator segments receive readout current from a readout driver 125 and write current from a write driver 126. The readout driver 125 provides all of the current required to switch a magnetic core whereas the write driver 126 provides only one-half of the current required to switch the magnetic cores 113 and 114. Each of the rows of magnetic cores 113 of the data section 102 are further connected to a separate x-line data write driver 130 via an x data write line 109. Each of the rows of magnetic cores 114 of the program section 103 are further connected to a separate x line program write driver 131 via an x program write line 111. Thus to switch a core 113 or 114 when operating with the commutator 124, it is necessary for the write driver 126 to apply one half of the selection current via the commutator 124 to the column drive line 105 and for one of the x-write drivers 130 or 131 to be operated to supply the remaining one half of the selection current.

The x data write lines 109 correspond respectively to the twelve rows of the record card, namely 12, 11, 0, 1, 2, 3, 4, 5, 6, 7, 8 and 9 whereas the x program write lines 111 correspond to the first four row positions of a record card, namely 12, 11, 0 and 1.

Each row of magnetic cores 113 of the data section 102 is also coupled to a separate x data sense line 110. The x data sense lines for the rows 12, 11 and 9 are shown. Not shown are the remaining x data sense lines 110 for the rows 0, 1, 2, 3, 4, 5, 6, 7 and 8 corresponding to the rows of a standard 80 column record card. Each row of magnetic cores 114 of the program section 103 is coupled to a separate x program sense line 112. The x program sense lines for the rows 12 and 1 are shown. Not shown are the remaining x program sense lines 112 for the rows 11 and 0 corresponding to the first four rows of a standard 80 column record card.

As stated above, signals on the twelve x data sense lines 110 may be passed via twelve gates 110a to twelve data temporary storage flip flops 137. The passage of these signals through the gates 110a may be prevented by the application of an erase signal to the second input of the gates 110a. This erase signal is provided by the set output of the write flip flop 148 (shown on FIGURE 5a) connected thereto. The signals from the program section 103 are passed via four x program sense lines 112 directly to four program temporary storage flip flops 115, 116, 117 and 118.

The magnetic cores 113 of the data section 102 in addition to the other windings noted above also have a common inhibit winding connected by line 107 to the inhibit power drivers 135 and 136. The inhibit power drivers 135 and 136 supply sufficient current to the magnetic cores 113 to prevent their being switched during an erase or readout operation regardless of what other drivers are operated. There are no similar inhibit windings for the cores 114 of the program section 103. The write-in of information into certain program positions may be prevented by the use of the group line drivers 134 as will be described below.

Figure 3:
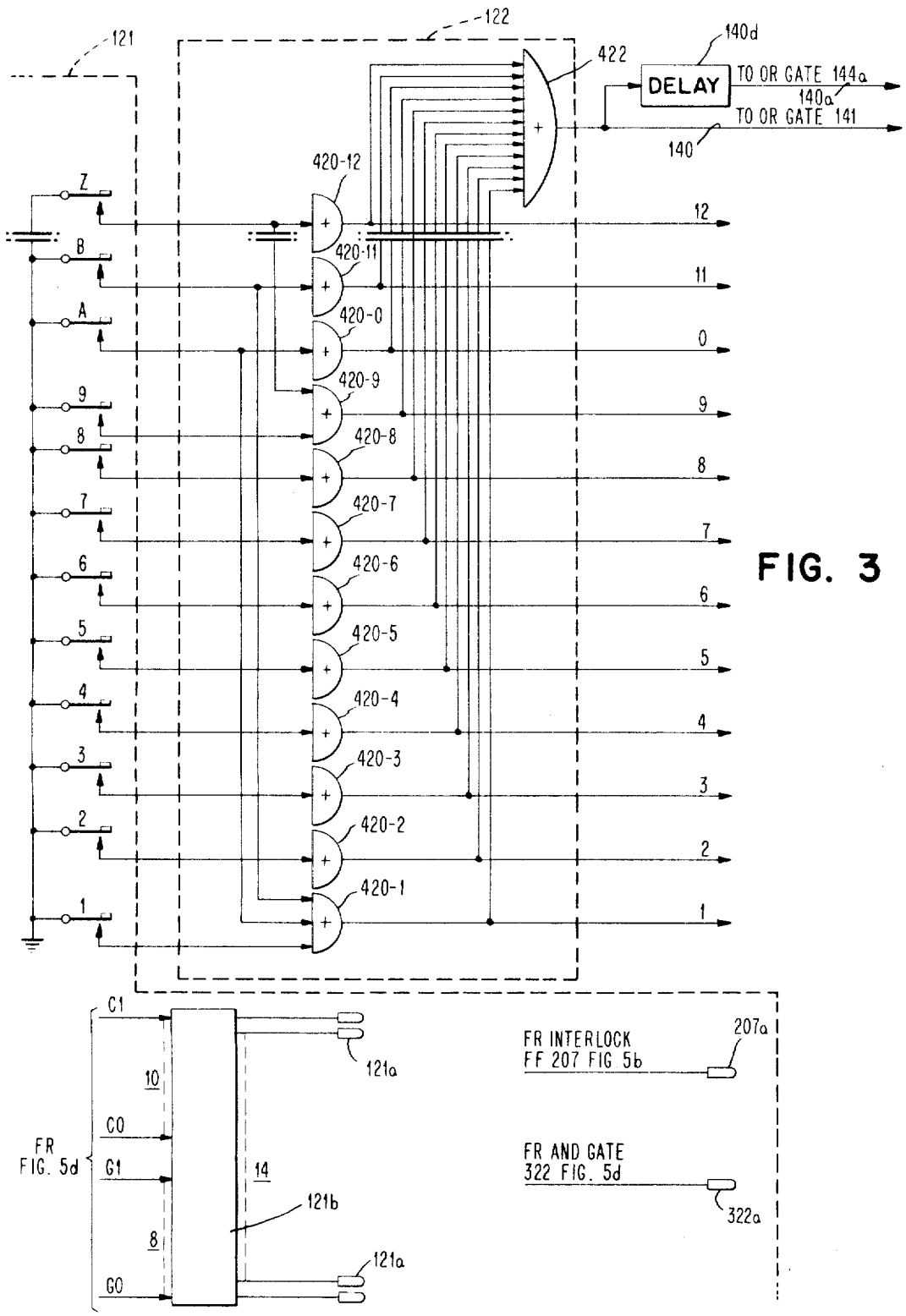
FIGURE 3 illustrates an exemplary form of the keyboard and keyboard encoder employed with the instant invention.

Turning now to FIGURE 3 there is shown a highly simplified schematic diagram of the numeric and alphabetic entry keys of the keyboard 121 and the encoder device 122. The keys 1 through 9 are shown, as are the alphabetic keys a, b, c and z. These keys represent only a portion of the total number of keys which may be included on the numeric and alphabetic entry portion of the keyboard 121. The keyboard normally would be fitted with a sufficient number of keys to cover the entire numeric characters 0 through 9, the alphabetic characters a through z, and other symbols required, such as the plus, minus, dash, question-mark etc. Each key is connected to the movable contact of a normally closed switch, held in the normally closed position by a spring biasing member. When the key is depressed, it will open the normally closed circuit path and close the normally open path. Upon release of the key the movable contact will return to its former normally closed position. When closed, the switch will apply ground to the normally open contact which is passed to the corresponding one of a series of OR gates 420–1 to 420–9 and 420–0, 420–11 and 420–12. Similar OR gates 420 will be employed for each of the remaining characters and symbols placed on the keyboard 121. For the keys 1 through 9 direct connections are made with but a single OR gate 420 and the outputs of the OR gates 420 are directly fed to the output lines marked 1 through 9. These output lines correspond to the lines 122b–1 to 122b–9 in FIGURE 5. The remaining alphabetic characters, A, B through Z and the symbols are connected to more than a single OR gate so that they may provide an output signal which will be indicative of the coded value of the alphabetic or symbolic character. For example, the character A may be represented by a code value having a zero zone position as well as a 1 row position. In a similar fashion, the letter B may be represented by a code value having an 11 zone position, and a 1 row position. These code choices are arbitrary and may be made at any desired fashion. The character Z is arbitrarily represented by a code value having a 12 row position, and a 9 row position. Thus a single code unit will indicate a numeric value while a double code unit, that is one code unit, in the numeric portion from 9 through 1, and a further code unit in the zone portion 12, 11 or 0 will indicate an alphabetic character or a symbol. Thus the depressing of an alphabetic key such as the A will result in the operation of OR gates 420–1 and 420–0. The outputs of the OR gates 420–0, 420–11 and 420–12 will appear on the lines 122b–0, 122b–11 and 122b–12. The output of each of the OR gates 420 will also be connected to a further OR gate 422, which provides an output on the line 140. A signal will be provided on the line 140 when any of the keys on the keyboard 121 have been depressed. The purpose and use of this signal on the line 140 will be described later in greater detail with respect to FIGURE 5. The output of the OR gate 422 is also passed to a delay 140d to provide a signal on the line 140a after sufficient time has elapsed for the signal on line 140 to operate the necessary circuit elements. The output of delay 140d is passed to the OR gate 144a.

There are also a plurality of indicator lamps 121a found on the keyboard 121 and connected to the set outputs of the column counter flip flops C1 to C0 and to the set outputs of the group counter flip flops G1 to G0 of counter 300 (see FIGURE 5d). These indicator lamps serve to advise the operator of the memory columns being addressed.

Figure 4:
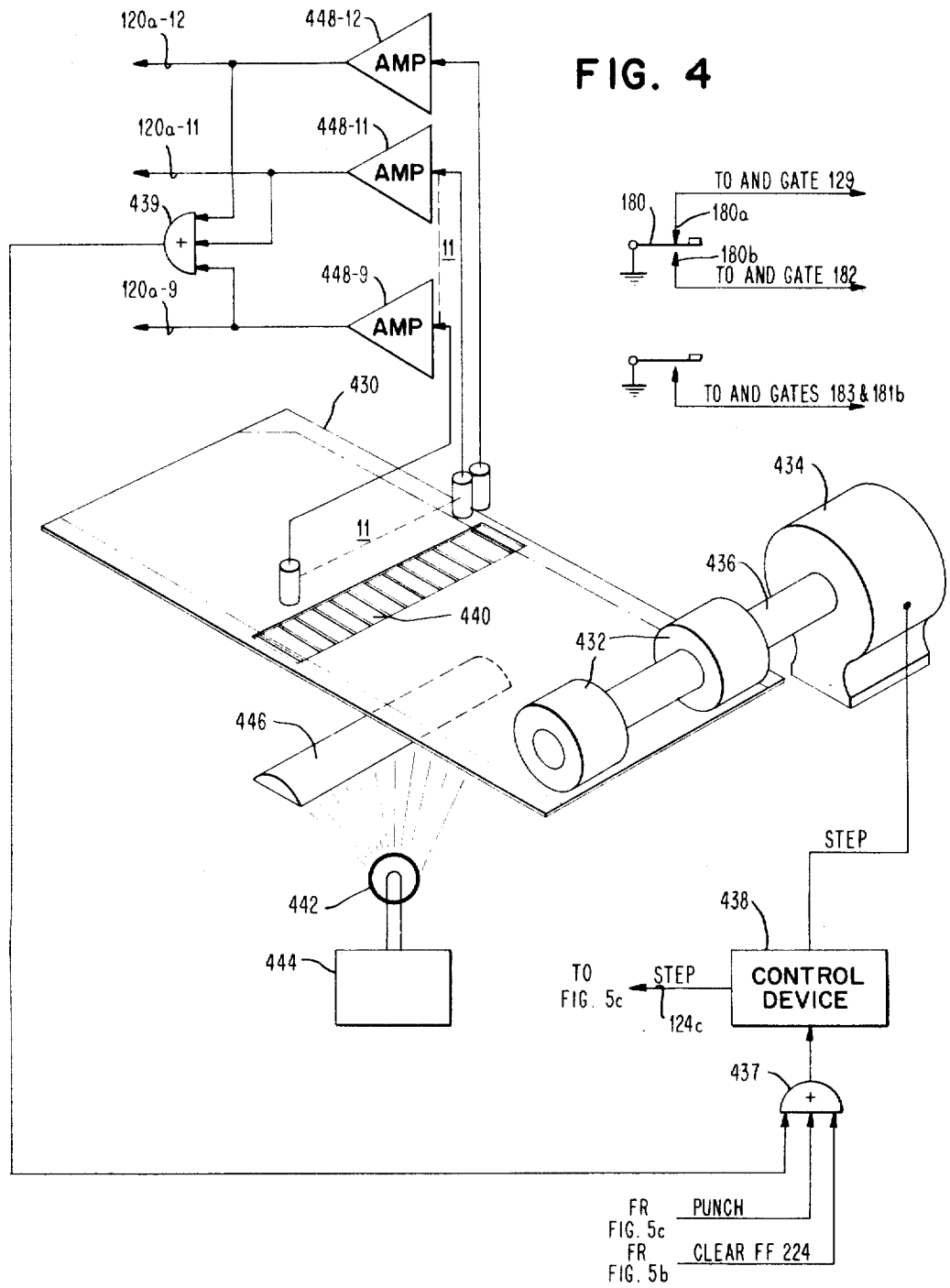
FIGURE 4 illustrates an exemplary form of the record card sensing device employed with the instant invention.

Referring to FIGURE 4, there is shown a highly simplified version of a serial record card reader 120 employing photoelectric cells for reading purposes. The device consists of a record card passage 430 along which the record card is passed. A set of advancing rollers 432 are placed above and below the record card as it moves through the record card passage 430. The top rollers 432 are illustrated being driven by a motor 434 (fitted with a one revolution clutch) and connected thereto by means of a shaft 436. The rollers 432 placed below the record card as it lays in the record card passage 430 are similarly driven but are not shown in the figure. The motor 434 is driven by means of a control device 438 which provides signals to step the motor 434 one column position at a time. The control device 438 also provides the step signal on the line 124c to step the commutator 124 (see FIGURE 5c). The control device 438 receives input control signals from OR gate 437 which in turn receives inputs from (1) the punch mechanism (not shown) each time the record card is advanced; (2) the output of OR gate 439 which is responsive to the outputs of the read amplifiers 448–12 to 448–9 to indicate when a column has been read out and that the record card reader 120 may advance a card within it to the next column; (3) and the set output of the card feed flip flop 224 (see FIG. 5b) which initiates a punch operation, to provide the first commutator advance before the punch mechanism takes over stepping control.

As the record card is advanced in the card passage 430, it is caused to pass under a bank of twelve photo cells 440, one of which is provided for each of the twelve row positions of the column. It should be noted that the card illustrated is being read in the so called "serial" manner, that is, presenting each of the row positions of a single column at each time. The key punch is not limited to the use of a record card reading device operating in the serial manner, but may be employed with devices reading all of the column positions, in a single row with suitable changes in the equipment and increases in the number of photocells and amplifiers. The record card is illuminated from below the record card passage 430 by means of a lamp 442 which is controlled by a power supply 444. The light from the lamp 442 is passed via a lens 446 to the bottom surface of the card passage 430. The light is permitted to pass through apertures in the record card passage 430 (not shown) through the punches in the record card and thence effect the photo cells 440 placed thereabove. The outputs of the various photocells 440 are fed in turn to amplifiers 448–1 to 448–12 to provide output signals on the output lines 120a–12 to 120a–1. The outputs on the lines 120a–12 to 120a–1 correspond to the row positions 12, 11, 0, 1, 2, 3, 4, 5, 6, 7, 8, and 9. The duplicate switch 180 and program switch 181 are also included on the record card reader 120. Their manner of construction and operation will be described below with reference to FIGURE 5c. Any other suitable form of reader whether it be by brush or photocell may be employed with this device without departing from the scope of the invention.

*The counter 300*

The counter 300 as shown in FIGURE 5d consists of a column counter 300a comprised of ten column flip flops C1 to C9 and C0 (of which only C1, C2, C3, C9 and C0 are illustrated for simplicity) to control the ten column selection lines 104 via the column selection AND gates 172 and 164 (FIG. 5c) which in turn control the column drivers 132 and 133 of the memory 101. Counter 300 further consists of a group counter 300b comprised of ten group flip flops G1 to G9 and G0 (of which only G1, G2, G3, G9 and G0 are illustrated for simplicity). The outputs of the group flip flops control the eight group selection lines 106 of the memory 101 via the group selection AND gates 160 and 162, the OR gates 161 and the group drivers 134. The flip flops of both the column and group counters 300a and 300b, respectively of the counter 300 may take any well known form and consist of transistor, thin film triode or other similar elements.

The counter advance input terminal 301 of the counter 300 is connected to the output of the counter advance OR gate 229 (FIG. 5b) which receives the outputs of two AND gates 206 and 228. The output of the OR gate 229 furnishes the advancing signal required to advance the counter 300 step by step in order that the memory 101 be sequentially addressed to each of the columns 1 to 80. The back space input terminal 302 is connected to the set output of the Schmitt trigger 221 (FIG. 5b) and receives a back space signal BS, which is required to decrease the count of counter 300 by one step for each back space signal BS. Such back spacing is required to permit errors to be corrected as set out above. The reset input terminal 303 is connected to the set output of the home flip flop 223 (FIG. 5b) which furnishes a reset signal to set the counter 300 to its initial count condition whereby column one of memory 101 will be addressed.

Each counter stage of the column counter 300a with two exceptions, is constructed in a similar manner and therefore only a single stage will be considered. For the purpose of illustration the circuits associated with the column flip flop C2 will be described. The set input of flip flop C2 is connected to the OR gate 311 which in turn receives the output of the two AND gates 312 and 313. One input of the AND gate 312 is connected to the counter advance input terminal 301 for receiving advancing pulses from the counter advance OR gate 229 and the other input is conneced to the set output of the preceding flip flop C1. The first input of the AND gate 313 is connected to the back space input terminal 302 and receives back space pulse BS from Schmitt trigger 221 while the other input is connected to the set output of the succeeding flip flop C3.

The reset input of the column flip flop C2 is connected via the OR gate 315 to the outputs of the AND gates 316 and 317, and to the reset input terminal 303. One input of the AND gate 316 is connected to the set output of the preceding column flip flop C1, a second input is connected to the set output of the flip flop C2, and the third input, an inhibitory input, is connected to the advance input terminal 301. One input of the AND gate 317 is connected to the set output of the column flip flop C2, a second input is connected to the set output of the succeeding flip flop C3, and the third input, an inhibitory input is connected to the backspace input terminal 302.

It should be noted that the first column counter stage C1 differs from column counter stage C2 in that the reset input terminal 303 is connected to the OR gate 311 of column counter stage C1 and not to the OR gate 315, as with column counter C2. This is done because the column counter 300a is not reset to the value 0, but to the value 1 to address column 1 of the memory 101, since the zero column is either not used or used to store the 80th column of a record card.

The advancing signals for the group flip flops G1 to G9 and G0 are derived from an AND gate 321. One input of the AND gate 321 is connected to the advancing pulse input terminal 301, whereas the other input is connected to the set output of the flip flop C9. Thus when the column counter 300a arrives at a count of nine the next advance pulse will produce an output from AND gate 321 to advance the group flip flops. There is a further AND gate 320, one input of which is connected to the back space input terminal 302 whereas the other input is connected to the set output of flip flop C0. Thus AND gates 321 and 320 furnish the advancing or back space pulses for the group flip flops G1 to G9 and G0.

The design of the stages G2 to G9 and G0 of the group counter 300b are of the same design as described above with reference to stage C2. The stage G2 (see FIG. 5d) will be described now in greater detail. The set input of the group flip flop G2 is connected to AND gates 312a and 313a via an OR gate 311a. The AND gate 312a receives at a first input the set output of the previous flip flop G1 and at the second input the carry signal from the AND gate 321. The AND gate 313a receives at a first input the set output of the next succeeding group counter stage G3 and at the second input the subtractive output of the AND gate 320. The reset input of the group flip flop G2 is connected via an OR gate 315a to the outputs of a set of AND gates 316 and 317. The OR gate 315a also receives a reset signal from the reset input terminal 303. AND gate 316a receives at one input the set output of the group flip flop G2, at a second input the set output of the preceding group flip flop G1, and at its third input, an inhibitory input, the signal on the advance input terminal 301. AND gate 317 receives the set output of both of the group flip flops G2 and G3, and as an inhibitory input the back space signal BS at backspace input terminal 302.

Stage G1 is constructed in a fashion similar to the stage C1 that is, OR gate 311a connected to the set input of flip flop G1 receives a reset signal from the reset input terminal 303 rather than having the reset applied to the OR gate 315a as with group flip flop G2. This alteration is required in that the group counter 300b must also be reset to 1, as is true of the column counter 300a. Thus counter 300 is in its reset state when column counter flip flop C1 and group counter flip flop G1 are both in their 1 or set states and all other group counter and column counter flip flops are in their 0 or reset states. As stated above, this count condition will address column 1 of the memory since the 0 column is not used or used to store the contents of the 80th column of a record card. It must further be noted that the set output of the column flip flop C1 and the set output of the group flip flop G9 are fed to an AND gate 322. The output of AND gate 322 is connected to the output terminal 304 and in turn via OR gate 222 to the set input of the home flip flop 223. The set output of the home flip flop 223 (FIG. 5b) is applied to the reset input terminal 303 (FIG. 5d) to control the resetting of the counter 300 when the eighty first column is reached and the card feed is being automatically controlled.

The operation of counter 300 (FIG. 5d) will now be set forth. When the counter 300 is reset by the set output of the home flip flop 223, (see FIG. 5b) via the reset input terminal 303 and OR gates 311, 311a, 315 and 315a, the flip flops C1 and G1 will be set to their one states whereas the remaining flip flops of both the column and group counters will be reset to their zero states. The set output of column flip flop C1 is, as set forth above, applied to one input of AND gate 312 for column flip flop C2. In order to advance the count of the counter 300, it is necessary to apply an advancing pulse to the advance input terminal 301 from OR gate 229 (FIG. 5b). Assuming an input is applied to the OR gate 229, a signal will be applied to advance input terminal 301 (FIG. 5d). The AND gate 312 at the set side of the column flip flop C2 will be enabled and set the column flip flop C2. As column flip flop C1 is still set and applies a signal to one input of AND gate 317 at the reset input of column flip flop C1, the signal from the set output of the column flip flop C2 will operate this AND gate 317 and reset the column flip flop C1. It should be noted that a backspace signal BS is not available at this time, and thus the inhibitory input of AND gate 317 does not receive a signal to prevent the operation of the AND gate 317. The AND gate 316 at the reset input of the column flip flop C2 will not be permitted to reset the column counter flip flop C2, despite the application of the set outputs of the column counter flip flops C2 and C1 to its inputs because of the presence of the inhibitory input from the advance input terminal 301 at its third input. The group counter flip flops will remain unchanged. In a similar manner, the next advancing pulse will set the column flip flop C3 and then reset the column flip flop C2. With each of the six subsequent advancing pulses, the next following flip flop of the column counter 300a will be set and the preceding flip flop reset until flip flop C9 is set.

With column flip flop C9 set, its set output is applied to one of the inputs of AND gate 321 and thus the next advancing pulse, which is applied to the second input of AND gate 321 will operate the AND gate 321. The output of AND gate 321 will be applied via an AND gate 312a, which also receives the set output of group flip flop G1 to the OR gate 311a to set the group flip flop G2. When the group flip flop G2 is set, its set output is applied to AND gate 317a of the group flip flop G1. Because group flip flop G1 is still set, it furnishes an enabling signal to the other input of gate 317a which is not inhibited at this time due to the absence of the backspace signal BS at its inhibitory input. AND gate 317a then applies a reset signal via the OR gate 315a to reset the group flip flop G1. Group flip flop G2 will not be reset despite the presence of the set outputs of group flip flops G1 and G2 at the inputs of AND gate 316a because of the presence of the inhibitory input from the advance input terminal 301.

At the same time as the group flip flop G2 has been set and group flip flop G1 has been reset, column flip flop C1 has been set and column flip flop C0 reset as described above. Accordingly, at this time flip flops C1 and G2 are now set. Counting as has been set forth will continue with each advance signal to advance input terminal 301 until the flip flops C1 and G9 are set. The set outputs of these flip flop enable the AND gate 322 whose output is applied via OR gate 222 to set the home flip flop 223 (FIG. 5b) which in turn applies the reset signal to the reset input terminal 303 to reset the couner 300. It should be recalled that all of the column flip flops C2 to C9 and C0 and all the group flip flops G2 to G9 are reset to their zero states and that the column flip flop C1 and the group flip flop G1 are set to their one states.

As set out above, the counter 300 may also be counted down or backspaced. It shall be assumed that the counter 300 is addressing column 10 of the memory 101, (FIG. 5c) and therefore the column flip flop C0 and the group flip flop G2 are set. It should be recalled that the memory 101 is divided into 8 groups of 10 columns each and that all similar columns of each group are interconnected and that column 10 is the first column in the second group. When a back space signal BS is applied to the back space input terminal 302 (FIG. 5d) from the set output of the Schmitt trigger 221 set in response to the back space key 193 (see FIG. 5b), it will enable the AND gate 320 (FIG. 5d). The second input of AND gate 320 receives a signal from the still set column flip flop C0. The output of the AND gate 320 enables the AND gate 313a of group flip flop G1, which also receives the set output of the group flip flop G2 to pass a set signal via OR gate 311a to the set input of the group flip flop G1 to set it. Because group flip flops G2 and G1 are now set they apply inputs to the AND gate 316a at the reset input of group flip flop G2. Due to the absence of an inhibitory input from the advance terminal 301, the AND gate 316a is operated to pass a signal via OR gate 315a to the reset input of group flip flop G2 to reset it. As a result of the presence of the back space signal BS at the inhibitory input of AND gate 317a from group flip flop G1, AND gate 317a fails to pass a signal to reset group flip flop G1.

At the same time as the back space signal BS is applied to the AND gate 320 for the group counter, it is also applied to the AND gate 313 of the column flip flop C9. At this time flop flop C0 is still set and applies the second input to the AND gate 313 to operate it to apply a signal via the OR gate 311 to set the column flip flop G9. With column flip flop C0 and C9 set, the AND gate 316 of column flip flop C0 is enable and applies a reset signal via the OR gate 315 to reset column flip flop C0. The absence of an input signal at the advance input terminal 301 prevents the application of an inhibit signal to the AND gate 316 for the group flip flop C0 and it is reset but the presence of the input signal at the back space input terminal 302 inhibits the AND gate 317 at the input of group flip flop C9 from passing a reset signal. Therefore, after applying the back space impulse back space input terminal 302, the column flip flop C9 and the group flip flop G1 are now set. With these flip flops set, the counter 300 addresses column 9 of the memory. In similar fashion another back space signal BS will set column flip flop C8 while group flip flop G1 remains set. Further back space signals will decrease the count until the original reset state is reached in which flip flops C1 and G1 are set and all other flip flops are reset.

ARRANGEMENT OF THE CONTROL CIRCUITS

Considering now FIGURES 5a, b, c, d, and e, connected and arranged as shown in FIGURE 5, the general organization and manner of operation of the device of the instant invention may be understood. As was set out above, information can be entered into the data section 102 or the program section 103 by means of either the record card reader 120 (FIG. 5c) or the keyboard 121 (FIG. 5a). The card reader 120 has 12 output lines 120a–12, 120a–11, 120a–0, 120a–1, 120a–2, 120a–3, 120a–4, 120a–5, 120a–6, 120a–7, 120a–8 and 120a–9, each one corresponding to one of the 12 row positions in a column of a record card, that is the positions 12, 11, 0, 1, 2, 3, 4, 5, 6, 7, 8, and 9. The section of the memory into which the information from the record card reader 120 will be entered will be dependent upon the closing of the duplicate switch 180 (FIG. 5c) or the program switch 181 (FIG. 5c) on the record card reactor 120. As was described above, the duplicate switch 180 is used for duplicating purposes and admits the data from the record card reader 120 (FIG. 5b) into the data section 102 of the memory 101. The closing of the program switch 181 will admit the information from the record card reader 120 into the program section 103 of the memory 101. For example, if a master or duplicating card is placed in the record card passage of the 430 card reader 120, as shown in FIGURE 4, then the duplicate switch 180 would be depressed. However, if a program card is placed therein then the program switch 181 would be closed. The program card and the master or duplicating card are readily distinguishable from one another as will be obvious from a description of FIGURE 6 showing such a program card. The program card employs merely the rows 12, 11, 0 and 1, whereas the data card may employ all rows.

The duplicate switch 180 grounded at one terminal is normally connected to terminal 180a which in turn is connected to a first input of AND gate 129 in the write back path of the data section 102. The remaining inputs to AND gate 129 are the timing signal SYN2 and the output of the data temporary storage flip flops 137. Thus when in its normally closed position, the duplicating switch 180 permits the write back of the previously stored data and when operated to open the normal connection will prevent the write back of such previously stored data. This is desired since the old data is to be destroyed when new data for duplication is to be stored. When the duplicating switch 180 is depressed, ground will be applied via contact 180b to one of the inputs of each of the twelve AND gates 182 (FIG. 5c) which control the transfer of data from the record card reader 120 to the data section 102 of the memory 101. In that each of the output lines of the record card reader 120 will be connected to the data section 102 in the same manner, only the output line 120a-12 and circuits of record card reader 120 for the "12" row is shown in detail. The remaining circuits are similar. The AND gates 182 also receive as inputs a synchronizing pulse SYN2, which is generated in a manner to be described below. The outputs of the AND gate 182 are connected to the inputs of twelve OR gates 174 whose outputs are applied to the respective x-line data write drivers 130 to control the entry of information from the record card reader 120 into the data section 102 of the memory via the data x-write lines 109. The x-line data write drivers 130, as were described with reference to FIGURE 2, each provide one half of the current required to switch a magnetic core 113 of the data section 102.

The program switch 181 grounded at one terminal is connected to one of the inputs of each of the four AND gates 183. The AND gates 183 are arranged to receive the outputs of rows 12, 11, 0 and 1 respectively, of the record card reader 120 as inputs, in addition to the synchronizing signal SYN2. The AND gates 183 produce outputs which are in turn connected via the four OR gates 184 to the input of one of the four x-line program write drivers 131 to control the input of information from the record card reader 120 into the program section 103 of the memory 101 via the program x-write lines 111. As was described above the x-line program write driver 131 provides one half of the current required to set or switch a core 114 of the program section 103.

To provide for column selection when data is read from a duplicating card or from a program card, or when data is to be punched into a card, a commutator 124 (FIG. 5c) is provided. The commutator 124 has 80 segments, 124b-0 to 124b-79, each connected to a separate one of the eighty column select lines 105. The wiper arm 124a of the commutator 124 is connected to the power drivers 125 and 126 and is cyclically advanced by the step signal from the control device 438 of the record card reader 120 via the line 124c (see FIGURE 4). The readout power driver 125 furnishes a clearing signal equal to all of the current required to switch a magnetic core 113 or 114 whereas the write power driver 126 furnishes one half of the current required to switch the magnetic cores 113 and 114 during a write operation. The actuation of the readout power driver 125 is controlled by the synchronizing signal SYN1 applied during timing pulse T1 time whereas the write power driver 126 is controlled by the synchronizing signal SYN2 applied during the timing pulse T2 time.

The synchronizing signals required for reading the duplicating and program cards or for clearing the memory for punch operations; that is SYN1 and SYN2 are provided by a set of AND gates 125a and 126a respectively connected at their outputs to drivers 125 and 126. The AND gate 125a is operated by the concurrent application of a STEP 1 signal and a T1 timing signal. The AND gate 126a is operated by the concurrent application of a STEP 2 signal and a T2 timing signal. The STEP 1 and STEP 2 signals are produced by the momentary opening of a set of contacts of cam operated switches 460a and 462a (see FIG. 5e) by the cams 460 and 462 mounted upon the shaft 401 and driven by the motor of the punch mechanism 139. The contacts of the switches 460a and 462a are normally closed and are opened once for each rotation of the shaft 401 corresponding to the punch operation for a single column. The shaft 401 will rotate continuously during the time the key punch device is on and thus will make the STEP 1 and STEP 2 signals periodically available. The STEP 1 and STEP 2 signals are only employed during a record card read operation by the record card reader 120 and during a punch operation by the punch mechanism 139 since both of these operations require the use of the commutator 124. During the keyboard entry of data from the keyboard 121 the electronic counter 300 is used for column selection and the commutator 124 must be disabled. This is accomplished by means of the solenoids 460b and 462b. When these solenoids are operated by the set output of flip flop 464, they withdraw the movable contact of their associate switches 460a and 462a from the path of their associated cams 460 and 462 and thus prevent the periodic generation of the STEP 1 and STEP 2 signals. Flip flop 464 receives at its set input the set output of the program read flip flop 152 (FIG. 5a) and at its reset input the set output of the card feed flip flop (FIG. 5b). As will be set forth below the program read flip flop 152 is set at the start of a keyboard entry cycle and thus sets the flip flop 464 to prevent the generation of the STEP 1 and STEP 2 signals. Flip flop 464 is reset by the set output of the card feed flip flop 224 when a punch operation is initiated and the STEP 1 and STEP 2 signals are again required. The cams which operate the switches 460a and 462a are so placed upon shaft 401 that STEP 2 is only generated after sufficient time has elapsed for the STEP 1 signal to cause the readout or clearing of the memory 101. The operation of the reset cams 225 and 211a with their associated cam operated switches 225a and 211b will be described below with reference to the punch operation.

In order to write information from the record card reader 120 into the illustrated magnetic cores 113, corresponding to column one of the data section 102, it is necessary (1) for the wiper arm 124a of the commutator 124 to contact the commutator segment 124b-1 related to that column; (2) that write power driver 126 be operated by the signal SYN2; (3) that the duplicate switch 180 be closed so as to contact 180b and (4) that record card reader 120 provide an output on the 120a-12 line. The write power driver 126 via the commutator 124 will supply one-half the switching current to the core 113. The signal on the line 120b-12 combined with the output of the duplicate switch 180 from contact 180b and synchronizing signal SYN2 will operate the AND gate 182 to provide an output to OR gate 174 which in turn will operate the x-line data write driver 130 and the data x-write line 109. x-line data write driver 130 provides the second one half of the switching current and the magnetic core 113 at this intersection will be switched. The remaining magnet cores 113 associated with column 1 will be set at the same time in accordance with information on the lines 120a-11, 120a-0 and 120a-1 through 9.

The timing signals for most of the input and output operations of the memory 101 other than those described, (SYN1 and SYN2) are provided by the timing pulse generator 123 (FIG. 5a). The clock frequency of this timing pulse generator is preferably 20 kc. At this frequency, the timing pulse generator 123, in combination with the electronic counter 300, as shown in FIG. 5d permits an extremely fast control of the program section 103.

Turning briefly to FIG. 7, the pulses provided by the timing pulse generators 123 and their relationships are shown. The pulses provided are labelled T1A, T1, T2A, T2, T3, T4A and E. As was noted above the memory 101 clear or read signal is provided by power driver 125 activated by the SYN1 signal generated during the timing pulse T1 time period and inputs to the memory 101 take place under control of the write power driver 126 actuated by the SYN2 signal generated during the timing pulse T2 time period. The T1 and T2 signals are regularly spaced repetitive pulses, at the basic clock rate (see lines $b$ and $d$). The T2 timing pulses are displaced in time with respect to the timing pulses T1 by an amount of time equal to that required to complete a memory clear or read operation. The timing pulses T1A and T2A (see lines $a$ and $c$) are approximately twice the duration of the pulses T1 and T2, and are arranged to terminate in synchronism with the pulses T1 and T2. The pulses T3 and T4 (see lines $e$ and $f$) are of the same duration and repetition rate as pulses T1 and T2 and are displaced by an amount of time equal to the time displacement of T2 from T1. Thus there will be a sequence of signals T1, T2, T3 and T4 of similar repetition rates and durations each displaced from the one before by the same amount. The timing pulse generator 123 further furnishes the pulses E and A (see lines $h$ and $g$) each of which extends for the period between the trailing edges of successive T3 pulses. The E pulse is terminated as the A pulse is generated and vice versa. The pulse E is used to gate the storing of data manually entered into the keyboard and to control the skip and duplicating operations, whereas the pulse A is used to gate the various circuits on a punch operation. Pulse generators of the type generally described above are well known in the art and may take the form of those described in U.S. Patents 2,687,473 and 2,854,574 both entitled Signal Cycling Device by J. P. Eckert et al. In order to determine which pulse in the pulse train is employed for each operation a number has been inserted within the pulse to indicate the number of the pulse with respect to the first pulse of that train employed during the operation. The notation used in the specification to indicate the particular pulse intended is the pulse train designator followed by a dash and a pulse count number. For example T3–3 would mean the T–3 pulse train and the third pulse in that train.

Returning now to FIGS. 5a to d, it can be seen that the keyboard 121 (FIG. 5a) is connected to a keyboard encoder 122. This encoder, as was described above with reference to FIGURE 3, provides signals representing data or program information to be stored in the data section 102 or program section 103, respectively, of the memory 101 (FIG. 5c) via the lines 122b–12 to 122b–0. Program information from the keyboard encoder 122 (FIG. 5a) will be fed via the lines 122b–12, 122b–11, 122b–0 and 122b–1 to a set of AND gates 181b (FIG. 5c) which also receive the output of the program switch 181. The output of the AND gates 181b are in turn fed to the OR gates 184 to operate the x-line program write drivers 131 as described above. Data from the keyboard encoder 122 will be fed via the lines 122b–12 to 122b–0 to the twelve AND gates 173. In addition to the signals on the lines 122b–12 to 122b–0, a further signal which indicates a keyboard key has been depressed is produced by the keyboard encoder 122 and passed via the line 140 to the OR gate 141. OR gate 141 (FIG. 5a) also receives as inputs the set outputs of the skip flip flop 201, the duplicate flip flop 214, the step flip flop 220 and the home flip flop 223 (FIG. 5b). The output of OR gate 141 is in turn connected to the set input of the Schmitt trigger 142. The set output of the Schmitt trigger 142 is connected to one input of the AND gate 143 which also receives the timing signals T4 and E. The fourth input to the AND gate 143 is an inhibiting input supplied by the set output of the skip store flip flop 204. The AND gate 143 has its output wired to the set input of the memory control flip flop 144. The set output of memory control flip flop 144 is wired to the AND gate 145 which receives at its inhibitory input the set output of the home flip flop 223 (FIG. 5b). The inhibitory input from flip flop 223 to gate 145 prevents the setting of the write flip flop 148 (FIG. 5a) during the skip and duplicate operations. When the write flip flop 148 is not set, the data in the data section 102 will be preserved for later write back. The output of AND gate 145 (FIG. 5a) is connected to the OR gate 146. The output of OR gate 146 is coupled via a capacitance 147 to the set input of the write flip flop 148. The write flip flop 148 controls both the readout of information and the storing of information into the selected column of the memory 101. The write flip flop 148 is reset by the output of AND gate 157, responsive to the concurrent application of the T3 and A timing pulses.

It is important to note that the capacitance 147 permits the write flip flop 148 to be reset by a signal from the AND gate 157 to its reset input even if the static signal from the OR gate 146 is present. The output of the write flip flop 148 is connected to the AND gate 149 which also receives the set output of the skip flip flop 204 and the timing signals A and T4. AND gate 149 provides an input to the OR gate 150, which in turn passes a signal via the capacitor 151 to the set input of the program read flip flop 152 (FIG. 5a). The program read flip flop 152 controls the readout and storing of information in the selected column of the program section 103 of memory 101. As will be evident from the description below the program read flip flop 152 causes the readout of the program section 103 while inhibiting the readout of the data section 102. The previous contents of the program section are then restored in its former location. The write flip flop 148 causes the readout of both the data section 102 and the program section 103. It is also responsible for the destruction of the stored data and the write back of the program contents into the program section 103.

Since both the program read flip flop 152 and the write flip flop 148 are responsible for readout and writing into the memory 101, they are both employed to control certain common circuit elements in addition to certain special circuits elements to be described. Thus, the set output of both the write flip flop 148 and of the program read flip flop 152 are connected to the OR gate 153 (FIG. 5b). The OR gate 153 has its output connected to the AND gate 154 (FIG. 5b) which controls memory readout and to the AND gate 155 (FIG. 5b) which controls the storing of information in the memory 101. AND gate 154 also receives as inputs the timing pulses E and T1A whereas AND gate 155 receives as inputs the timing pulses E and T2A. The AND gate 154 has its output connected to the group driver selection AND gates 160 (FIG. 5c) each of which has its output connected via an OR gate 161 (FIG. 5c) to a group driver 134 (FIG. 5c). The output of the AND gate 154 is further coupled to the input of an AND gate 163 (FIG. 5c) which also receives the timing signal T1. It should be recalled from the description of the commutator 124 above that memory readout occurs at time period T1, and this readout regardless of the source occurs at time T1. The output of AND gate 163 is wired to the ten column driver selection AND gates 164 (FIG. 5c). Each of these AND gates 164 has its output coupled to a column readout driver 133. The second input to the eight group driver selection AND gates 160 are provided by the group counter flip flops of counter 300b whereas the ten column driver selection AND gates 164 receive the outputs of the flip flops of the column counter 300a.

To prevent readout in the data section, when the program read flip flop 152 (FIG. 5a) is set, a circuit is provided, which comprises an AND gate 165 (FIG. 5c) which receives at one input the output of AND gate 154 (FIG. 5c) and at its second input the output of OR gate 215 (FIG. 5a). The OR gate 215 receives at its inputs the output of the duplicate flip flop 214, the output of the step flip flop 220 (FIG. 5b) and the output of the program read flip flop 152. Thus whenever the program read flip flop 152 is set and the readout conditions of AND gate 154 (FIG. 5c) are met, the AND gate 165 will be operated to prevent a data section readout as shall now be explained. The output of AND gate 165 is employed to operate inhibit power driver 136 to apply an inhibit current to all of the magnetic cores 113 of the data section 102 via line 107 (FIG. 5c). It should be recalled that only the data section 102 has inhibit windings. Necessary inhibiting for the program section 103 is provided by the group counter as will be described below.

The AND gate 155 (FIG. 5c) which controls the storing of information in the memory 101 has its output connected to the group driver selection AND gates 162 via OR gate 155a. OR gate 155a also receives the SYN2 signal as an input and provides an output to an AND gate 161 to a group driver 134. The second input to the AND gates 162 are provided by the reset outputs of the group counter flip flops 300a of the counter 300. The group driver selection AND gates 160, as will be described later are used to select a particular group for read in or write out of a given location whereas the group driver selection AND gates 162 are used to prevent readout during a punching operation and to prevent write back in certain memory locations during a program write back. The AND gate 155 is further connected to an AND gate 170 which also receives the timing signal T2, the output of which is connected to the column driver selection AND gates 172. It should be noted that timing signal T2 controls the write in of data by means of the write power driver 126 under commutator 124 control and thus memory write in takes place during the period T2 regardless of which write source is used. Each of the column driver selection AND gates 172 also receives an output from one of the column counter flip flops of counter 300a. The output of the AND gates 172 are wired to column write drivers 132. The column driver selection AND gates 164 control the readout of data from the memory whereas the column driver selection AND gates 172 control the writing of data into the memory. The AND gate 155 is further connected to an AND gate 171 (FIG. 5c) which also receives as inputs the output of the write flip flop 148 (FIG. 5a), the reset output of the home flip flop 223 (FIG. 5b) and the reset output of the skip store flip flop 204 (FIG. 5a). Each of these AND gates 171 (FIG. 5c) is connected to an AND gate 173, which also receives the output of the record card reader 120. Finally, the AND gate 155 is also wired via OR gate 155a to the AND gates 185 which receives at its second input the outputs of the temporary storage flip flop 115 to 118 to permit write back of the stored program information. The outputs of AND gates 185 are connected via OR gates 184 to x-line program write drivers 131.

As was described above with reference to FIGURE 1, the data section 102 of memory 101 is provided with twelve data sense lines 110 corresponding to the twelve row positions of a record card. Each of the data sense lines 110 is coupled via an AND gate 110a to a data temporary storage flip flop 137 which is used to temporarily store the information contained in a row position of a single column of the data section 102. The second input of the AND gate 110a is an inhibitory input coupled to the set output of the write flop flop 148 (FIG. 5a). Thus when flip flop 148 is set, no data may pass the AND gates 110a to set the data temporary storage flip flop 137 and thus write back is prevented. Each of these flip flops 137, of which only one is shown, has its set output wired to a punch actuator 138 (FIG. 5c), and its reset input coupled to the T-3 timing signal. A write back path is also provided from the set output of each flip flop 137 to an AND gate 129, operated during the timing pulse T2 time by the signal SYN2. As noted above AND gate 129 also receives the signal from the contact 180a of the duplicate switch 180. If the duplicate switch 180 is operated, indicating new data is to be entered AND gate 129 is rendered inoperative to prevent write back of the previously stored data. The output of AND gate 129 is applied via OR gate 174 to an x-line data write driver 130.

Each of the four sense lines 112 of the program section 103 is connected to the set input of the program temporary storage flip flops 115, 116, 117 and 118. These program temporary storage flip flops are used to temporarily store information from a column of the program section 103. Each of the flip flops 115 to 118 has a write back path leading from its set output to an AND gate 185 (which also receives the output of AND gate 155 which controls memory writing), the output of which is connected via an OR gate 184 to an x-line program write driver 131. The flip flops 115, 116, 117, 118 and 137 are reset by a T3 pulse.

Also found on the keyboard 121 (see FIGURE 5a) are a number of function keys, of which the skip key 190, the duplicating key 191, the step key 192 (FIG. 5b), the back space key 193 (FIG. 5b), the home key 194 (FIG. 5b), the card feed key 195 (FIG. 5b), and the clear key 196 (FIG. 5b) are shown in the drawing. Additionally there is an automatic switch 230 (FIG. 5a).

The skip key 190 (FIG. 5a) is depressed when a semi-automatic skip operation is to be performed as called for by the program in a manner to be described. The skip key 190 is depressed for each column that is to be skipped and completes the program directions for this operation.

The duplicate key 191 (FIG. 5a) is depressed when a semi-automatic duplicate operation is to be performed as called for by the program in a manner to be described. The duplicate key 191 is depressed for each column to be duplicated and completes the program directions for this operation.

The step key 192 (FIG. 5b) is depressed to manually control advancing of the counter 300 (FIG. 5d). The counter 300 count is advanced by one for each depression of the step key 192. This advancing of the counter 300 is desirable when no data is to be entered in a particular column or when the content of a particular column is to be preserved intact. For example, as will be explained, if the program for a semi-automatic skip or duplicate operation is called for and no skip or duplicate operation is desired the step key 192 may be depressed to advance the counter and void the skip or duplicate operation.

The back space key 193 (FIG. 5b) is depressed to manually control the decrementing of the counter 300. The counter 300 count is decremented by one for each depression of the back space key 193. The decrementing of the counter permits the memory to be addressed at its previous location so that data erroneously entered by means of the keyboard may be corrected.

The home key 194 (FIG. 5c) is manually depressed in order to reset the counter 300 to its initial conditions so that column 1 of the memory is addressed. It also permits the reading out of the first program step to control the entry of data into column 1.

The card feed key 195 (FIG. 5c) is manually depressed in order to manually commence a punch operation.

The clear key 196 (FIG. 5b) is depressed to manually reset the interlock flip flop 207 (FIG. 5b) and operate the inhibit power driver 135 (FIG. 5c). As will be set out below, the interlock flip flop 207 is set whenever a punching operation for a particular column is taking place and an attempt is made to enter data from the keyboard into this column. The interlock flip flop prevents the data key from affecting information entry while the inhibit power driver 135 prevents loss of data during the punch operation which is being completed.

The automatic switch 230 (FIG. 5a) is employed to set the machine for manual control from the keyboard function switches or automatic control under the stored program of the program section 103.

The skip key 190 and the duplicating key 191 are both connected via the OR gate 200 (FIG. 5a) to the set input of the skip flip flop 201 (FIG. 5a). The set output of the skip flip flop 201 is connected both to the OR gate 141 (FIG. 5a) and to the AND gate 202 (FIG. 5a). AND gate 202 also receives inputs from the program temporary storage flip flop 115 (FIG. 5c), the E timing signal and the reset output of the Schmitt trigger 142 (FIG. 5a). AND gate 202 in turn has its output connected via the OR gate 203 (FIG. 5a) to the set input of the skip store flip flop 204 (FIG. 5a). The set output of the skip store flip flop 204 is connected to the inhibit input of the AND gate 143 (FIG. 5a) to prevent the setting of the memory control flip flop 144 (FIG. 5a) during either a skip or duplicate operation. The output of the skip store flip flop 204 is also applied to an input of AND gate 205 (FIG. 5a) which also receives timing pulses E and T4 and which receives at its inhibitory input the output of the program flip flop 152 (FIG. 5a). Since the program read flip flop 152 is reset at this time, AND gate 205 applies a set pulse to set the write flip flop 148 via OR gate 146 and capacitance 147. The output of the skip store flip flop 204 is also applied to AND gate 149 (FIG. 5a), which receives the output of the write flip flop 148 and timing signals T4 and A. AND gate 149 passes a signal via OR gate 150 and capacitance 151 to set the program read flip flop 152. Additionally the output of skip store flip flop 204 is applied to OR gate 210 (FIG. 5b) to set the overrun flip flop 211 (FIG. 5b). Further the output of the skip store flip flop 204 is applied, together with the set output of the write flip flop 148 (FIG. 5a), the reset output of the home flip flop 223 (FIG. 5b) and timing signals A and T2 to AND gate 206 (FIG. 5b) to pass a pulse to OR gate 229 (FIG. 5b), and thence to the advance input terminal 301 of counter 300 (FIG. 5c). The output of the skip store flip flop 204 is ineffective to set the interlock flip flop 207 due to the absence of an enabling signal at AND gate 208a from the set output of the Schmitt trigger 142. The skip store flip flop 204 is reset by the output of AND gate 212 which receives the timing pulses T2 and B aid the output of program temporary storage flip flop 115 as well as the inhibitory input from the output of the overrun flip flop 211.

The duplicating key 191 is connected to the OR gate 200 (FIG. 5a), as noted above and will affect the same circuit elements as the skip key 190.

The duplicating key 191 is also connected via an OR gate 213 (FIG. 5a) to the set input of the duplicate flip flop 214 (FIG. 5a), the set output of which is connected to the OR gate 141 (FIG. 5a) and to the OR gate 215 (FIG. 5a). The output of the OR gate 141 is applied to the set input of the Schmitt trigger 142. The output of the OR gate 215 is applied to the AND gate 165 (FIG. 5c) and the output thereof is applied to the inhibit power driver 136 which controls the inhibit line 107 to prevent readout of information in the column of the data section to be duplicated into the card.

The purpose of the step switch 192 (FIG. 5b) is to control the advancing of the counter 300 (FIG. 5d) by one count to address the next higher column location without reading out the memory. The step switch 192 (FIG. 5b) has a contact 192a which the movable element 192b normally contacts under the influence of biasing tension spring 194d. In this position a signal is applied to OR gate 144a (FIG. 5a) whose output is applied to the reset terminal of the memory control flip flop 144. When the step switch 194 is depressed the movable element 192b contacts contact 192c to apply ground as a signal to the set input of the step flip flop 220 (FIG. 5b). The set output of the step flip flop 220 is connected via the OR gate 215 (FIG. 5a) and the AND gate 165 (FIG. 5c) to the inhibit power driver 136, which when actuated prevents erasing of data in the data section 102 of the memory 101. The output of the step flip flop 220 is also fed via OR gate 141 to set the Schmitt trigger 142. The memory readout and write in operations will take place as described above except that the presence of the inhibit signal will prevent erasing of the data section 102.

The backspace key 193 permits stepping back of the counter 300 if erroneous data has been entered. The backspace key 193 (FIG. 5b) connected to the set input of Schmitt trigger 221 (FIG. 5b) the output of which is connected to the backspace input terminals 302 (FIG. 5d) of counter 300. The counter 300 will be decremented as has been described with reference to FIGURE 5d.

The home key 194 provides for resetting of the counter 300 to the first count position corresponding to the first column, that is, with the column counter flip flop C1 and the group counter flip flop G1 set. The normally closed position of the home key 194 applies ground via movable element 194a to the contact 194b which in turn is connected via OR gate 144a to the reset input of the memory control flip flop 144 (FIG. 5a). The movable element 194a (FIG. 5b) is held in this position by the biasing tension spring 194c. When home key 194 is depressed movable element 194a causes ground to be applied as a signal to contact 194d and in turn to the OR gate 222 (FIG. 5b). The output of the OR gate 222 is connected to the set input of the home flip flop 223, the set output of which furnishes the reset signal for the counter 300 (FIG. 5d) via the counter reset input terminal 303. It should also be noted that the OR gate 222 (FIG. 5b) also receives an input from the card feed flip flop 224, which may be set either manually by depressing of the card feed key 195, or, if the switch "automatic" 230 (FIG. 5a) is closed, automatically, by a pulse from the counter 300 when it reaches the eighty first column. The output of the home flip flop 223 is also applied to the input OR gate 141 (FIG. 5a) for the Schmtit trigger 142, however the Schmitt trigger 142 is ineffective to cause the normal readout write in cycle because the application of the output of the write control flip flop 144 to the write flip flop 148 is blocked by the inhibited AND gate 145 which receives at its inhibitory input the output of the home flip flop 223.

The "automatic" switch 230 is connected to the AND gate 208 (FIG. 5a), to enable the contents of the program temporary storage flip flop 116 to affect an automatic skip operation and to the AND gate 197 (FIG. 5a) to enable the contents of the program temporary storage flip flop 117 (FIG. 5c) to affect an automatic duplication operation. The automatic switch 230 is further connected to AND gate 209 (FIG. 5a), which also receives the E timing signal and the output of the program temporary storage flip flop 117 (FIG. 5d) which indicates that an automatic duplication operation is to take place. The output of AND gate 209 is fed via OR gate 213 to the set input of the duplicate flip flop 214 (FIG. 5a). The output of the duplicate flip flop 214 is distributed as described above.

The automatic switch 230 also applies an input to AND gate 231 (FIG. 5b) which also receives an output from the advance pulse OR gate 229 (FIG. 5b). The output of the AND gate 231 is applied via OR gate 232 to the set input of the card feed flip flop 224 (FIG. 5b). This will permit an automatic initiation of a punch operation in accordance with program information.

The card feed flip flop 224 may also be set manually by depressing the card feed key 195, which applies a signal via OR gate 232 (FIG. 5b) to the set input of the card feed flip fiop 224. The set output of the card feed flip flop 224 is fed via OR gate 222 to the set input of the home flip flop 223 (FIG. 5b). The home flip flop 223 as described above resets counter 300 and initiates readout of the first program information. The set output of the card feed flip flop 224 is also applied to the reset terminal of flip flop 464 (FIG. 5c) to permit the generation of the STEP 1 and STEP 2 signals. The set output of the card feed flip flop 224 is also applied via capacitor 210a to OR gate 210 which applies a signal to the set input of the overrun flip flop 211 (FIG. 5b). The set output of the overrun flip flop 211 is applied as an inhibitory input to the AND gate 205 (FIG. 5a) to prevent the setting of the write flip flop 148 during a punch operation under conditions to be described below thus preserving the memory content. The set output of the overrun flip flop 211 (FIG. 5b) is also applied to AND gate 226 (FIG. 5b). The AND gate 226 is not enabled due to the fact its second input must come from the keyboard which is not operated as the record card punching cycle is carried out. However, should a keyboard 121 (FIG. 5a) key be depressed the signal from the keyboard encoder 122 via the line 140 to the second input of the AND gate 226 would operate to set via OR gate 227 (FIG. 5b) the interlock flip flop 207. The set output of the interlock flip flop 207 will ignite a warning light 207a and inhibit the advancing of counter 300 by inhibiting the AND gate 228 so that the advancing pulse OR gate 229 can not produce an advancing pulse to the advance input terminal 301 (FIG. 5d).

As will be evident from the description below, data may be entered from the keyboard 121 (FIG. 5a) or the program operations stored in the columns of the program section 103 (FIG. 5c) may be carried out under the control of the counter 300 at the same time as the punching operation proceeds under control of the commutator 124 (FIG. 5c). The readout of both the data section 102 and the program section 103 under control of the commutator 124 will take place during the A time signal and the data from the data section 102 will be punched out. The program information from the column readout will set the special function flip flops, but they will have no effect since they will be reset before any column is readout by the counter 300. There is one exception, however, which will be described below, namely the resetting of the overrun flip flop 211. During the next E timing signal the counter 300 will address column 1 and cause the readout of the data section 102 and program section 103 for column 1. The program information readout at this time will set the special function flip flops. If a keyboard entry operation is called for it will proceed but if a skip or duplicate operation, whether automatic or semi-automatic, is called for, the operation is suspended. An indication of the operation required is stored and may only be completed when the readout of the program by the commutator results in the finding of a column which will permit a keyboard entry. This is done to prevent the possible overrunning of the commutator 124 operated at mechanical speeds by the counter 300 run at electronic speeds. It is assumed that a keyboard entry is slower than a punch cycle and thus sufficient time is available to prevent such an overrun. As noted above, the presence of automatic or manual skip or duplicate program information will set the skip flip flop 204 (FIG. 5a), which in turn will set the overrun flip flop 211 (FIG. 5b) via capacitor 210a and OR gate 210 (FIG. 5b). The set output of the overrun flip flop 211 will enable AND gate 226 which upon receipt of a signal on the line 140 (FIG. 5a), indicating a key has been depressed on the keyboard 121 will set the interlock flip flop 207 (FIG. 5b) to prevent memory access and preserve its contents. The resetting of the overrun flip flop 207 is accomplished by means of the AND gate 230b. AND gate 230b receives as inputs the SYN2 and A signals and as inhibitory inputs the outputs of the program temporary storage flip flops 115, 116 and 117 (FIG. 5d). As will be recalled, flip flop 115 will store the program bit indicating a skip or duplication operation is called for; flip flop 116 stores a program bit which together with the program bit of flip flop 115 indicates an automatic skip operation; and flip flop 117 stores a program bit which together with the program bit of flip flop 115 indicates an automatic duplication operation. Thus when the program for the column being addressed by the commutator 124 during the presence of an A signal calls for a keyboard entry, the SYN2 signal will pass through AND gate 230b (FIG. 5b), the OR gate 230a to reset the overrun flip flop 211 and thus remove the enabling input to AND gate 226 and prevent the interlock flip flop 207 from being set. The interlock flip flop 207 is reset by the operator closing the manual clear switch 196 as soon as the light 207a is ignited. In that further setting of the interlock flip flop 207 is prevented, the keyboard data will be entered. The program information will thus be checked for each column and the entry or non-entry of data will be determined.

When the punch operation is complete (all 80 columns punched) cam contact 225a will be closed by a cam 225 on the shaft 400 of the punch device 139 to apply a reset to the clear flip flop 224 to reset it. The reset output of the clear flip flop 224 together with the signal produced by the closing of the cam contact 211b by the cam 211a on the shaft 400 of the punch mechanism 139 will operate AND gate 231a (FIG. 5b) to produce an input to OR gate 230a to reset the overrun flip flop 211. Thus the overrun flip flop 211 is reset after the punch operation has been completed if it has not been reset as described above. The interlock flip flop 207 is reset by the clear key 196 which also operates the inhibit power driver 135 (FIG. 5c) to prevent the loss of information in the memory 101 during the clearing of the interlock flip flop.

Turning now to FIGURE 6, there is illustrated a sample program card indicating representative coding for selected programs such as the skip, duplicating and numerical to alphabetical shift or vice versa. This program card contains information which does not have to be punched into other cards, but which serves to control the noted operations. It should be noted that only the first four rows of the record card, namely the 12, 11, 0 and 1 rows are employed.

Punches in columns of the "twelve" row of the program card (see the section designated "a") indicate that these columns will be subject to a semi-automatically controlled skip or duplicate operation. It is necessary to manually depress the skip key 190 or the duplicate key 191 in order to effect the skipping or duplicating of such columns of the record card in the ensuing punch operation. An automatic skip operation can be initiated by the presence of a punch in the "eleven" row in addition to the punch in the "twelve" row. This program instruction is illustrated in the first column of section "b" of the program card shown in FIGURE 6. For the remaining columns of section b to also affect an automatic skip operation, the "eleven" row for these columns must also contain a punch. An automatic duplicating operation can be initiated by the presence of a punch in the "zero" row in addition to the punch in the "twelve" row. This program is illustrated in section "c" of the card shown. For the remaining columns of section c to cause automatic duplication punches would also have to be present in the zero row of these columns.

Further in order to properly interpret information to be entered as numeric or alphabetic the "one" row of the program card must be interpreted. Thus, if alphabetical information is to be entered in certain columns punches are placed, for these columns, in the "one" row of the program card. The absence of punches in the "twelve," "eleven," "zero" and "one" rows indicates that the operation called for is the entry of data from the keyboard. If no data is entered the program section may be advanced by depressing the step key 192. These particular programming codes are already well known in the programming of commercially available machines. Other coding arrangements may be employed and programs other than these disclosed may be established.

OPERATION

The operation of the device will now be discussed with respect to FIGURES 5a, 5b, 5c, and 5d and with respect to the timing diagram of FIGURE 7. First the entry of data into the data section 102 (FIG. 5c) of the memory 101 and the entry of program information into the program section 103 of the memory 101 will be discussed followed by a discussion of the ensuing punch operation when the data in data section 102 is punched into a record card under the control of program section 103.

Program loading into program section 103

It will be assumed that a program card has been placed in the record card reader 120 (as shown in FIGURE 4) and that the manual program switch 181 (FIG. 5c) has been closed. It will further be assumed that the insertion of the program card into the record card reader 120 (FIG. 5a) has started the operation of the reader, and has caused the commutator 124 (FIG. 5c) to be reset to the initial position with the wiper 124a contacting segment 124b–1 corresponding to column 1 of the memory 101. Further, it will be assumed that the memory 101 is completely clear. The record card reader 120, as stated above with respect to FIGURE 4, reads the program card column by column and also causes the advancement of the commutator 124 via line 124c. It should be recalled that master or duplicate card and program card read in is accomplished under the control of the commutator 124 and x-line write drivers 130 and 131, respectively (FIG. 5c).

With the commutator 124 at the first segment 124b–1 the STEP 1 signal from cam switch 460 is gated at T1–1 time by AND gate 125a to produce the synchronizing pulse SYN1 to actuate the readout power driver 125 which applies full readout or switching current over the column drive line 105 to cause the readout of the contents of the magnetic cores 113 in the data section 102 and 114 in the program section 103 in column 1. After sufficient time for reading out the magnetic cores 113 and 114 has elapsed from cam switch 462, a STEP 2 signal is gated at T2–1 time by AND gate 126a to produce the synchronizing pulse SYN2 which actuates the write power driver 126 to apply an amount of current equivalent to half the current required to switch a core 113 or 114 in column 1 via the same column drive line 105. The synchronizing pulse SYN2 together with the signal from the closed program switch 181 will enable those AND gates 183 (FIG. 5c) which receive program signals from the record card reader 120. Consequently, all the AND gates 183 which have been enable, will pass via OR gates 184 signals to operate corresponding x-line program write drivers 131, to apply the second half of the required switching current over corresponding program x-write lines 111. The cores 114 of the program section 103, at the inter-section of the column drive line 105 (for the first column in memory section 103) and the selected program x-write lines 111 will be switched and placed in their set states. As the program card is advanced to column 2, the commutator is advanced to segment 124b–2 and the operation is repeated. The same operation is repeated for each of the eighty columns.

Data loading into data section 102

The data section 102 of the memory 101 (FIG. 5c) may also be loaded by means of the insertion of a master or duplicate card into the record card reader 120 (FIG. 5c). When data is entered into data section 102 by means of the record card reader 120, the program information stored in the program section 103 is ineffective to control such entry. The data or duplicate record card must be prepared in the form to be punched out. For example, columns to be skipped merely omit data from these columns and columns to be duplicated contain the data to be duplicated. The insertion of the data from the duplicating card into the record card reader 120 (FIG. 5c), starts the record card reader 120 operation and resets the commutator 124 (FIG. 5c) to segment 124b–1, corresponding to column 1 of the memory and the master or duplicate card. Since data or the contents of a duplicate or master card is now to be entered, the duplicate switch 180 is closed. As described above, the SYN1 pulse from AND gate 125a operates the readout power driver 125 to readout the contents of the entire column in both the data section 102 and the program section 103 by resetting all the cores in the column. The resetting of the data section will provide no outputs to the data temporary storage flip flops 137, since the memory section 102 was assumed to be initially cleared. The resetting of the cores in the program section 103, however, causes a reading out of the previously stored program information. It should be recalled that the readout current applied by the readout power driver 125 to the column drive line 105 is sufficient to cause resetting of the magnetic cores 113 and 114 by itself and does not depend upon coincident current selection. The program information read out as a result of the resetting of the memory is applied to the program temporary storage flip flops 115, 116, 117 and 118 (FIG. 5c). The "twelve" row of the program card is stored in flip flop 115, the "eleven" row is stored in flip flop 116, the "zero" row is stored in flip flop 117 and the "one" row is stored in flip flop 118. The outputs of these flip flops are fed over writeback paths so that the program information may be re-entered into the program section 103 as the duplication data is entered into the data section.

The program information write back path includes the program temporary storage flip flops 115, 116, 117 and 118 which are each connected to a first input of one of the four AND gates 185 (FIG. 5c). The second input to the AND gates 185 is provided by the output of an OR gate 155a which is operated by the SYN2 pulse from AND gate 126a at time T2, during which time the master or duplicate data is entered from the record card reader 120 as shall be explained. The output of the four AND gates 185 will pass via four OR gates 184 to the four x-line program write drivers 131 to apply one half of the current required to set the magnetic cores 114 for their respective rows.

While the program write back is taking place, the duplicate data from the record card reader 120 is fed to the twelve AND gates 182 which also receive signals from the duplicate switch 180. The SYN2 pulse is applied to both the write power driver 126 and the twelve AND gates 182. The AND gates 182 apply signals via twelve OR gates 174 to the twelve x-line data write drivers 130 to place one half the switching current required by the magnetic cores 113 on the twelve data x-write lines 109. In that the write power driver 126 supplies the remaining one half of the switching current to all the magnetic cores 113 and 114 via the commutator 124, segment 124b–1 and the column drive line 105 (for column 1), the magnetic cores 113 in the first column of the data section 102, which receives the outputs of the x-line data write drivers 130 and the magnetic cores 114 in the first column in the program section 103 which receive the outputs of the x-line program write drivers 131 are set.

Thus, during one column read time of the record card reader 120, the data section 102 has been cleared and new data read in, while the program section 103 has been cleared and the previously stored program data written back into its previous positions. The same sequence of events will take place for each of the 80 record card columns as the record card advances with the commutator 124.

In the event data had been stored in the data section 102, and new data is to be entered from the record card reader 120 (FIG. 5c), the previously stored data must not be permitted to be written back into the data section 102. This deletion of the stored data is accomplished by means of the data write back AND gates 129 (FIG. 5c). It should be recalled that the AND gates 110a are ineffective to prevent the setting of the data temporary storage flip flop 137 since the inhibiting input from the write flip flop 148 (FIG. 5a) is absent. The write flip flop 148 is reset at this time. The AND gates 129 (FIG. 5c) receive at a first input the output of the data temporary storage flip flops 137, the second input is provided by the SYN2 signal, while the third input is applied by the normally closed contact 180a of the duplicate switch 180. In that data is being entered from the record card reader 120, the duplicate key 180 is depressed to operate AND gate 182 removing a signal to the third input of the AND gate 129. Thus, the AND gate 129 is inoperative and no write back of previously stored data is permitted when new data from the record card reader is being stored in memory section 102.

*Entering data from the keyboard 121*

The entry of data from the keyboard 121 will now be considered. It will be assumed for the following description that the program sections 103 (FIG. 5c) has already been loaded with program information from the record card reader 120 as described above. The reading out of the program information from program section 103 and data from data section 102 will be under the control of the counter 300 (FIG. 5d). The writing back of program information into the program section 103 will be under the joint control of the counter 300 and the x-line program write drivers 131, whereas the writing in of data from the keyboard 121 (FIG. 5a) will be under the joint control of the counter 300 (FIG. 5d) and the x-line data write drivers 130 (FIG. 5c). This mode of current supply for the keyboard entry cycle is in distinction to the mode of current supply for record card reader 120 entry cycles when the commutator 124 is employed. A further distinction between the record card reader 120 entry mode and the keyboard 121 entry mode should also be noted. In the keyboard 121 entry mode the program information from program section 103 is employed to control the entry of data from the keyboard 121. For example, if the program calls for a duplication operation in a given column the keyboard entry is blocked into that column. Data may only be entered into the columns of the data section 102 from the keyboard when the program so permits.

Prior to the entry of data by means of the keyboard 121 (FIG. 5a), the home key 194 (FIG. 5b) in the special function key region of the keyboard 121 is depressed applying a signal to the OR gate 222 (FIG. 5b). The output of the OR gate 222 is applied to the set input of the home flip flop 223 (FIG. 5b) (see line *t* of FIG. 7). The set output of the home flip flop 223 is applied to the reset input terminal 303 (FIG. 5d) of the counter 300 and via the OR gates 311 and 311a to set the counter 300 to its initial state wherein column counter 300a flip flop C1 and group counter 300b flip flop G2 are set. The output of the column counter 300a flip flop C1 alerts the column selection AND gates 172 and 164 (FIG. 5c) for column 1, whereas the output of the group counter 300b flip flop G1 alerts the group selection AND gate 160 (FIG. 5c). The set output of the home flip flop 223 (FIG. 5b) is also applied to the inhibit input of the AND gate 145 (FIG. 5a) to prevent the setting of the write flip flop 148 in response to a set output of the memory control flip flop 144.

The set output of the home flip flop 223 also impresses a signal on the OR gate 141 (FIG. 5a) which passes a signal to the set input of the Schmitt trigger 142, thereby setting it. (Note line *i* of FIGURE 7). The output of the Schmitt trigger 142 is applied via AND gate 143 (not inhibited because the skip store flip flop 204 is not set) together with the timing signals E–1 and T4–1 to set the memory control flip flop 144. (See line *j* of FIG. 7.) The set output of the memory control flip flop 144 is applied to AND gate 145. However the set output of the memory control flip flop 144 is unable to pass through the AND gate 145 due to the presence of the inhibit signal from the set output of the home flip flop 223 (FIG. 5b). Thus, as long as the home key remains depressed, no reading or writing into the memory takes place. The automatic switch 230 is also closed since automatic program control is desired, however, it will be ineffective at this time, as shall be explained.

When the home key 194 (FIG. 5b) is released, the movable element 194a is returned to the normally closed position in contact with contact 194b by the bias tension spring 194c. In this position a signal is applied via OR gate 222a and the capacitance 223a to reset the home flip flop 223. The signal from contact 194b of the home key 194 is also applied to OR gate 142a (FIG. 5a) resetting the Schmitt trigger 142 and to OR gate 144a, which passes through the gate to the reset input of the memory control flip flop 144, resetting it. (Note lines *t*, *i* and *j* of FIGURE 7). The reset output of the memory control flip flop 144 is passed via OR gate 150 and capacitance 151 to the set input of the program read flip flop 152 to set it. (Note line *l* of FIG. 7). The set output of the program read flip flop 152 is applied to the set terminal of flip flop 464 to cause the operation of the solenoids 460b and 462b to move the movable contacts of the switches 460a and 462a out of the paths of the cams 460 and 462. This will prevent the generation of the STEP 1 and STEP 2 signals employed during record card reading and punching operations. The commutator 124 will thus be prevented from controlling the memory functions.

The output of the program read flip flop 152 (FIG. 5a) is applied via OR gate 153 to the readout control AND gate 154 (FIG. 5c). Upon the application of timing pulses TIA–4 and E–2 the AND gate 154 (note line *m* of FIG. 7) applies a signal to the second input of the group I selection AND gate 160, to operate the group I line driver 134 via OR gate 161. The output of AND gate 154 is also applied to AND gate 163 (FIG. 5c) which at timing pulse T1–4 operates to pass a signal to the second input of the column I selection AND gate 164. (Note line *n* of FIG. 7). AND gated 164 passes a signal to operate the column I readout line driver 133 (FIG. 5c). As a result of the coincident operation of the group I line driver 134 and the column I readout line driver 133 sufficient current is available to read out the contents of the magnetic cores 113 in the data section 102 and the magnetic cores 114 in the program section 103 of column 1 without operation of x-line data write drivers 130 and the x-line program write drivers 131. However, the set output of the program read flip flop 152 is also applied to OR gate 215 (FIG. 5a) which passes a signal to one input of AND gate 165 (FIG. 5c) which also receives the output of the operating AND gate 154. AND gate 165 operates (Note line *s* of FIG. 7) to actuate the inhibit power driver 136 to apply inhibit current to the inhibit line 107 threading the magnetic cores 113 of the data section 102. As a result, the operation of the drivers 134 and 133 are ineffective to erase the data section 102 but erase the program section 103 which is not equipped with an inhibit winding.

The program information read from the program section 103 (FIG. 5c) is stored in the program temporary storage flip flops 115, 116, 117 and 118 of column 1. Assuming that column 1 requires a keyboard entry and therefore the cores 114 remain in their original reset condition, no readout signals are generated which will set the program temporary storage flip flops 115, 116, 117 or 118. Since these flip flops are not set and the cores 114 of program section 103 must remain in their reset condition to indicate keyboard entry program, no write back operation takes place in fact. Further since the flip flops 115, 116, 117 and 118 were not set during read out, none of the special control flip flops (skip flip flop 201, duplicate flip flop 214, etc.) will be set.

Despite the fact that no program information need be rewritten into the program section 103, the program rewrite cycle is carried out nonetheless. The write control AND gate 155 (FIG. 5c) which receives the output of the OR gate 153 is operated to pass a signal upon the application of the timing signals T2A-4 and E-2 (see line o of FIG. 7). The output of AND gate 155 is passed to OR gate 155a and thence to one input of AND gate 185 (FIG. 5c) and one input of the group I selection AND gate 162. Since the second input to the group I selection AND gate 162 is present, due to the set output of the group counter flip flop G1, the AND gate 162 is operated to pass a signal via OR gate 161 to operate the group I line driver 134 to place current upon the group selection line 106. The output of AND gate 155 is also applied to AND gate 170 (FIG. 5c) which upon receipt of timing pulse T2-4 provides an output to the column I selection AND gate 172 (see line q of FIGURE 7). The second input to the column I selection AND gate 172 is provided by the set output of the column counter 300a flip flop C1, to cause AND gate 172 to operate the column I write driver 132 placing switching current upon the column selection line 104. The presence of the column and group selection currents will now permit the write back of the program information impressed on the AND gates 185 via the OR gate 184 the x-line program write drivers 131 and the program x-write lines 111. Since the program for keyboard entry calls for all zeros, no write in operation takes place for column 1. The aplication of timing signals T3-4 and E-2 (FIG. 7) applied to AND gate 156 reset the program read flip flop 152. The entry of data into column 1 by means of the keyboard 121 may now begin.

The depression of a key on the keyboard 121 (FIG. 5a) causes the keyboard encoder 122 (FIG. 5a) to issue two signal groups. The first signal group, made up of a single signal is applied via the line 140. This signal will be generated any time a data key is depressed. The signal on line 140 is passed via OR gate 141 to set the Schmitt trigger 142. (See line i, column 1 cycle of FIG. 7). The set output of the Schmitt trigger 142 is passed via AND gate 143 (not inhibited because a skip or duplication operation is not called for as evidenced by the skip store flip flop 204 not being set) with the presence of the T4-5 and E-3 timing pulses to set the memory control flip flop 144 (see line j, column 1 cycle of FIG. 7). The set output of the memory control flip flop 144 is passed via AND gate 145 (not inhibited because the home flip flop 223 is reset), OR gate 146 and capacitance 147 to set the write flip flop 148 (see line k, column 1 cycle of FIGURE 7). The output of the write flip flop 148 is applied via OR gate 153 to the readout control AND gate 154 and memory readout takes place again in column 1 of the memory 101 as described above, under the control of the counter 300. However, during this read-out the inhibit power driver 136 (FIG. 5c) is not operated, in that the program read flip flop 152 is reset and the inhibit line 107 will not have inhibiting current impressed upon it. The program information from the program section 103 will be read out once more. If program information was present, the write control AND gate 155 controls the write back of this information at time T2 as described above. This does not happen in the case described in that it was assumed that the program information for a keyboard entry operation was stored, and thus all zeros are stored in the program section 103. The data section 102, not being inhibited, is read out and the signals representing the contents of the magnetic cores 113 of column 1 of the data section 102 are applied via the data sense lines 110 to the AND gates 110a. The signals read out are not permitted to pass through the AND gates 110a and set the data temporary storage flip flops 137 due to the presence of the set output of the write flip flop 148 (FIG. 5a) which acts as an inhibit input to the AND gate 110a. As a result of the failure to set the data temporary storage flip flops 137, the data read out of data section 102 is destroyed and its write back prevented.

As described above the AND gates 154 (FIG. 5c) and 163 controlled the group and column selection AND gates 160 and 164 respectively for reading out and erasing the memory 101. The output of the OR gate 153 which controlled AND gate 154 for reading out also controls AND gate 155 during timing pulses T2A-6 and E-3 (FIG. 7) to permit the write back of the program information and the write in of the keyboard data. AND gate 155 (FIG. 5c) supplies a first input to the AND gate 171 which also receives an input from the set output of the write flip flop 148 (FIG. 5a), and the reset outputs of the home flip flop 223 (FIG. 5b) and the skip flip flop 201 (FIG. 5a). The home flip flop 223 is reset, as was described above, as soon as the home key 194 is released and the skip flop-flop 201 is reset since neither the skip key 190 nor the duplicate key 191 is depressed. The AND gate 171 (FIG. 5c) will apply an alerting input to the AND gates 173 which will receive at their second inputs the data output signals from the keyboard encoder 122 (FIG. 5a) via the lines 122b-12 to 122b-0. AND gate 173 (FIG. 5c) will apply a signal via the OR gate 174 to actuate the x-line data write driver 130 to apply a half select current to the data x-write lines 109 for the data section 102 in the rows which receive data signals.

As described above the data x-line data write driver 130 (FIG. 5c) and the x-line program write driver 131 are operated to supply one half the selection current to their associated rows of the memory 101. The second one half of the selection current for column 1 is provided by the group I line driver 134 (FIG. 5c). In addition the column I write drive 132 is also turned on and without further controls preventing its application to the memory 101 would supply the second one half of the selection current to the columns 1, 11, 21, 31, 41, 51, 61 and 71 all connected in common, permitting the data and program information to be written into column 1 but would also permit this to be erroneously written into columns 11, 21, 31, 41, 51, 61 and 71. The effect of the column I write driver 132 is overcome by the introduction of a further current equal to one half of the selection current but of opposite polarity to that of the normal selection current into the groups II, III, IV, V, VI, VII and VIII. This is accomplished by the use of the output of AND gate 155 applied to one input of special group selection AND gates 162. The second input to the AND gates 162 is provided by the reset outputs of the group counter 300b flip flops G2 to G9 and G0. The group counter 300b flip flops G2 to G9 and G0 will all be in their reset states since the counter 300 is set for column 1 and only group counter 300b flip flop G1 is set. The output of the AND gates 162 are fed to a second input of the group drivers 134 which cause them to produce an output of the same amplitude but of opposite polarity to that normally produced. Thus the column I write driver 132 output current is cancelled in columns 11, 21, 31, 41, 51, 61 and 71 and no data or program information may be written into these columns. The extra one half selection current in column 1 will merely drive the magnetic cores 113 and 114 of column 1 further into their saturation region and will not effect the switching of these magnetic cores.

This manner of cancelling the effects of the column write driver 132 will be employed in all write back operations into the memory 101 of the program information as well as the write in of keyboard data when the device is in the keyboard entry mode. Thus for keyboard entry modes, with the generation of the STEP 1 and STEP 2 signals prevented as described above, readout of the memory 101 is under the control of the column readout and group drivers 133 and 134 respectively, and write in is under the control of the group driver 134 jointly with the x-line data write driver 130 and the x-line program write driver 131.

35

After the write operation, just described, has been completed, timing pulses T3–7 and A–4 (FIG. 7) enable the AND gate 157 (FIG. 5a) to apply a reset pulse to the reset input of write flip flop 148 resetting it (see line k of the column 1 cycle of FIG. 7). It should be noted that the memory control flip flop 144 is still set (line j of the column 1 cycle of FIG. 7) and that an output signal is present at the output of OR gate 146. However, due to the capacitive coupling 147, between OR gate 146 and the set input of the write flip flop 148, the static output signal of OR gate 146 is not able to set the write flip flop 128 again.

After sufficient time for the completion of the operation noted has elapsed the delay 140d (see FIG. 3) will issue a pulse via the line 140a to the OR gate 144a to reset the memory control flip flop 144. The output of OR gate 124 via line 140a is also applied to OR gate 142a, which causes the Schmitt trigger 142 to also be reset. The reset output of the memory control flip flop 144 is passed via OR gate 150, capacitance 151 to set the program read flip flop 152 (FIG. 5a). The output of the program read flip flop 152 will be applied to the AND gate 228 (FIG. 5b), which also receives the reset output of the home flip flop 223 (now reset), the reset output of the skip store flip flop 204 (now reset) and the timing pulses A–5 and T2–9. The AND gate 228 is not inhibited at this time by the set output of the interlock flip flop 207 (FIG. 5b) due to the interlock flip flop 207 being in its reset condition. The AND gate 228 thus passes a signal (note line r of column 1 cycle of FIG. 7) via OR gate 229 to the advance input terminal 301 (FIG. 5d) to advance the counter 300 to column 2, that is with column counter 300a flip flop C2 set and group counter 300b flip flop G1 set. The program read flip flop 152 (FIG. 5a) will then control the program section 103 (FIG. 5c) read out as was described above with relation to the release of the home key 194. (FIG. 5b).

To summarize, the events which take place during a keyboard entry cycle proceed as follows: The depression of the home key 194 (FIG. 5b) sets the counter 300 (FIG. 5d) to address column 1; during this time no reading or writing into the memory 101 (FIG. 5c) can take place. When the home key 194 is released the memory read cycle begins. The data section 102 of the memory 101 has an inhibit source applied to it to prevent the readout and destruction of the stored data. The column readout and group drivers 133 and 134 (FIG. 5c) respectively, are operated to read out the program information from the program section 103. The program information is written back into the program section 103 under control of the column write driver 132 and x-line program write drivers 131 and such program information is further used to set the special function flip flops which will control the input of data into the associated data section 102. A keyboard key is then depressed and a further memory read operation begins under the control of the column readout driver 133 and group driver 134. The program information is read out and rewritten in the program section 103 under control of the column write driver 132 and group driver 134. The program information will again set the special function flip flops but they will be ineffective during the input cycle controlled by the write flip flop 148. The data from data section 102 is read out and destroyed by blocking the rewrite path. If the entry of data is to be permitted into the column by the program, then the keyboard data will be entered into the data section under the control of the column write driver 132 and the x-line data write drivers 130. Once the data entry is complete, a signal is issued to cause the counter 300 to be advanced permitting the readout of the program for the column 2. This operation will continue for each column, that is a determination of the program, followed by the entry of data into the associated column depending upon the program for that column.

36
SKIP OPERATIONS

The manner of operation of the device in the automatic skip routine under program control will be considered with regard to FIGURES 5a, 5b, 5c and 5d and timing diagram of FIGURE 8. It will be assumed for the purposes of this discussion that the program section 103 of the memory 101 for column 2 has already been loaded with program information calling for a skip operation. As will be recalled from the discussion of FIGURE 6, wherein the various program codings for the program card were represented, an automatic skip operation is indicated by the presence of a punch in the "twelve" row as well as a punch in the "eleven" row. It will further be assumed that the device has completed the first cycle of operation just described, that is, entering information by means of the keyboard 121 into column 1 and that the counter 300 (FIG. 5d) has been advanced to a count of 2 so as to cause the readout of the contents of column 2. To initiate this readout, the program read flip flop 152 (FIG. 5a) is placed in its set condition as indicated above. It is further assumed that the automatic switch 230 (FIG. 5a) has been closed so that a fully automatic operation may take place and will apply a first input to the AND gate 209 (FIG. 5a). With the device in this condition the readout of the program section 103 in the memory 101 (FIG. 5c) will take place in a manner described above with respect to the readout of the program section 103.

The set output of the program read flip flop 152 (FIG. 5a) is applied to an input of the OR circuit 153 (FIG. 5c) which will pass an output to one of the inputs of the readout control AND gate 154. In the presence of the timing signals T1A–10 and E–5, the AND gate 154 will produce an output (see line m of column 2 cycle of FIGURE 8) which is impressed on a first input of the group I selection AND gate 160 (FIG. 5c). The output of the AND gate 154 is further fed to one input of the AND gate 163 which upon receipt of timing pulse T1–10 is operated to provide an output signal (see line n of column 2 cycle of FIGURE 8) to the first input of the column II selection AND gate 164. The second input to the column II selection AND gate 164 is provided from the set output of the column counter 300a flip flop C2 (FIG. 5d). The second input to the group I selection AND gate 160 is provided by the set output of the group counter 300b flip flop G1. It should be recalled that prior to the beginning of this operation, the counter 300 was advanced from its initial position wherein column 1 was addressed to its second count position whereby column 2 is addressed. Under these conditions, the counter 300 (FIG. 5d) is set in such a manner that the column counter 300a flip flop C2 is set, and the group counter 300b flip flop G1 is set. All remaining flip flops of the column counter 300a and group counter 300b remain in their reset conditions.

The output of the AND gate 154 (FIG. 5c) is further fed to an AND gate 165 which receives at its second input terminal the output of the OR circuit 215 (FIG. 5a). One of the inputs to the OR circuit 215 is the set output of the program read flip flop 152 which is set at this time. Thus a signal is passed through the OR gate 215 to the second input of the AND gate 165 (FIG. 5c) to cause this gate to operate (see line s of column 2 cycle of FIGURE 8) initiating the operation of the inhibit power driver 136 which applies inhibit current to the inhibit line 107 (FIG. 5c) and thus prevents the readout of the data section 102 of the memory 101. It should be recalled that the inhibit line 107 threads each and every magnetic core 113 of the data section 102 but does not thread the magnetic cores 114 of the program section 103. Thus, despite the concurrent operation of the column II write driver 133 and the group I line driver 134 the data section 102 will remain unaffected whereas the contents of the program section 103 in column 2 will be read out.

In that it has been assumed that the operation called for by the program in column 2 is an automatic skip operation the magnetic cores 114 for the rows twelve and eleven of the program section 103 (FIG. 5c) for column 2 will contain information whereas the magnetic cores 114 corresponding to the zeo and one rows of column 2 will not contain such information. As a result of the readout of this stored program temporary storage flip flops 115 and 116 will be set (see lines *t* and *u* of the column 2 cycle of FIGURE 8). The output of the program temporary storage 115 (FIG. 5c) will be fed to a first input of an AND gate 185 (FIG. 5c) to permit the write back of this program information into the location it formerly occupied. In addition the output of the program temporary storage flip flop 115 is applied to a first input of an AND gate 202 (FIG. 5a). To the second input of the AND gate 202, there is applied the reset output of the Schmitt trigger 142 (now reset) whereas at the third input AND gate 202 receives timing signal E–5, and at its fourth input the set output of the skip flip flop 201 (FIG. 5a). In that neither the manual skip key 190 or the manual duplication key 191 have been depressed (this being an automatic operation), the skip flip flop 201 will not be set via the OR gate 200, and thus will fail to provide the fourth input to the AND gate 202, and this gate will remain inactive. The output of the program temporary storage flip flop 116 (FIG. 5c) is in a similar fashion fed to an AND gate 185 to provide for write back of this program information. In addition the output of the program temporary storage flip flop 116 is fed to a first input of the AND gate 208 (FIG. 5a) which also receives as inputs the output of the closed automatic switch 230 and the E–5 timing signal. Therefore, with all three inputs present to the AND gate 208 an output will be issued via the OR circuit 203 (FIG. 5a) to set the skip storage flip flop 204 (see line *v* of column 2 cycle of FIGURE 8).

While the skip storage flip flop 204 is set, the AND gate 155 (FIG. 5c) will be operated (see line *o* of column 2 cycle of FIGURE 8) by the output of the program read flip flop 152 (FIG. 5a) via the OR gate 153 and by the timing signals T2A–10 and E–5 to provide an output signal via the OR gate 155a to the second input to the AND gates 185 enabling those gates which have received outputs from the program temporary storage flip flops 115 and 116. The AND gates 185 will pass signals through the OR gates 184 to operate the x-line program write drivers 131 to place one half the necessary selection current on the program x-write lines 111. (FIG. 5c). The output of the AND gate 155 is also passed to the second input of the Group selection AND gates 160 which already receives at its first input the output of the group counter 300b flip flop G2. The output of the AND gate 160 is fed via OR gate 161 to operate the group I line driver 134 and provide one half of the selection current required to switch a magnetic core via the group I selection line 106. Further the output of the AND gate 155 is passed to a input of the AND gate 170 which upon receipt of timing pulse T2–10 issues a pulse (see line *p* of column 2 cycle of FIGURE 8) which is applied to the second input of the column II selection AND gate 172. The first input to the column II selection AND gate 172 (FIG. 5c) is connected to the set output of the column counter 300a flip flop C2 (FIG. 5d). The AND gate 172 will issue an output which will operate the column write drive 132 (FIG. 5c). The write back of the program data will take place now under the control of the program x-write driver 131 and the Group I line driver 134. As was noted above, an extra one half of the selection current will be available to column 2, as well as columns 12, 22, etc. The group line drivers 134 for the non-selected groups, that is, in the groups II to VIII will be responsible for the cancellation of the extra selection current provided by the column driver in the non-selected groups as described above.

At this point the program information from the program section 103 for column 2 has been read out and used to set the necessary controlling special function flip flops and also has been read back and restored in the program section 103 in the positions formerly occupied by it. Upon the concurrent application of the timing pulses T3–10 and E–5 to the AND gate 156, a pulse will be issued to reset the program read flip-flop 152 (note line 1 of the column 2 cycle of FIGURE 8). The T3–10 signal will also reset the program temporary storage flip flops 115 and 116 (see line *t* of the column 2 cycle of FIGURE 8).

As noted above, the output of the program temporary storage flip flop 116 (which stores the bit indicating an automatic operation is to take place) has already set the skip storage flip flop 204 (FIG. 5a). The output of the skip storage flip flop 204 is fed to the inhibitory input of the AND gate 143 which controls the application of a setting pulse to the memory control flip flop 144. The depression of a data key on the keyboard 121 in an attempt to enter data at this time, will send a signal through the keyboard encoder 122 via line 140 to the OR circuit 141 which will set the Schmitt trigger 142. The set output of the Schmitt trigger 142 is applied to an input of the AND gate 143. However, as noted above, the AND gate 143 is inhibited at the time and therefore fails to pass the output of the Schmitt trigger to the set input of the memory control flip flop 144 and this flip flop remains in its reset condition. Additionally, the output of the skip storage flip flop 204 is applied to a first input of an AND gate 205 which also receives the timing signals T4–11 and E–6, and at inhibitory inputs, the set output of the program read flip flop 152, and the set output of the overrun flip flop 211 (FIG. 5b). In that the program read flip flop 152 had been reset prior to the application of the set output of the skip storage flip flop 204 to the AND gate 205, and since the overrun flip flop 211 is reset, the AND gate 205 will serve to pass a signal via the OR gate 146 and the capacitance 147 to the set input terminal of the write flip flop 148 causing it to be placed in its set condition (see line *k* of the column 2 cycle of FIGURE 8).

The output of the write flip flop 148 (FIG. 5a) will be passed via the OR gate 153 to the readout control AND gate 154 (FIG. 5c) and the write control AND gate 155 to control the readout once more of the data section 102 and the program section 103 as was described above. The program information stored within the program section 103 of column 2 will be read out to the program temporary storage flip flops 115 and 116 (see lines *t* and *u* of the column 2 cycle of FIGURE 8). It should be recalled that the program information for column 2 represents the automatic skip operation and thus will have a bit stored only in the rows twelve and eleven and thus effecting the flip flops 115 and 116. (FIG. 5c). There will be no signal read out to the flip flops 117 and 118 in that the magnetic cores 114 for the rows 0 and one will not have been set. The output of the temporary storage flip flops 115 and 116 will again be passed to inputs of the AND gate 185 (FIG. 5c) for write back into the program section 103. Further the output of the flip flops 115 and 116 will again attempt to set the special function flip flops by passing a signal from the flip flop 116 to the AND gate 208 (FIG. 5a). In that the skip storage flip flop 204 had already been set in the first reading of the program section under control of the program read flip flop 152, the skip store flip flop 204 will remain in its set condition and the signals impressed by the gate 208 will have no effect at this time. The data read from the data section 102 will be impressed upon the twelve AND gates 110a (FIG. 5c) which also receives at their inhibitory inputs the output of the write flip flop 148 (FIG. 5) and thus the information which has been read out of the data section 102 is destroyed at this AND gate and not permitted to set any of the twelve data temporary storage flip flops 137. In this way the data section is cleared of information previously stored therein.

The AND gate 155 (FIG. 5c) will now control the write back of the program information from column 2 into the program section 103 for column 2 in the manner which has been described above. If an attempt is made to erroneously enter data from the keyboard 121 (FIG. 5a) when an automatic skip operation is called for, the output of the keyboard will be blocked and no data will be stored. This is accomplished as follows. Shortly after the program information has been rewritten into the program section 103, the output of the keyboard encoder 122 (FIG. 5a) via the lines 122b will be impressed upon first inputs of the AND gates 173 (FIG. 5c). This information however will not be written into the data section 102 because of the absence of the second input to the AND gate 173 necessary to permit its effecting the x-line data write driver 130 for these particular outputs of the keyboard encoder 122. The second input to the AND gate 173, it will be recalled, is applied by the AND circuit 171 which receives the output of the AND gate 155 at its first input, the reset output of the home flip flop 223 (FIG. 5b) at a second input, the output of the write flip flop 148 (FIG. 5a) at a third input, and finally, the reset output of the skip storage flip flop 204 (FIG. 5a). In that the skip storage flip flop 204 has been set and does not provide a reset output, this fourth output is absent to the input of the AND gate 171, causing AND gate 171 (FIG. 5c) to be disabled. Thus no signal is passed to the second input of the AND gate 173 and no data may be entered from the keyboard 121 (FIG. 5a) via the keyboard encoder 122. At the end of this cycle of operation the program information formerly stored in column 2 has been rewritten into column 2, the program section 103 and the data formerly stored in column 2 the data section 102 has been destroyed and no further information has been entered therein. Thus the data section of column 2 corresponding to the program section of column 2 which contains the program for an automatic skip operation will store no data. This is the condition which is desired for the ensuing punch operation, that is, it is not desired to punch out the data formerly stored in column 2 and thus the column is skipped.

The output of the write flip flop 148 (FIG. 5a) is also fed to an input of the AND gate 149 which receives the set output of the skip storage flip flop 204 and the timing pulses A-7 and T4-12. A pulse will be passed through the AND gate 149 via the OR gate 150, the capacitance 151 to the set input of the program read flip flop 152. This will place the program read flip flop 152 in its set condition to permit the readout and write back of column 3 of memory 101 (see line 1 of the column 1 cycle of FIGURE 8). It should be noted that the write flip flop 148 is reset by the application of the timing pulses A-7 and T3-13 applied thereto (see line k of the column 1 cycle of FIGURE 8).

The program read flip flop 152 (FIG. 5a) now being in its set condition will control the readout of the program section 103 and data section 102 for column 3 in a manner as has been described above. Further the output of the program read flip flop 152 is passed as has been described above, through the AND gate 228, (see line v of the column 1 cycle of FIGURE 8) the OR gate 229 (FIG. 5b) to the advance input terminal 301 (FIG. 5d) of the counter 300. Thus the counter will be advanced to address column 3. The counter 300 will be in such condition that the column counter 300a flip flop C3 is set, whereas the group counter 300b flip flop G1 remains set. All other flip flops will remain in their reset conditions. It should be noted that although the output of the program read flip flop 152 (FIG. 5a) is applied simultaneously to the AND gate 228 (FIG. 5b) and via the OR gate 153 (FIG. 5c) to the readout control AND gate 154, the counter 300 will be advanced prior to readout of column 3 of memory 101. This is due to the control of the AND gate 228 by the timing pulses A-7 and T2-13 whereas AND gate 154 is controlled by the timing pulses E-7 and T1A-14. Thus it will be the column 3 which is read out and not the information for the column just operated upon (column 2).

In summary of the automatic skip operation, the program read flip flop 152 (FIG. 5a) will control the readout of the program information stored within the program section 103 as well as the data in the data section 102 for column 2. The program information will be used to again set the same magnetic cores 114 of the program section 103 so as to store the same program information at is previous location in column 2. The program information for column 2 will also be used to set the special function flip flops which will determine and control the storage of data in the data section 102 for column 2 at a later time. The data stored within the data section 102 for column 2 will be preserved due to the application of inhibit current on the inhibit line 107 (FIG. 5c). The write flip flop 148 (FIG. 5a) will be set and will control the further readout of both the data section 102 and program section 103 of the memory 101. The output of the program section 103 will again be placed in the temporary storage flip flops 115 and 116 (FIG. 5c) whose outputs are again impressed upon the write back gates, and upon the special function flip flops. In that the special function flip flops had been set in response to the first readout operation, they will not be set again. The data read from column 2 the data section 102 will be destroyed in the recirculation path and thus information previously stored will not be rewritten into column 2 of the data section 102 of the memory at the time.

If data had been erroneously entered into the keyboard 121 (FIG. 5a) then such data will be handled as follows. Once the rewriting of the program information has been completed, the attempted write in of the keyboard information will be started. The data will be placed upon proper write in gates, however, these gates will be inhibited by the action of the special function flip flops to prevent such write in. The operation will be terminated when the program read flip flop 152 (FIG. 5a) is set to address the memory 101 (FIG. 5c) for the next column position (column 3) in order that the program for this column be read out and used to determine and control storage of data in the data section 102 for column 3.

*Automatic duplication operation*

An automatic duplication operation will now be considered with relation to FIGURES 5a, 5b, 5c, 5d and the timing diagram of FIGURE 8. The column 3 cycle will be used to illustrate the various signals occurring during the column 3. It will be assumed for the following description of the automatic duplication operation that the program section 103 (FIG. 5c) for column 3 has the required stored program information to indicate an automatic duplication operation. The automatic duplication operation as was described with reference to FIGURE 6, will include a bit in the "twelve" row and a further bit in the "zero" row. It will further be assumed that the automatic switch 230 (FIG. 5a) in the special function keys portion of the keyboard 120 (FIG. 5a) is still closed. As was described above, after completing the operation for column 2, the program read flip flop 152 (FIG. 5a) was placed in its set condition to control the readout of the contents of column 3 of the memory 101 (FIG. 5c) and made available the program to control the storage of data in the data section 102 of column 3. The readout of the memory 101 (FIG. 5c) will proceed in the manner which has been described above with reference to the automatic skip operation. That is, the AND gates 154 (FIG. 5c) and 155 will control the read out of the program section while inhibiting the readout of the data section 102. As a result of the readout of the program section 103, the program temporary storage flip flops 115 and 117 will be set at this time. (Note lines t and w of the column 3 cycle of FIGURE 8).

The output of the program temporary storage flip flops 115 and 117 will be impressed upon first inputs of the write back AND gates 185 (FIG. 5c) and will further be employed to set the special function flip flops in a manner to be described. The output of the program temporary storage flip flop 117 will be impressed simultaneously upon the AND gate 197 and the AND gate 209. The second inputs to both of these AND gates are supplied by the output of the closed automatic switch 230. The third input to each of these gates is supplied by the timing pulse E–7 which when present will cause outputs to be furnished by both the AND gate 209 and the AND gate 197. The output of the AND gate 209 will be fed via the OR circuit 213 to the set input of the duplication flip flop 214 to place it in its set condition. (Note line $x$ of the column 3 cycle of FIGURE 8). Also upon the arrival of the E–7 pulse the AND gate 197 will be operated to produce an output via the OR circuit 203 to attempt to set the skip storage flip flop 204. (Note line $v$ of the column 3 cycle of FIGURE 8). It should be noted that the skip storage flip flop 204 (FIG. 5a) was set during the column 2 cycle which called for an automatic skip operation. Resetting of the skip storage flip flop 204 was prevented by the application of the output of the program temporary storage flip flop 115 to one of the inhibiting inputs to the reset AND gate 212. Thus the normal resetting timing signals E–6 and T2–12 were not permitted to reset the skip storage flip flop 204. Before the application of the next resetting timing signals E–7 and T2–14, the readout of the program for column 3, which occurs at E–7 and T1–14 causes the setting of the program temporary storage flip flop 115 which again blocks the resetting of the skip storage flip flop 204. Thus this flip flop will continue in its set condition into the column 3 cycle (see FIG. 8). As a result of the failure to reset the skip storage flip flop 204 a required input to AND gate 204a is absent and the duplicate flip flop 214 is not reset when the program read flip flop 152 is reset. Had the program for column 3 called for a keyboard entry then no bit would appear in the twelve row and the program temporary storage flip flop 115 would not be set. Thus upon the generation of the timing signals E–7 and T3–14 the skip storage flip flop 204 would be reset. This is shown by the dashed line at line $v$ of the column 3 cycle of FIGURE 8. Since the skip storage flip flop 204 is reset upon the resetting of the program read flip flop 152 the duplicate flip flop 214 is reset. This is also shown by a dashed line on line $x$ of the column 3 cycle of FIGURE 8. Further, it should be noted at this time that the skip storage flip flop 204 is set both in a skip operation and in a duplication operation, whereas the duplication flip flop 214 (FIG. 5a) is set only during a duplication operation.

The set output of a duplicate flip flop 214 is fed to a set of OR gates 215 and 141. The output of the OR gate 141 is applied to the set input of the Schmitt trigger 142 to place this in its set condition. (Note line $i$ of the column 3 cycle in FIGURE 8.) The set output of the Schmitt trigger 152 (FIG. 5a) is fed to a first input of the AND gate 143. The output of the OR circuit 215 is fed to a first input of an AND gate 165 (FIG. 5c). The output of the Schmitt trigger 142 is not permitted to pass through the AND gate 143 (FIG. 5a) due to the presence of the set output of the skip store flip flop 204 which is applied to the AND gate 143 as an inhibiting input. Thus although the Schmitt trigger 142 has been set, the memory control flip flop 144 is not permitted to be set by the Schmitt trigger 142 and thus the write flip flop 148 can not be set by the memory control flip flop 144. The output of the skip storage flip flop 204 is also fed both to the AND gate 149 (FIG. 5a) and to the AND gate 205 (FIG. 5a). Neither AND gate 205 nor AND gate 149 are effective at this time due to the absence of the required timing signals. In addition the AND gate 205 receives at one of its inhibitory inputs the set output of the program read flip flop 152. The second inhibitory input of AND gate 205 is connected to the set output of the overrun flip flop 211 which is now reset and therefore does not prevent the operation of the AND gate 205. Upon the generation of the timing signals E–7 and T3–14, the AND gate 156 (FIG. 5a) which receives both of these signals as inputs resets the program read flip flop 152 and removes the inhibitory input to AND gate 205. When the timing signals E–8 and T4–15 are applied to the AND gate 205 together with the set output of the skip storage flip flop 204, a signal is passed via OR gate 146 and capacitor 147 to set the write flip flop 148 (See line $k$ of the column 3 cycle of FIGURE 8.).

The output of the write flip flop 148 will now control the readout of the memory as has been set forth above. In this instance, the presence of the output of the OR circuit 215 (due to the setting of the duplicate flip flop 214) to one input of the terminal 165 will insure that the data section 102 is not read out during the readout operation. That is to say when the AND circuit 154 (FIG. 5c) controls the second readout of column 3, the memory, both program and data sections, its output will be impressed on the second input of the AND gate 165 (FIG. 5c) which already receives the output of the OR circuit 215 (FIG. 5a) to cause the operation of the inhibit power driver 136 (FIG. 5c) to apply inhibiting current on the inhibit line 107 and thus prevent the data section 102 being read out while in the program section 103 is read out. The output of the program section 103 will again be placed in the program temporary storage flip flops 115 and 117 which will effect the same gates as has been described above. (See lines $t$ and $w$ of column 3 cycle of FIG. 8.) When the AND gate 155 is operated, the write back of the program information will take place in a manner as has been described, and nothing further will be done to the data section 102. Thus at the end of a duplication operation, the information which was stored in the data section 102, for column 3 will be retained. This information, it will be noted, was destroyed in the recirculation path during a skip operation, since such information is not required for a later punch operation. In the duplication operation the duplication information, however, must be retained in order that it be available for a later punch operation and thus is not read out during a duplicate operation.

The application of the timing signals A–9 and T4–16 together with the continued application of the set output of the skip storage flip flop 204 and the write flip flop 148 to AND gate 149 causes AND gate 149 to pass a signal via OR gate 150 and capacitance 151 to set the program read flip flop 152 (See line 1 of the column 3 cycle of FIG. 8.) The timing signals A–9 and T3–17 applied to AND gate 157 (FIG. 5a) cause AND gate 157 to apply a resetting signal to reset the write flip flop 148 (see line $k$ of the column 3 cycle of FIGURE 8) and a resetting signal via OR gate 142a to reset the Schmitt trigger 142 (see line $i$ of the column 3 cycle of FIG. 8).

As was described above, the output of the program read flip flop 152 (FIG. 5a) will cause the advancing of the counter 300 (FIG. 5d) to column 4 and will cause the readout of the contents of column 4 of the memory 101. (FIG. 5c)

Semi-automatic skip operation

The operation of the device in the semi-automatic mode will now be discussed with reference to FIGURES 5a, 5b, 5c and 5d as well as to the timing diagram of FIGURE 8. It should be noted that in the semi-automatic mode of operation, the program section 103 of the memory contains information only in the twelve row and contains no information in the "eleven," "zero" or "one" row. Therefore, with the presence of information merely in the "twelve" row, it is not possible to fully instruct the device as to the ensuing operation. Some further key, either the skip key 190 or the duplicate key 191, must be depressed in order to permit the operation to be determined.

It will be assumed that the counter 300 has now been advanced so that the column counter flip flop C4 has been set, and the group counter flip flop G1 remains set, thus addressing column 4 of the memory. It will further be assumed that the program section 103 for column 4 will contain information only in the twelve row.

As was described above, the output of the program read flip flop 152 (FIG. 5a) is impressed upon a first input terminal of the OR circuit 215 (FIG. 5a) providing an output to one of the input terminals of the AND gate 165 (FIG. 5c). The output of the program read flip flop 152 is further provided over the OR circuit 153 to the AND gate 154 (FIG. 5c) to permit the readout of the information contained within the memory. It should be recalled that the output of the AND gate 154 is also applied to an input of the AND gate 165 to operate the inhibit power driver 136 (FIG. 5c) providing inhibiting current to the inhibit winding line 107 (FIG. 5c) which threads all the magnetic cores of the data section 102 only. Thus the information within the data section is retained, whereas the information within the associated program section for column 4 is read out to the program temporary storage flip flops 115, 116, 117 and 118. (FIG. 5c) It should be recalled from the above description of FIGURE 6 that in the semi-automatic skip operation, there will be a bit only in the "twelve" row of the program section 103, and thus only the program temporary storage flip flop 115 will be set. The output of the program temporary storage flip flop 115 is fed to an AND gate 185 (FIG. 5c) for write back into the memory as has been described above. In addition, the output of the flip flop 115 is fed to a first input of the AND gate 202 as well as to the inhibitory input terminal of the AND gate 212 which controls the resetting of the storage flip flop 204. As was noted above the skip storage flip flop 204 would normally be reset by the E-9 T2-18 timing signals if the program for column 4 did not contain a program bit in the "twelve" row. Since the program for column 4 does contain a bit in the "twelve" row flip flop 204 is not reset. The duplicate flip flop 214 is also retained in its set condition as described above. The second input to the AND gate 202 (FIG. 5a) is provided by the reset output of the Schmitt trigger 142 which, as described above, had been placed in its reset state by the timing pulses A–9 and T3–17.

At this time no further operation may take place in that the program itself is incomplete. An indicator lamp on the keyboard 121 will indicate this condition. In order to complete the skip instruction and commence the operation, the skip key 190 must be depressed. The depressing of the skip key 190 impresses an input on the OR circuit 200 (FIG. 5a) whose output is employed to set the skip flip flop 201. The set output of the skip flip flop 201 is now impressed upon the third input of the AND gate 202 which upon receipt of the timing signal E-9 causes AND gate 202 to pass a pulse via the OR gate 203 to attempt to set the skip storage flip flop 204. As was noted above the skip storage flip flop 204 was not reset and thus the attempt to set it at this time is not successful in setting it. However, had the previous operation been an operation other than skip or duplicate, whether automatic or semi-automatic, the skip store flip flop 204 would now be set. The skip flip flop 201 further passes its set output to the OR circuit 141 to set the Schmitt trigger 142 (see line i of the column 4 cycle of FIGURE 8). The output of the Schmitt trigger 142 however is not permitted to pass through the AND circuit 143 to set the memory control flip flop 144 in that the output of the skip storage flip flop 204 is employed as it was in the automatic skip operation to inhibit the operation of this AND gate and prevent the setting of the memory control flip flop 144. The remaining portion of the semi-automatic operation will take place in the manner described with reference to the automatic skip operation and no further description is given at this time.

*Semi-automatic duplication operation*

The semi-automatic duplication operation will be quite similar to that just described with respect to the semi-automatic skip operation, and will be described with reference to the column 4 cycle of the timing diagram of FIGURE 8. The program information read from column 5 of the program section 103 will again contain program information only in the "twelve" row position and thus set the program temporary storage flip flop 115 on the memory read out. The output of the program temporary storage flip flop 115 (FIG. 5c) will again be impressed upon a first input of the AND gate 202 (FIG. 5a) which also receives the reset output of the Schmitt trigger 142 (the Schmitt trigger 142 had been reset by the application of timing signals A-11 and T3-21 applied to AND gate 157), but no further operation will take place. When the duplication key 191 (FIG. 5a) is depressed, a signal will be passed via the OR circuit 200 to set the skip flip flop 201. The set output of the skip flip flop 201 will apply its set output to an input of the AND gate 202 (FIG. 5a) which will produce an output at time period E-11. The output of AND gate 202 is passed via the OR gate 203 to the skip storage flip flop 204 to attempt to set it. It should be recalled that the skip storage flip flop 204 was not reset due to the presence of the output of the program temporary storage flip flop 115 as has been described above. Further, the failure to reset the skip storage flip flop 204 prevented the resetting of the duplicate flip flop 214. Thus the output of the duplicate key 191 (FIG. 5a) passed via OR gate 213 to the set input terminal of the duplication flip flop 214 can not set it. The output of the duplication flip flop 214 (FIG. 5a) is impressed simultaneously upon the OR circuit 141 and the AND gate 215. (FIG. 5a). The output of the OR gate 215 is impressed upon the AND gate 165 which together with an output from the AND gate 154 will control the inhibiting of the readout of the data section 102. The remaining portion of the operation will be as was described with reference to the automatic duplication operation.

If the program for the sixth column of the memory 101 is a keyboard entry operation, which is specified by a code of all zeros in the twelve, eleven, zero and one rows then the skip storage flip flop 204 and the duplicate flip flop 214 will be reset. The resetting of the program read flip flop 152 will reset the skip flip flop 201. Thus the special function flip flops which control the skip and duplicate functions have been reset and will not interfere with further machine operations unless specifically set by the program for further columns of the memory.

*Back spacing operation*

In the event that erroneous data has been entered from the keyboard 121 (FIG. 5a) and it is desired to destroy this data and insert the correct data from the keyboard 121, the backspace key 193 (FIG. 5b) is employed. Assuming the previous operation has been completed and that the program read flip flop 152 (FIG. 5a) is in its set condition, its output will control the inhibit line 107 (FIG. 5c) for the data section 102 of the memory 101 as has been described above, and will also serve to advance the counter 300 (FIG. 5d) to address the next column to that which has just been operated upon. The depressing of the backspace key 193 will impress a signal on the set input of the backspace Schmitt trigger 221 (FIG. 5b) causing it to be set, and thus apply a backspace signal BS via the backspace input terminal 302 which will cause the operation of the AND gates 313 and 313a of the counter 300 as described above and cause counter 300 to be returned to its former count. In that the Schmitt trigger 221 is immediately set and furnishes an output, the counter 300 may be returned to its former count position prior to the time that the readout and write operation controlled by the program read flip flop 152 begins.

Thus the operation called for by the program information of column is repeated (i.e. a keyboard entry operation) and correct data may be entered from the keyboard 121 as described above.

Step operation

Provision is also made in this device for advancing the counter 300 (FIG. 5d) manually in the event that the operator has backspaced too many columns, or if it is desired to omit the semi-automatic skip or duplicate operation. This advancing of the counter 300 is accomplished by means of the step key 192 (FIG. 5b) which advances the counter 300 by a single count for each depression. The depression of the step key 192 causes inhibiting of the data section 102 so that its contents are not destroyed and causes the contents of the program section 103 for the particular column addressed to be read out and written back as has been described above. Assuming, that the operator had erroneously backspaced the counter 300 two counts instead of one, so that column 5 of the memory 101 is being addressed, and that the program read flip flop 152 had been set so as to cause the reading of the program for column 5, the operator may now depress the step key 192 to advance the counter 300 one count and cause the desired column 6 to be addressed.

More particularly when the step key 192 is depressed, it will apply a signal to set the step flip flop 220 (FIG. 5b). The set output of the step flip flop 220 will be applied to the OR circuit 215 (FIG. 5a) as well as the OR circuit 141 (FIG. 5a). The output of the OR circuit 141 will set the Schmitt trigger 142 (FIG. 5a) to apply a signal to the AND gate 143 (FIG. 5a). The output of the Schmitt trigger 142 will be permitted to pass through the AND gate 143 due to the absence of an inhibiting input from the set output of the skip storage flip flop 204 (the skip storage flip flop 204 being reset at this time). The output of the Schmitt trigger 142 will set the memory control flip flop 144 (FIG. 5a) causing it to apply a signal via the AND gate 145 (not inhibited at this time because the home flip flop 223, FIG. 5b, is reset), the OR gate 146 (FIG. 5a) the capacitance 147 (FIG. 5a) to set the write flip flop 148 (FIG. 5a). The write flip flop 148 will control the readout and write back operation of the memory as has been described above. The data section 102 will not be erased in that the output of the OR gate 215 (controlled by the set output of the step flip flop 220) is employed to control the application of inhibiting current to the inhibit line 107. The program read flip-flop 152 will be set, as described above, to cause the counter 300 to be advanced and to read out the program section 103 of column 6.

As has been noted above the step key 192 can also be used to cause the omission of a semi-automatic skip or duplicate operation. As set out above the reading of a bit in the twelve row of the program section for any column of the memory 101 is insufficient by itself to cause an operation and the manual skip key 190 or the manual duplicate key 191 must be depressed to complete the program and initiate the desired operation. If it is desired to disregard the partial program instruction and go on to the next column the step key 192 can be depressed. The operation of the step key 192 for this condition will be the same as that set forth above.

Automatic card feeding and punch cycle operations

After each of the 80 columns of the data section 102 (FIG. 5c) has been set up, the input cycle of operation of the device is over and the device must be prepared for the following card feeding and punching cycle. At the end of the set up of the 80th column, the program read flip flop 152 (FIG. 5a) will be set in the manner described above, providing inhibitory current via the inhibit line 107 (FIG. 5c) to the magnetic cores 113 of the data section 102 and advancing the counter 300 (FIG. 5d) via the count advance OR gate 229 (FIG. 5b) and the count advance input terminal 301 as has been described. The effect of this further advance pulse to the advance input terminal 301 is to place the counter 300 in its 81st count condition. This count condition is represented by the set output of the group counter 300b flip flop G9 (which would normally handle the 9th group, a group which is not present in this device) as well as the set output of the column counter 300a flip flop C1. The device will go through a normal program readout and write back operation under the control of the program read flip flop 152. However, since the 81st column is being addressed and it stores neither program information nor data this operation will have no effect.

The set outputs of the flip flops C1 and G9 will be applied to an AND gate 322 (FIG. 5d) which will provide an output signal to light a lamp 322a on the keyboard 121 (FIG. 5b) and to a first input of the AND gate 231 (FIG. 5b) as well as to a first input of the OR gate 222. (FIG. 5b). The lighting of the lamp 322a will be disregarded by the operator at this time due to the closure of the automatic switch 230 which will initiate a punch operation without operator intervention. The output of the OR gate 222 will immediately set the home flip flop 223 (FIG. 5b) whose set output is applied via the OR circuit 141 (FIG. 5a) to set the Schmitt trigger 142. (See line i of the column 81 cycle of FIG. 8.) The set output of the Schmitt trigger 142 is gated at times T4–303 and E–161 through the AND gate 143 (not inhibited because the skip storage flip flop 204 is reset) to cause the setting of the memory control flip flop 144 (see line j of the column 81 cycle of FIG. 8). The memory control flip flop 144 will pass an output to one of the inputs of the AND gate 145 (FIG. 5a). The AND gate 145 however will not be operated in that its inhibitory input receives the set output of the home flip flop 223. (FIG. 5b.) Thus, the write flip flop 148 (FIG. 5a) which normally would be set at this time to control a memory read out and write back operation is not set.

The AND gate 231 (FIG. 5b) which also received the output of the AND gate 322, receives at its second input, the output of the automatic switch 230 (which has been assumed closed) to permit the initiation of punching automatically once the read in of data has been completed. The AND gate 231 operates to pass a signal via the OR gate 232 to card feed flip flop 224 placing it in the set condition. The output of the card feed flip flop 224 is also fed via the OR gate 222 to attempt to set again the home flip flop 223. This operation is unnecessary in that the output of the AND gate 322 had set the home flip flop 223 before the card feed flip flop 224 was set. The output of the card feed flip flop 224 is also fed via the OR gate 210 to cause the setting of the overrun flip flop 211.

Upon the generation of the timing signals A–162 and T3–305 the AND gate 157 will issue a pulse via OR gate 142a to reset the Schmitt trigger 142 (see line i of the column 81 cycle of FIG. 8). The application of timing signals A–163 and T4–306 together with the reset output of the Schmitt trigger 142 to AND gate 158, will cause AND gate 158 to pass a pulse via OR gate 144a to reset the memory control flip flop 144 (see line j of the column 81 cycle of FIG. 8). As has been described, the reset output of the memory control flip flop 144 is passed via the OR gate 150 (FIG. 5a), and the capacitor 151 to the set input of the program read flip flop 152 (see line 1 of the column 81 cycle of FIG. 8).

Additionally, the output of the home flip flop 223 (FIG. 5b) is passed to the reset input terminal 302 of the counter 300 (FIG. 5d) to return the counter 300 to its original condition wherein column counter 300a flip flop C1 and group counter 200b flip flop G1 are placed in their set condition and all remaining flip flops of these counters set in their reset condition. Timing pulses E–163 and T4–308 will cause the AND gate 156 to apply a resetting pulse to the input of the program read flip flop 152 causing it to be reset. The reset output of the program read flip flop 152 is passed via an OR circuit 222a to the reset terminal of the home flip flop 223 via a capacitance 223a. As a result of the resetting of the program read flip flop 152 the memory will not be read out and all data and program information will remain intact.

In addition to setting the overrun flip flop 211 (FIG. 5b) the output of the card feed flip flop 224 is applied to OR gate 437 (FIG. 4) to operate the control device 438 and provide stepping signals to the commutator wiper 124a (FIG. 5c); to reset the flip flop 464 (FIG. 5c) to permit the generation of the STEP 1 and STEP 2 signals and set the punch device 139 for a punch cycle. The punch operation which will ensue is controlled solely by means of the commutator 124 as was the loading of the memory 101 with information from the record card reader 120. It should be recalled that the write flip flop 148 (FIG. 5a) and the program read flip flop 152 (FIG. 5a) have been reset and will not furnish the signals required to operate the group and column selection AND gates thus rendering the group and column drivers 134 (FIG. 5c) and 132, 133 respectively inoperative. Additionally, since no information is being entered by means of the record card reader 120 (FIG. 5c) or the keyboard 121 (FIG. 5a) the x-line write data drivers 130 and the x-line write program drivers 131 (FIG. 5c) will not be operated at this time. The output of the card feed flip flop 224 will also be fed directly to the wiper 124a of the commutator 124 (FIG. 5c) to insure that it is reset to column 1 so that the operation may begin.

Upon the concurrence of the first STEP 1 signal and the timing signal E1–1, the AND gate 125a (FIG. 5c) will furnish a SYNC 1 signal to initiate the operation of the readout power driver 125. The readout power driver 125 will impress upon the commutator 124 an amount of current sufficient to cause the readout of all the information stored within the first column. The data read from the magnetic cores 113 of the data section 102 (FIG. 5c) are read via the twelve data sense lines 110 to the twelve AND gates 110a (FIG. 5c). It should be recalled that the gates 110a also receive an inhibitory input from the output of the write flip flop 148 (FIG. 5a). However, since the write flip flop 148 is reset at this time, no inhibitory signals are applied to the twelve AND gates 110a and the outputs of the magnetic cores 113, which represent the data stored in column 1 will be passed from the data sense lines 110 through the AND gates 110a to set the twelve data temporary storage flip flops 137 in accordance with the stored data. The output of the data temporary storage flip flops 137 are simultaneously applied to the twelve punch bar actuators 138 and to a first input of the twelve AND gates 129, for write back. The punch bar actuators 138 (FIG. 5c) will cause punching of the information immediately in accordance with the data stored in the data section 102 for column 1. Each of the AND gates 129 (FIG. 5c) also receives a signal from the normally closed contact 180a of the duplicate key 180, as well as the SYNC 2 pulse. The program information stored within column 1 of the program section 103 is read out to the four program temporary storage flip flops 115, 116, 117 and 118 (FIG. 5c) and are impressed in turn upon a set of write in AND gates 185 for program information write back.

Upon the application of the STEP 2 signal and the T2–1 signal to the AND gate 126a, AND gate 126a produces a SYNC 2 signal to operate the write power driver 126 and impress a current upon the commutator 124 equal to one half of the current required to switch or set the magnetic cores 113 and 114 of column 1. The SYN2 signal from AND gate 126a will also be applied to the AND gates 129 which receive the write back data for the data section 102. The outputs of the twelve AND gates 129 are fed via twelve OR gates 174 to operate the twelve x-line write drivers 130 to impress upon the twelve data x-write lines 109 one half of the required selection current. This one half of the selection current is sufficient in conjunction with the half selection current provided by the write power driver 126, via the column line 105 (FIG. 5c) to cause the magnetic cores 113 at such intersections to be set. In a similar fashion, the application of the SYN2 signal to the OR circuit 155a (FIG. 5c) will pass a signal to the four AND gates 185 which receive the write back program information from the program temporary storage flip flops 115 through 118 to operate them. The AND gates 185 will pass signals via the four OR gates 184 to the four program x-write drivers 131 to place upon the four program x-write lines 111 a half selection current. This one half of the selection current is sufficient, in conjunction with the output of the write power driver 126, to cause the setting of the magnetic cores 114 in the program section 103.

Thus at the end of this cycle of operation, the data and program information which had originally been stored in column 1 is returned to the data section 102 and the program section 103 respectively, of column 1. In addition, the data which had been stored in column 1 of the data section 102 has also been applied to the punch actuator devices 138 for the punching of this information. Upon completion of the punch operation for column 1, the punch 139 will issue a signal via OR gate 437 to the control device 438 (see FIGURE 4) to cause the control device 437 to issue a step signal over the line 124c to the commutator 124 to cause the advancement of the commutator wiper 124a to the second segment 124b–2. In this position the commutator 124 will permit the reading out and punching of the information stored within column 2 of the data section 102. This operation will continue until all 80 columns of the memory 101 have been read out and have been punched into the 80 column record card in the punch device 139. After all 80 columns of the record card have been punched, the cams 225 and 211a in the shaft 400 will close their contacts 225a and 211b to reset the card feed flip flop 224 and the overrun flip flop 211 as has been described above.

*Manual initiation of card feeding and punch cycle operation*

In the event that the automatic switch 230 has been left open, and the counter 300 arrives at the count of 81, the output of the AND gate 322 would light the lamp 322a on the keyboard (indicating that the counter 300 has arrived at a count of 81) but the punch cycle would not begin. It should be recalled from the discussion of the automatically initiated punch cycle above, that the card feed flip flop 224 (FIG. 5b) is set by the output of the AND gate 231 (FIG. 5b). AND gate 231 operates in response to the output of AND gate 322 and a signal from the automatic switch 230. Since the automatic switch is open this latter signal is not present and AND gate 231 cannot set the card feed flip flop 224. The output of AND gate 322 does, however, pass through the OR gate 222 to set the home flip flop 223. The output of the home flip flop 223 will be applied as described above to reset the counter 300 and set the Schmitt trigger 142. Upon the detection of lamp 322a being lit, the operator would press the card feed key 195 (FIG. 5b) to impress a signal, via the OR circuit 232 to set the card feed flip flop 224. The remaining portion of the operation is the same from this point as that described above with reference to the automatic card feeding and punch cycle operation, and thus will not be described again.

*Entry of data during punching operation*

As soon as the data for a particular column has been punched out, as described above, that column of the memory is then available to receive further information even while the remaining columns of the memory are being read out and punched. This concurrent operation of the punchout of data and the insertion of further data in those columns already read, by means of the keyboard, is possible because of the two independent selection and driver systems which are employed in the device. The punchout operation is controlled by means of the commutator 124 (FIG. 5c) and the power sources 125 and 126 (FIG. 5c) whereas the input of information from the keyboard 121 (FIG. 5a) is under the coincident control of the counter 300 (FIG. 5d) and the x-write drivers 130 and 131 (FIG. 5c). Thus, when column 2 is being read out for punching operation, column 1 may have data inserted therein by means of the keyboard 121 under the control of the program already stored in the program section 103 for column 1. If the program for column 1 merely calls for the entry of keyboard information, no problem is created thereby. However, in the event that the program stored in the program section 103 for column 1 calls for a skip or duplicate operation then the operation could be carried out and the counter 300 advanced to address column 2 before the punching operation for column 2 is completed, possibly interfering with the punch operation or destroying the stored data.

It should be understood that the punch operation is taking place at normal punch speeds which are far slower than the cycling time for the electronic counter 300. Therefore, the device under the control of the counter 300 may be able to complete skip operations in, for example, the first 10 columns of the memory 101 in the time taken for the data in the first column to be punched out. If this were permitted, the first 10 columns of information, 9 of which are yet to be punched, would be destroyed. A further set of control flip flops, namely the overrun flip flop 211 and the interlock flip flop 207 are provided to prevent such an occurrence.

It should be understood that the commutator 124, controlling the punch operation, causes the readout of data to be punched from the data section 102 as well as the program information from the program section 103 for the same column. The program information read out by the commutator 124 will not be employed to control the punch operation but is used to prevent the entry of data from the keyboard 121 or the execution of program steps which interfere with the punch operation. The program information read out under control of the commutator 124 is made available at an A timing signal time while the program information read out under the control of the counter 300 and used for input control is available at an E timing signal time which is later in time than the A timing signal time. Assuming that an automatic punch operation is to be carried out, then upon the counter 300 (FIG. 5d) reaching the count of 81 (group counter 300b flip flop G9 and column counter 300a flip flop C1 set) AND gate 322 will set the card feed flip flop 224 (FIG. 5b) to start the operation of the punch mechanism 139 (FIG. 5c) and set the home flip flop 223 (FIG. 5b) as described above. The set output of the home flip flop 223 will reset the counter 300 to its initial position (group counter 300b flip flop G1 and column counter 300a flip flop C1 set) addressing column 1 and will set the program read flip flop 152 (FIG. 5a). The contents of column 1 of the memory 101 will be read out for punching under the control of the SYNC 1 signal which is derived from the STEP 1 signal and gated through AND gate 125a by the timing signal T1. The information read from column 1 will be returned and stored in column 1 of the memory 101 under the control of the SYNC 2 signal which is derived from the STEP 2 signal and gated through AND gate 126a by the timing signal T2. As is evident from FIGURES 7 and 8, the timing signals T1 and T2 are available during A timing signals and thus the memory readout, the punching operation and the memory write-back operations under the control of commutator 124 are completed before the memory input cycle is initiated under control of the counter 300 during the E timing signal.

Assuming the commutator 124 has been reset so that the wiper 124a contacts the segment for the first column 124b-1, the generation of the STEP 1 signal, in the manner described above, will cause the readout of the contents of the data section 102 to the punch actuators 138 of the punch 139 to effect punching and return the data readout to the write-back gates 129. The program information read out from the program section 103 is read to the program temporary storage flip flops 115, 116, 117 and 118 (FIG. 5c). The outputs of these flip flops will set the special function flip flops as described above, however, they will not effect the input cycle to follow in that they will be reset before the input cycle starts. Assuming that the program for column 1 is a keyboard input operation represented by zeros in the row positions twelve, eleven, zero and one, the AND gate 230b will not have inhibitory inputs applied. The application of the STEP 2 signal to AND gate 126a (FIG. 5c) will cause the generation of the SYNC 2 signal and will operate the write power driver 126 and AND gates 129 and 185 to write back the data and program information into data section 102 and program section 103 respectively. The SYNC 2 signal and the A timing signal are also appled to the AND gate 230b (FIG. 5b) to operate the gate and apply a signal via OR gate 230a (FIG. 5b) to reset the overrun flip flop 211 (FIG. 5b) thus removing its inhibitory input to AND gate 205 (FIG. 5a). At timing signal T3 the program temporary storage flip flops 115, 116, 117 and 118 are reset.

In that the program read flip flop 152 has been set, as described above, the generation of the E timing signal starts the readout-write back cycle under control of the counter 300. In that it was assumed that the program section 103 for column 1 contained the program for a keyboard entry, the keyboard entry cycle is carried out as has been described. The presence of keyboard entry program information in every column would permit the entry of data from the keyboard at the operators normal speed without interfering with the punch operation, since under normal conditions a keyboard entry will be slower than the punch operation.

The input cycle will be delayed under those conditions in which the execution of the input cycle might interfer with the punching cycle. Assume, for example that columns 1 to 10 contain program information for an automatic skip operation and column 11 contains program information for a keyboard entry operation. Since the skip operation under control of counter 300 may proceed at higher speeds than the punch operation under control of the commutator 124, it could be possible for the counter 300 to overrun the commutator and hinder or prevent the execution of the punch operation. To prevent such an occurrence the overrun flip flop 211 (FIG. 5b) is employed. It should be recalled that the overrun flip flop 211 is set by the set output of the card feed flip flop 224 which is set at the start of the punch operation. It should also be recalled that AND gate 230b (FIG. 5c), which provides one of the reset inputs to the overrun flip flop 211 is operative only during the A timing signal, and that AND gate 230b has inhibitory inputs coupled to the outputs of the program temporary storage flip flops 115, 116 and 117. When the contents of column 1 is read out by the commutator 124, the program temporary storage flip flops 115 and 116 will be set (it should be recalled that the automatic skip program contains bits in the twelve and eleven rows). The outputs of the program temporary storage flip flops 115 and 116 will thus inhibit the AND gate 230b and prevent the resetting of the overrun flip flop 211.

The first column of the memory 101 will now be read out under control of the counter 300. Since an automatic skip operation is called for (as assumed above) the program temporary storage flip flops 115 and 116 will again be set. The output of the program temporary storage flip flop 115 will inhibit AND gate 212 (FIG. 5a) to prevent resetting of the skip storage flip flop 204. The output of the program temporary storage flip flop 116 will pass through AND gate 208, which also receives the E timing signal and the output of the automatic switch 230, and through OR gate 203 to set the skip storage flip flop 204. The skip operation may not proceed, however, since the output of the overrun flip flop 211 inhibits the AND gate 205 (FIG. 5a) and prevents the setting of the write flip flop 148. Counter 300 remains set at the first count condition but commutator 124 continues its advance. This condition will continue until column 11 is reached by the commutator 124. As was assumed above, the program section 103 for column 11 contains program information for a keyboard entry operation, and thus when this information is read out during the A timing signal, none of the program temporary storage flip flops are set. Thus the inhibitory inputs to the AND gate 230b are removed and upon the generation of the SYNC 2 signal, a signal is passed through AND gate 230b and OR gate 230a (FIG. 5b) to reset the overrun flip flop 211 removing the inhibitory input to AND gate 205.

When the E and T4 timing signals are produced (the program read flip flop 152 was reset by the E and T3 signals and does not inhibit AND gate 205) AND gate 205 (FIG. 5a) will pass a signal via OR gate 146 and capacitance 147 to set the write flip flop 148 and go through a full cycle of operation (in readout and write-back under control of write flip flop 148 and readout and write-back under control of program read flip flop 152). The skip operation for the columns 2 through 10 will be carried out without interruption because the overrun flip flop 211 can not be set again. It should be noted that the skip storage flip flop 204 can only be reset during the E timing signal and such resetting is not permitted due to the inhibitory input from the program temporary storage flip flop 115 which is set during each of the columns 2 to 10 because each of these columns contain the program information for an automatic skip operation. Since the skip storage flip flop 204 produces a steady output during this time the capacitance 210a (FIG. 5b) can not pass a signal via OR gate 210 to set the overrun flip flop 211. However, when column 11 is reached, and the program temporary storage flip flop 115 is not set the skip storage flip flop 204 is reset.

Since column 11 requires a keyboard entry cycle this operation may be carried out without interfering with the punch operation. Upon the reading out of any further program information by the counter 300 calling for a skip or duplicate operation whether automatic or semi-automatic the input cycle will be suspended until a keyboard entry operation program is read out by the commutator 124 at which time the operation will be carried out as set out above. If no further keyboard entry cycle is called for by the programs in the program section, the input cycle is held up until the punch operation is completed at which time cam 225 (FIG. 5b) on the punch shaft 400 will close the contacts of switch 225a to reset the card feed flip flop 224. The reset output of the card feed flip flop 224 is applied to AND gate 231a which also receives the signal generated by the closing of the contacts of the switch 211b by the cam 211a also on punch shaft 400. AND gate 231a will pass a signal via OR gate 230a to reset the overrun flip flop 211 and permit the input cycle to proceed.

One further condition is also taken care of by the overrun flip flop 211; namely the case of an attempted keyboard entry while the overrun flip flop 211 is still set. Assume that the overrun flip flop 211 had been set by the card feed flip flop 224 when the punch operation was initiated and that the program information readout by the commutator 124 called for a skip or duplicate operation. As a result the overrun flip flop 211 enables the AND gate 226. Should a key on the keyboard now be depressed, the keyboard encoder signal on the line 140 would also be impressed on AND gate 226 to operate it. The output of AND gate 226 will be passed via OR gate 227 to set the interlock flip flop 207. This will ignite warning light 207a on the keyboard to instruct the operator to depress the clear key 196. The output of the interlock flip flop 207 is also passed to an inhibit input of AND gate 228 to prevent an advance pulse from being generated to advance counter 300. The depression of the clear key 196 will reset the interlock flip flop 207 so that data may be entered from the keyboard when permitted. The output of the clear key 196 is also applied to inhibit power driver 135 to operate it and place inhibit current on the inhibit line 107 preventing the readout of the data section 102.

The interlock flip flop 207 is also used to prevent a keyboard entry but it will operate when the program used for input is a skip or duplicate operation either automatic or semi-automatic. AND gate 208a (FIG. 5b) receives the output of the skip storage flip flop 204, set when a skip or duplicate operation, whether automatic or semiautomatic is called for, as well as the output of the Schmitt trigger 142 set when a keyboard entry is made or the skip or duplicate keys 190 and 191 respectively, are closed. AND gate 208a will pass a signal via OR gate 227 to set the interlock flip flop 207 as described above.

The card feed flip flop 224 is reset by the closing of the cam contacts 225a by the cam 225 mounted on shaft 400. This cam will close the contacts 225a after a complete punching operation (all 80 columns) has taken place. The reset output of the card feed flip flop 224 will be applied to one input of AND gate 231a. The second input will be applied by the closing of cam contacts 211b by cam 211. The output of AND gate 231a will pass via OR gate 230a to reset the overrun flip flop 211 if it has not been reset during the punch operation.

It will be obvious to one skilled in the art that the described principles are not only applicable to the keypunch but also to a verifier. In place of the punch station, there would be provided a second record card where the date in a particular column would be read out to the information in the similar column of the memory. The operation of the memory and the remaining portion of the device will be similar to that described. Program information would first be stored in the program section 103 by means of the keyboard 121 or the record card reader 120 as described above. Then the data section 102 may be loaded with the comparison data by means of the keyboard 121 under control of the stored program, also as described above. Alternatively, the comparison data may be loaded into the data section 102 directly without the requirement for the pre-loading of a program as set out above. Once the memory stores the comparison data, the verification operation may be started. The record card to be verified is placed in the record card reader 120 at the second or verifying read station, and the reader started. As the record card advances to record card column 1, the commutator 124 is reset to the first segment to cause the readout of the data stored in column 1. The data read from the record card is applied to one set of inputs of the comparator while the data from column 1 of the memory 101 are applied to a second set of inputs. The comparator may be of any type well known in the art which will produce a first output if the data compares properly and a second output if the data does not compare. These signals will then be applied to two special punches or notching devices at the end of the record card reader. If the first signal is generated a punch or notch will be placed in the edge of the record card at a preset position to readily indicate that the data has been favorably compared. If the second signal is generated a punch or notch is placed in the edge of the record card at a second preset position to readily indicate that the data has not been favorably compared.

Although the description has been in terms of an 80 column record card, the same principles are nonetheless applicable to a 90 column card. Rewiring or readjustment of the memory would be necesary in this particular arrangement and certain changes would have to be made in the arrangement of the counter. However, the principles and techniques which have been described would be applicable to such a device, and it is felt that one skilled in the art could make the necessary changes in view of the teachings of this application.

While there have been shown and described and pointed out the fundamental novel features of the invention as applied to the preferred embodiment, it will be understood that various omissions and substitutions and changes of the form and details of the devices as illustrated and in its operation may be made by those skilled in the art, without departing from the spirit of the invention.

The embodiments of the invention in which the exclusive property or privileges claimed are defined as follows:

1. In an internally programmed recording apparatus having information input means, the combination comprising: first storage means having a plurality of addressable storage locations coupled to said input means for storing a first type of information entered from said input means; second storage means having a plurality of addressable storage locations for storing a second type of information entered from said input means; readout means coupled to said first storage means to readout the contents of an addressable storage location and produce signals in accordance with the information stored thereat; mechanical addressing means coupled to said first and second storage means; electrical addressing means coupled to said first and second storage means; said mechanical and electrical addressing means each capable of addressing the locations of said first and second storage means in a sequential manner; control means coupled to said mechanical addressing means and said electrical addressing means to permit the operation of either of said addressing means or both; and write-in means coupled between said input means and said second storage means and coupled to said readout means and responsive to said signals from said readout means to permit the write-in of information from said input means into locations of said second storage means in accordance with said signals from said readout means.

2. In an internally programmed recording apparatus having information input means, the combination comprising: first storage means having a plurality of addressable storage locations coupled to said input means for storing a first type of information entered from said input means; second storage means having a plurality of addressable storage locations for storing a second type of information entered from said input means; each of said addressable storage locations of said second storage means being coupled to and associated with a separate one of said addressable storage locations of said first storage means, such that when a location in either storage means is addressed its associated storage location in the other storage means is similarly addressed; readout means coupled to said first storage means to read out the contents of an addressable storage location and produce signals in accordance with the information stored thereat; addressing means coupled to said first and second storage means to address each of the storage locations of said first and second storage means in a sequential manner to enable the readout of the information stored at the addressed storage location; and write-in means coupled between said input means and said second storage means and responsive to said signals from said readout means to permit the write-in and storage of information from said input means into a storage location of said second storage means associated with the storage location of said first storage means then being read out by said readout means.

3. In an internally programmed recording apparatus having information input means, the combination comprising: first storage means having a plurality of addressable storage locations coupled to said input means for storing a first type of information entered from said input means; second storage means having a plurality of addressable storage locations for storing a second type of information entered from said input means; each of said addressable storage locations of said second storage means being coupled to and associated with a separate one of said addressable storage locations of said first storage means, such that when a location in either storage means is addressed its associated storage location in the other storage means is similarly addressed; readout means coupled to said first storage means to read out the contents of an addressable storage location and produce signals in accordance with the information stored thereat; mechanical addressing means coupled to said first and second storage means; electrical addressing means coupled to said first and second storage means; said mechanical and electrical addressing means each capable of addressing the associated locations of said first and second storage means in a sequential manner; control means coupled to said mechanical addressing means and said electrical addressing means to permit the operation of either of said addressing means or both; and write-in means coupled between said input means and said second storage means and responsive to said signals from said readout means to permit the write-in and storage of information from said input means into a storage location of said second storage means associated with the storage location of said first storage means then being read out by said readout means in accordance with said signals from said readout means.

4. In an internally programmed recording apparatus having keyboard and record reading input means, the combination comprising: first storage means having a plurality of addressable storage locations coupled to said keyboard and record reading input means for storing a first type of information entered from said keyboard or record reading input means; second storage means having a plurality of addressable storage locations for storing data entered from said keyboard input means; readout means coupled to said first storage means to readout the contents of an addressable storage location and produce signals in accordance with the information stored thereat; mechanical addressing means coupled to said first and second storage means; electrical addressing means coupled to said first and second storage means; said mechanical and electrical addressing means each capable of addressing the locations of said first and second storage means in a sequential manner; control means coupled to said mechanical addressing means and said electrical addressing means to permit the operation of either of said addressing means or both; and write-in means coupled between said keyboard input means and said second storage means and to said mechanical addressing means and coupled to said readout means and responsive to said signals from said readout means to permit the write-in of data from said keyboard input means into locations of said second storage means in accordance with said signals from said readout means.

5. In an internally programmed recording apparatus having keyboard and record reading input means, the combination comprising: first storage means having a plurality of addressable storage locations coupled to said keyboard and record reading input means for storing a first type of information entered from said keyboard or record reading input means; second storage means having a plurality of addressable storage locations for storing data entered from said keyboard input means; each of said addressable storage locations of said second storage means being coupled to and associated with a separate one of said addressable storage locations of said first storage means, such that when a location in either storage means is addressed its associated storage location in the other storage means is similarly addressed; readout means coupled to said first storage means to read out the contents of an addressable storage location and produce signals in accordance with the information stored thereat; addressing means coupled to said first and second storage means to address each of the storage locations of said first and second storage means in a sequential manner to enable the readout of the information stored at the addressed storage locations; and write-in means coupled between said keyboard input means and said second storage means and responsive to said signals from said readout means to permit the write-in and storage of data from said keyboard input means into a storage location of said second storage means associated with the storage location of said first storage means then being read out by said readout means.

6. In an internally programmed recording apparatus having keyboard and record reading input means, the combination comprising: first storage means having a plurality of addressable storage locations coupled to said keyboard and record reading input means for storing a first type of information entered from said keyboard and record reading input means; second storage means having a plurality of addressable storage locations for storing data entered from said keyboard input means; each of said addressable storage locations of said second storage means being coupled to and associated with a separate one of said addressable storage locations of said first storage means, such that when a location in either storage means is addressed its associated storage location in the other storage means is similarly addressed; readout means coupled to said first storage means to read out the contents of an addressable storage location and produce signals in accordance with the information stored thereat; mechanical addressing means coupled to said first and second storage means; electrical addressing means coupled to said first and second storage means; said mechanical and electrical addressing means each capable of addressing the associated locations of said first and second storage means in a sequential manner; control means coupled to said mechanical addressing means and said electrical addressing means to permit the operation of either of said addressing means or both; and write-in means coupled between said keyboard input means and said second storage means and responsive to said signals from said readout means to permit the write-in and storage of data from said keyboard input means into a storage location of said second storage means associated with the storage location of said first storage means then being read out by said readout means in accordance with said signals from said readout means.

7. In an internally programmed recording apparatus having keyboard and record reading input means, the combination comprising: first storage means coupled to said keyboard and record reading input means, said first storage means having a plurality of addressable storage locations for storing program information entered from said keyboard or record reading input means; second storage means having a plurality of addressable storage locations for storing data entered from said keyboard input means; readout means coupled to said first storage means to read out the contents of an addressable storage location therein and produce signals in accordance with the program information stored thereat; mechanical addressing means coupled to said first and second storage means; electrical addressing means coupled to said first and second storage means; said mechanical and electrical addressing means each capable of addressing associated locations of said first and second storage means in a sequential manner and causing the information stored at said locations to be read out; control means coupled to said mechanical addressing means and said electrical addressing means to permit the operation of either of said addressing means or both; write-in means coupled between said keyboard input means and said second storage means and to said readout means and responsive to predetermined operation signals to permit the write-in of data from said keyboard input means at locations in said second storage means in accordance with the storage location in said first storage means being addressed for readout; translating means coupled to said readout means and responsive to predetermined signals indicative of predetermined program information read from said first storage means to produce predetermined operation signals and responsive to other signals indicative of other program information to produce other operation signals; and connecting means coupling said translating means to said write-in means whereby data may be entered from said keyboard input means and stored in the storage location of said second storage means associated with the storage location of said first storage means being addressed when said predetermined operation signals are produced and data may not be entered from said keyboard input means and stored in the storage location of said second storage means associated with the storage location of said first storage means being addressed when said other operation signals are produced.

8. In an internally programmed recording apparatus having keyboard and record reading input means, the combination comprising: first storage means coupled to said keyboard and record reading input means, said first storage means having a plurality of addressable storage locations for storing program information entered from said keyboard or record reading input means; second storage means having a plurality of addressable storage locations for storing data entered from said keyboard input means; each of said addressable storage locations of said second storage means being coupled to and associated with a separate one of said addressable storage locations of said first storage means such that when a location in either storage means is addressed its associated storage location in the other storage means is similarly addressed; readout means coupled to said first storage means to read out the contents of an addressable storage location therein and produce signals in accordance with the program information stored thereat; addressing means coupled to said first and second storage means to address each of the storage locations of said first and second storage means in a sequential manner to enable the readout of the information stored at the addressed storage locations; write-in means coupled between said keyboard means and said second storage means and responsive to predetermined operation signals to permit the write-in of data from said keyboard input means at locations in said second storage means associated with the storage location in said first storage means being addressed for readout; translating means coupled to said read out means and responsive to predetermined signals indicative of predetermined program information read from said first storage means to produce predetermined operation signals and responsive to other signals indicative of other program information to produce other operation signals; and connecting means coupling said translating means to said write-in means whereby data may be entered from said keyboard input means and stored in the storage location of said second storage means associated with the storage location of said first storage means being addressed when said predetermined operation signals are produced and data may not be entered from said keyboard input means and stored in the storage location of said second storage means associated with the storage location of said first storage means being addressed when said other operation signals are produced.

9. In an internally programmed recording apparatus having keyboard and record reading input means, the combination comprising: first storage means having a plurality of addressable storage locations for storing program information entered from said keyboard or record reading input means; second storage means having a plurality of addressable storage locations for storing data entered from said keyboard input means; each of said addressable storage locations of said second storage means being coupled to and associated with a separate one of said addressable storage locations of said first storage means such that when a location in either storage means is addressed its associated storage location in the other storage means is similarly addressed; readout means coupled to said first storage means to readout the contents of an addressable storage location therein and produce signals in accordance with the program information stored thereat; mechanical addressing means coupled to said first and second storage means; electrical addressing means coupled to said first and second storage means; said mechanical and electrical addressing means each being capable of causing the addressing of the associated locations of said first and second storage means in a sequential manner to permit readout or write-in at the addressed storage locations; control means coupled to said mechanical and electrical addressing means to permit the operation of either of said addressing means of both; write-in means coupled between said keyboard means and said second storage means and responsive to predetermined operation signals to permit the write-in of data from said keyboard input means at locations in said second storage means in accordance with the associated storage location in said first storage means being addressed for readout; translating means coupled to said read out means and responsive to predetermined signals indicative of predetermined program information read from said first storage means to produce predetermined operation signals responsive to other signals indicative of other program information to produce other operation signals; and connecting means coupling said translating means to said write-in means whereby data may be entered from said keyboard input means and stored in the storage location of said second storage means being addressed when said predetermined operation signals are produced and data may not be entered from said keyboard input means and stored in the storage location of said second storage means associated with the storage location of said first storage means being addressed when said other operation signals are produced.

10. An apparatus as defined in claim 9 further including an additional write-in means coupled to said readout means and to said first storage means to permit the write-in of the program information read from the addressed storage location of said first storage means into the same storage location of said first storage means whereby said program information in said first storage means will be available to control the entry of data from said keyboard input means into its associated storage location of said second storage means at further addressings of the same storage location of said first and second storage means.

11. An apparatus as defined in claim 9 further including a selectively operable switching device to provide first control signals when in a first condition and second control signals when in a second condition, selection means coupled to said selectively operable switching device to place said selectively operable switching device in said first condition; additional write-in means coupled between said keyboard input means and said first storage means and to said readout means and said selectively operable switching device and responsive to said first control signals to permit the readout of the program information stored in an addressed storage location of said first storage means and the entry and restorage of said program information in the same addressed storage location of said first storage means whereby said program information is retained and is available to control the entry of data into the associated storage location of said second storage means at further addressings of the same storage location of said first and second storage means.

12. An apparatus as defined in claim 9 further including a selectively operable switching device to provide first control signals when in a first condition and second control signals when in a second condition, selection means coupled to said selectively operable switching device to place said selectively operable switching device in said second condition; additional write-in means coupled between said keyboard input means and said first storage means and to said readout means and said selectively operable switching device and responsive to said second control signals to permit the readout of the program information stored in an addressed storage location of said first storage means and the destruction of said program information while permitting the entry and storage of program information from said keyboard input means in the storage location of said first storage means being addressed whereby further program information is available to control the entry of data into the associated storage location of said second storage means at further addressings of the same storage location of said first and second storage means.

13. An apparatus as defined in claim 9, further including: manually operable selection means; and first selectively operable control means coupled to said electrical addressing means and said manually operable selection means and responsive to the operation of said manually operable selection means to prevent said electrical addressing means from advancing to the next sequential address and cause said electrical addressing means to address the address just prior in the sequence to that being addressed by said electrical addressing means when said manually operable selection means is operated whereby the program information from the storage location of the first storage means will be readout again and the data stored in the associated storage location in said second storage means may be altered.

14. An apparatus as defined in claim 10, further including a first selectively operable control means coupled to said translating means and to said write-in and additional write-in means and responsive to said other operation signals produced by said translating means to enable said additional write-in means while disabling said write-in means whereby the program information read from an addressed storage location of said first storage means is returned thereto and the data stored in the associated storage location of said second storage means is destroyed and the entry of further data into said addressed storage location of said second storage means is prevented.

15. An apparatus as defined in claim 10, further including a first selectively operable control means coupled to said translating means and to said write-in and additional write-in means and responsive to said other operation signals produced by said translating means to enable said write-in and additional write-in means while preventing the storage of data from said keyboard in said second storage means whereby the program information read from an addressed storage location of said first storage means is returned thereto and data stored in the associated storage location of said second storage means is returned thereto and the entry of further data into said addressed storage location of said second storage means is prevented.

16. An apparatus as defined in claim 10, further including a selectively operable switching device to provide first control signals when in a first condition and second operation signals when in a second condition; selection means coupled to said selectively operable switching device to place said selectively operable switching device in said first condition; additional readout means coupled to said second storage means to readout the contents of an addressable storage location therein and produce signals in accordance with the data stored thereat; first control means coupled to said write-in means, said additional readout means, said selectively operable switching device and said translating means and responsive to said other operation signals and said first control signals to permit the readout of the data stored in the addressed storage location of said second storage means to destroy the data so readout and to prevent the entry and storage of further data from said keyboard input means into the addressed storage location of said second storage means whereby previously stored data in the addressed storage location of the second storage means is destroyed and no further data is placed therein.

17. An apparatus as defined in claim 10, further including a selectively operable switching device to provide first control signals when in a first condition and second operation signals when in a second condition; selection means coupled to said selectively operable switching device to place said selectively operable switching device in said second condition; additional readout means coupled to said second storage means to readout the contents of an addressable storage location therein and produce signals in accordance with the data stored thereat; first control means coupled to said write-in means, said additional readout means, said selectively operable switching device and said translating means and responsive to said other operation signals and said second control signals to permit the readout of the data stored in the addressed storage location of said second storage means, and the entry and restorage of the data so readout in the addressed storage location of said second storage means while preventing the entry and storage of further data from said keyboard input means into the addressed storage location of said second storage means whereby the data previously stored at the addressed storage location of said second storage means is retained and is available at further addressing of said storage location of said second storage means.

18. In an internally programmed recording apparatus having information input means and an information output means, the combination comprising: first storage means having a plurality of addressable storage locations for storing a first type of information entered from said input means; first readout means coupled to said first storage means to readout the contents of an addressable storage location and produce first signals in accordance with the information stored thereat; first write-in means coupled between said first storage means and said input means to enable the storage of information of said first type at a single storage location of said first storage means; second storage means having a plurality of addressable storage locations for storing and second type of information entered from said input means; each of said addressable storage locations of said second storage means being coupled to a separate one of said addressable storage locations of said first storage means such that when a location in either storage means is addressed its associated storage location in the other storage means is similarly addressed; second readout means coupled to said second storage means and to said information output means to readout the contents of an addressable storage location in said second storage means and produce second signals in accordance with the information stored thereat; said second signals being applied to said information output means; second write-in means coupled between said second storage means and said input means and responsive to said first signals from said first readout means to permit the write-in and storage of said second type of information at a single storage location of said second storage means; mechanical addressing means coupled to said second storage means to address individual storage locations of said second storage means and permit the readout of said second type of information from the addressed storage location to said information output means; first control means coupled to said mechanical addressing means to cause said mechanical addressing means to address the storage locations of said second storage means in a sequential manner; electrical addressing means coupled to said first and second storage means to address individual storage locations of said first storage means and an associated storage location of said second storage means to permit the readout of said first type of information from the addressed storage location of said first storage means to control the entry and storage of said second type of information from said input means into the addressed associated storage location of said second storage means; second control means coupled to said electrical addressing means to cause said electrical addressing means to address the associated storage locations of said first and second storage means in a sequential manner; and third control means coupled to said first and second control means to cause said mechanical addressing means to address storage locations in sequence in advance of those storage locations being addressed by said electrical addressing means and to prevent said electrical addressing means from addressing the same storage location being addressed by said mechanical addressing means, whereby said second type of information is readout of a storage location of said second storage means to said information output means followed by the entry of said second type of information from said information input means into a storage location of said second storage means previously readout to said information output means and the entry of said second type of information is prevented into the storage location being read out to said information output means.

19. In an internally programmed recording apparatus having information input means and an information output means, the combination comprising: first storage means having a plurality of addressable storage locations for storing a first type of information entered from said input means; first readout means coupled to said first storage means to readout the contents of an addressable storage location and produce signals in accordance with the information stored thereat; translating means coupled to said first readout means and responsive to predetermined signals indicative of predetermined information to produce predetermined operation signals and responsive to other signals indicative of other information to produce other operation signals; first write-in means coupled between said first storage means and said input means to enable the storage of information of said first type at a single storage location of said first storage means; second storage means having a plurality of addressable storage locations for storing a second type of information entered from said input means; each of said addressable storage locations of said second storage means being coupled to a separate one of said addressable storage locations of said first storage means, such that when a location in either storage means is addressed its associated storage location in the other storage means is similarly addressed; second readout means coupled to said second storage means and to said information output means to readout the contents of an addressable storage location in said second storage means and produce output signals in accordance with the information stored thereat; said output signals being applied to said information output means; second write-in means coupled between said second storage means and said input means and to said translating means and responsive to said predetermined operation signals to permit the write-in and storage of said second type of information at a single storage location of said second storage means; mechanical addressing means coupled to said first and second storage means to address individual storage locations of said first storage means and an associated storage location of said second storage means and permit the readout of said first type of information from the addressed storage location of said first storage means and said second type of information from the associated storage location of said second storage means to said information output means; first control means coupled to said mechanical addressing means to cause said mechanical addressing means to address the storage locations of said first and second storage means in a sequential manner; electrical addressing means coupled to said first and second storage means to address individual storage locations of said first storage means and an associated storage location of said second storage means to permit the readout of said first type of information from the addressed storage location of said first storage means to control the entry and storage of said second type of information from said input means into the addressed associated storage location of said second storage means; second control means coupled to said electrical addressing means to cause said electrical addressing means to address the associated storage locations of said first and second storage means in a sequential manner; and third control means coupled to said second control means and to said translating means and responsive to said predetermined operation signals to cause said second control means to operate said electrical addressing means to address storage locations in sequence lagging those storage locations being addressed by said mechanical addressing means and to prevent said electrical addressing means from overtaking said mechanical addressing means and addressing the storage locations being addressed by said mechanical addressing means whereby said second type of information is readout of a storage location of said second storage means to said information output means followed by the entry of said second type of information from said information input means into a storage location of said second storage means previously readout to said information output means and the entry of said second type of information is prevented into the storage location being read out to said information output means.

20. In an internally programmed record perforating apparatus having keyboard and record reading input means and record perforating output means, the combination comprising: first storage means having a plurality of addressable storage locations for storing program information entered from said keyboard or record reading input means; first readout means coupled to said first storage means to readout the contents of an addressable storage location and produce first signals in accordance with the program information stored thereat; first write-in means coupled between said first storage means and said keyboard and record reading input means to enable the storage of program information at a single storage location of said first storage means; second storage means having a plurality of addressable storage locations for storing data entered from said keyboard input means; each of said addressable storage locations of said second storage means being coupled to a separate one of said addressable storage locations of said first storage means such that when a location in either storage means is addressed its associated storage location in the other storage means is similarly addressed; second readout means coupled to said second storage means and to said record perforating output means to readout the contents of an addressable storage location in said second storage means and produce second signals in accordance with the data stored thereat; said second signals being applied to said record perforating output means; second write-in means coupled between said second storage means and said keyboard input means and responsive to said first signals from said first readout means to permit the write-in and storage of said data at a single storage location of said second storage means; mechanical addressing means coupled to said second storage means to address individual storage locations of said second storage means and permit the readout of said data from the addressed storage location to said record perforating output means; first control means coupled to said mechanical addressing means to cause said mechanical addressing means to address the storage locations of said second storage means in a sequential manner; electrical addressing means coupled to said first and second storage means to address individual storage locations of said first storage means and the associated storage location of said second storage means to permit the readout of said program information from the addressed storage location of said first storage means to control the entry and storage of said data from said keyboard input means into the addressed associated storage location of said second storage means; second control mens coupled to said electrical addressing means to cause said electrical addressing means to address the associated storage locations of said first and second storage means in a sequential manner; and third control means coupled to said first and second control means to cause said mechanical addressing means to address storage locations in sequence in advance of those storage locations being addressed by said electrical addressing means and to prevent said electrical addressing means from addressing the same storage location being addressed by said mechanical addressing means, whereby said data is readout of a storage location of said second storage means to said record perforating output means followed by the entry of data from said keyboard input means into a storage location of said second storage means previously readout to said record perforating output means and the entry of data is prevented into the storage location being read out to said information output means.

21. In an internally programmed record perforating apparatus having keyboard and record reading input means and record perforating output means, the combination comprising: first storage means having a plurality of addressable storage locations for storing program information entered from said keyboard or record reading input means; first readout means coupled to said first storage means to readout the contents of an addressable storage location and produce signals in accordance with the program information stored thereat; translating means coupled to said first readout means and responsive to predetermined signals indicative of predetermined program information to produce predetermined operation signals and responsive to other signals indicative of other program information to produce other operation signals; first write-in means coupled between said first storage means and said keyboard and record reading input means to enable the storage of program information at a single storage location of said first storage means; second storage means having a plurality of addressable storage locations for storing data entered from said keyboard input means; each of said addressable storage locations of said second storage means being coupled to a separate one of said addressable storage locations of said first storage means such that when a location in either storage means is addressed its associated storage location in the other storage means is similarly adressed; second readout means coupled to said second storage means and to said record perforating output means to readout the contents of an addressable storage location in said second storage means and produce output signals in accordance with the information stored thereat; said output signals being applied to said record perforating output means; second write-in means coupled between said second storage means and said keyboard input means and to said translating means and responsive to said predetermined operation signals to permit the write-in and storage of said data at a single storage location of said second storage means; mechanical addressing means coupled to said first and second storage means to address individual storage locations of said first storage means and the associated storage location of said second storage means and permit the readout of said program information from the addressed storage location of said first storage means and said data from the associated storage location of said second storage means to said record perforating output means; first control means coupled to said mechanical addressing means to cause said mechanical addressing means to address the storage locations of said first and second storage means in a sequential manner; electrical addressing means coupled to said first and second storage means to address individual storage locations of said first storage means and an associated storage location of said second storage means to permit the readout of said program information from the addressed storage location of said first storage means to control the entry and storage of said data from said keyboard input means into the addressed associated storage location of said second storage means; second control means coupled to said electrical addressing means to cause said electrical addressing means to address the associated storage locations of said first and second storage means in a sequential manner; and third control means coupled to said second control means and to said translating means and responsive to said predetermined operation signals to cause said second control means to operate said electrical addressing means to address storage locations in sequence lagging those storage locations being addressed by said mechanical addressing means and to prevent said electrical addressing means from overtaking said mechanical addressing means and addressing the storage locations being addressed by said mechanical addressing means whereby said data is readout of a storage location of said second storage means to said record perforating output means followed by the entry of data from said keyboard input means into a storage location of said second storage means previously readout to said record perforating output means and the entry of data is prevented into the storage location being read out to said record perforating means.

22. In an internally programmed record perforating apparatus having keyboard and record reading input means and record perforating output means, the combination comprising: first storage means having a plurality of addressable storage locations for storing program information entered from said keyboard or record reading input means; first readout means coupled to said first storage means to readout the contents of an addressable storage location and produce signals in accordance with the program information stored thereat; translating means coupled to said first readout means and responsive to predetermined signals indicative of predetermined program information to produce predetermined operation signals and responsive to other signals indicative of other program information to produce other operation signals; first write-in means coupled between said first storage means and said keyboard and record reading of program information at a single storage location of said first storage means; second storage means having a plurality of addressable storage locations for storing data entered from said keyboard input means; each of said adressable storage locations of said second storage means being coupled to a separate one of said addressable storage locations of said first storage means such that when a location in either storage means is addressed its associated storage location in the other storage means is similarly addressed; second readout means coupled to said second storage means and to said record perforating output means to readout the contents of an addressable storage location in said second storage means and produce output signals in accordance with the information stored thereat; said output signals being applied to said record perforating output means; second write-in means coupled between said second storage means and said keyboard input means and to said translating means and responsive to said predetermined operation signals to permit the write-in and storage of said data at a single storage location of said second storage means; mechanical addressing means coupled to said first and second storage means to address individual storage locations of said first storage means and the associated storage location of said second storage means and permit the readout of said program information from the addressed storage location of said first storage means and said data from the associated storage location of said second storage means to said record perforating output means; first control means coupled to said mechanical addressing means to cause said mechanical addressing means to address the storage locations of said first and second storage means in a sequential manner; electrical addressing means coupled to said first and second storage means to address individual storage locations of said first storage means and an associated storage location of said second storage means to permit the readout of said program information from the addressed storage location of said first storage means to control the entry and storage of said data from said keyboard input means into the addressed associated storage location of said second storage means; second control means coupled to said electrical addressing means to cause said electrical addressing means to address the associated storage locations of said first and second storage means in a sequential manner; and third control means coupled to said second control means and to said translating means and responsive to said predetermined operation signals to cause said second control means to operate said electrical addressing means to address storage locations in sequence lagging those storage locations being addressed by said mechanical addressing means; and fourth control means coupled to said translating means and to said second write-in means and responsive to said other operation signals from said translating means produced during the readout of the program information stored in the storage location of said first storage means addressed by said electrical addressing means to prevent the operation of said second write-in means preventing the entry and storage of data from said keyboard input means into the electrically addressed storage location of said second storage means, said fourth control means being further responsive to said predetermined operation signals from said translating means produced during the readout of the program information stored in the storage locations of said first storage means addressed by said mechanical addressing means to permit the write-in of data from said keyboard input means into the storage location of said second storage means at the location addressed by said electrical addressing means and at successive storage locations of said second storage means and fifth control means coupled to first and second control means to prevent said electrical addressing means from overtaking said mechanical addressing means and addressing the storage locations being adressed by said mechanical addressing means whereby data is read from a storage location of said second storage means addressed by said mechanical addressing means to said record perforating output means and data is entered from said keyboard input means into a different storage location in said second storage means addressed by said electrical addressing means under the control of the program information for the associated storage location of said first storage means providing predetermined operation signals are present.

References Cited
UNITED STATES PATENTS 3,144,549   9/1964   Hoberg et al. _____ 340—172.5

PAUL J. HENON, *Primary Examiner.*

G. D. SHAW, *Assistant Examiner.*